US010268895B2

(12) United States Patent
Chen et al.

(10) Patent No.: US 10,268,895 B2
(45) Date of Patent: *Apr. 23, 2019

(54) METHODS AND SYSTEMS FOR APPEARANCE BASED FALSE POSITIVE REMOVAL IN VIDEO ANALYTICS

(71) Applicant: QUALCOMM Incorporated, San Diego, CA (US)

(72) Inventors: Ying Chen, San Diego, CA (US); Yang Zhou, San Jose, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,114

(22) Filed: May 7, 2018

(65) Prior Publication Data
US 2018/0341813 A1 Nov. 29, 2018

Related U.S. Application Data

(60) Provisional application No. 62/510,949, filed on May 25, 2017, provisional application No. 62/579,072, filed on Oct. 30, 2017.

(51) Int. Cl.
*G06K 9/00* (2006.01)
*H04N 5/225* (2006.01)
(Continued)

(52) U.S. Cl.
CPC ..... *G06K 9/00744* (2013.01); *G06K 9/00758* (2013.01); *G06K 9/00771* (2013.01);
(Continued)

(58) Field of Classification Search
USPC ....... 382/100, 103, 106–107, 154, 162, 168, 382/172, 164, 173, 181, 199, 209, 219,
(Continued)

(56) References Cited

U.S. PATENT DOCUMENTS

2006/0170769 A1* 8/2006 Zhou ................. G06K 9/00362
348/143
2008/0231709 A1* 9/2008 Brown ............... G06K 9/00771
348/169

(Continued)

OTHER PUBLICATIONS

Co-pending U.S. Appl. No. 15/973,090, filed May 7, 2018.
(Continued)

*Primary Examiner* — Seyed H Azarian
(74) *Attorney, Agent, or Firm* — Polsinelli LLP

(57) ABSTRACT

Techniques and systems are provided for maintaining blob trackers for one or more video frames. For example, a blob tracker is identified for a current video frame. The blob tracker is associated with a blob detected for the current video frame. The blob includes pixels of at least a portion of one or more objects in the current video frame. A current characteristic of pixels in a region of the current video frame associated with the blob tracker is determined. A previous characteristic of pixels in a region of a previous video frame associated with the blob tracker is also determined. A difference is determined between the current characteristic and the previous characteristic, and a status of the blob tracker is determined based on the determined difference. The status of the blob tracker indicating whether to maintain the blob tracker for the one or more video frames.

30 Claims, 37 Drawing Sheets

(51) Int. Cl.
*G06T 7/194* (2017.01)
*G06K 9/03* (2006.01)
*G06K 9/46* (2006.01)
*G06T 7/50* (2017.01)
*G06T 7/90* (2017.01)
*G06T 7/246* (2017.01)

(52) U.S. Cl.
CPC ............ *G06K 9/03* (2013.01); *G06K 9/4647* (2013.01); *G06T 7/194* (2017.01); *G06T 7/251* (2017.01); *G06T 7/50* (2017.01); *G06T 7/90* (2017.01); *G06T 2207/10016* (2013.01); *G06T 2207/20121* (2013.01)

(58) Field of Classification Search
USPC ....... 382/232, 254, 274, 276, 286–294, 305, 382/312; 348/143, 169
See application file for complete search history.

(56) References Cited

U.S. PATENT DOCUMENTS

| | | |
|---|---|---|
| 2012/0093362 A1 | 4/2012 | Liu et al. |
| 2013/0051613 A1* | 2/2013 | Bobbitt .............. G06K 9/00771 382/103 |
| 2014/0003713 A1* | 1/2014 | Seow ...................... G06T 5/009 382/164 |
| 2017/0177948 A1 | 6/2017 | Srinivasan et al. |
| 2017/0345179 A1 | 11/2017 | Gao et al. |

OTHER PUBLICATIONS

Kim W., et al., "Background Subtraction for Dynamic Texture Scenes Using Fuzzy Color Histograms", IEEE Signal Processing Letters, Mar. 2012, vol. 19, No. 3, pp. 127-130.

* cited by examiner

1100

```
┌─────────────────────────────────────┐
│  IDENTIFY A BLOB TRACKER FOR A CURRENT │
│  VIDEO FRAME, WHEREIN THE BLOB TRACKER IS │
│  ASSOCIATED WITH A BLOB DETECTED FOR THE │
│  CURRENT VIDEO FRAME, THE BLOB INCLUDING │
│  PIXELS OF AT LEAST A PORTION OF ONE OR │
│  MORE OBJECTS IN THE CURRENT VIDEO FRAME │
│                 1102                │
└─────────────────────────────────────┘
                  ↓
┌─────────────────────────────────────┐
│  DETERMINE A CURRENT CHARACTERISTIC OF │
│  PIXELS IN A REGION OF THE CURRENT VIDEO │
│  FRAME ASSOCIATED WITH THE BLOB TRACKER │
│                 1104                │
└─────────────────────────────────────┘
                  ↓
┌─────────────────────────────────────┐
│  DETERMINE A PREVIOUS CHARACTERISTIC OF │
│  PIXELS IN A REGION OF A PREVIOUS VIDEO │
│  FRAME ASSOCIATED WITH THE BLOB TRACKER │
│                 1106                │
└─────────────────────────────────────┘
                  ↓
┌─────────────────────────────────────┐
│  DETERMINE A DIFFERENCE BETWEEN THE │
│  CURRENT CHARACTERISTIC AND THE PREVIOUS │
│              CHARACTERISTIC         │
│                 1108                │
└─────────────────────────────────────┘
                  ↓
┌─────────────────────────────────────┐
│  DETERMINE A STATUS OF THE BLOB TRACKER │
│  BASED ON THE DETERMINED DIFFERENCE, THE │
│  STATUS OF THE BLOB TRACKER INDICATING │
│  WHETHER TO MAINTAIN THE BLOB TRACKER │
│     FOR ONE OR MORE VIDEO FRAMES    │
│                 1110                │
└─────────────────────────────────────┘
```

FIG. 11

METHODS AND SYSTEMS FOR APPEARANCE BASED FALSE POSITIVE REMOVAL IN VIDEO ANALYTICS

CROSS-REFERENCE TO RELATED APPLICATIONS

This application claims the benefit of U.S. Provisional Application No. 62/510,949, filed May 25, 2017, and also the benefit of U.S. Provisional Application No. 62/579,072, filed Oct. 30, 2017, both of which are hereby incorporated by reference, in their entirety and for all purposes.

FIELD

The present disclosure generally relates to video analytics, and more specifically to techniques and systems for determining the status of objects as true or false positives using appearance characteristics of the objects.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some examples, techniques and systems are described for determining the status of objects (and their blob trackers) as true or false positives for object tracking in video analytics. In some cases, a blob detection component of a video analytics system can use data from one or more video frames to generate or identify blobs for the one or more video frames. A blob represents at least a portion of one or more objects in a video frame (also referred to as a "picture"). Blob detection can utilize background subtraction to determine a background portion of a scene and a foreground portion of scene. Blobs can then be detected based on the foreground portion of the scene. The detected blobs can be provided, for example, for blob processing, object tracking, and other video analytics functions. For example, temporal information of the blobs can be used to identify stable objects or blobs so that a tracking layer can be established.

In order to provide a low complexity video analytics solution for video surveillance, after tracking a detected object for a certain duration of time, the system can determine whether the tracked object is to be outputted or not. However, there may be a large portion of such objects which are false positive objects. For example, after the blob detection process, false positive blobs may be detected and output to the tracking system. The false positive blobs may then be output to the video analytics system as false positive objects (e.g., due to a tracker associated with the false positive blob being output to the system, such as being displayed as a tracked object). Examples of false positive objects that may be output as tracked objects can include, but are not limited to, moving foliage due to wind, an umbrella or other objects that are still but move due to external elements such as wind, glass doors, isolated shadows, or other suitable objects.

The techniques and systems described herein provide a false positive removal mechanism that can be applied to remove false positives. False positive removal techniques may be based on bounding box history and correlation, and can avoid, to a large extent, high complexity while removing many false positive objects. However, it may be beneficial to also have some pixel level analysis of the texture of the tracked object to determine whether a tracker (and the tracked object) is a true positive or false positive object. For example, a false positive removal mechanism that does not rely on pixel level analysis of texture may not be able to detect false positive objects that have little motion, and/or may incorrectly detect true positive objects as false positives when the objects have little motion.

The techniques and systems described herein provide an appearance based false positive detection mechanism (referred to as a true-false positive detection process) for determining the status of objects as true or false positives. The appearance based false positive detection mechanism can determine whether a blob tracker is a true positive or a false positive (and whether the object being tracked by the tracker is a true positive or a false positive object) using appearance characteristics of the object, which can further reduce the false positive rate. A blob tracker can also be referred to as an object tracker. The appearance characteristics can include color characteristics (e.g., an appearance model) that are determined for a tracker and used in the true-false positive detection process. Color characteristics of a tracker can be determined in multiple frames of a video sequence, and can be compared to determine a difference between the color characteristics in the multiple frames. A color characteristic of a tracker can include a color mass center of the pixels in a frame that are associated with the tracker (e.g., included in a bounding region of the tracker).

In some examples, an appearance model can be determined for a tracker. The appearance model includes color characteristics of the pixels in the region included in the tracker's bounding box in a frame. The appearance model can be used to determine the color characteristics of the tracker (the pixels associated with the tracker) in the multiple frames. For example, when processing a frame N, an appearance model can be calculated for the tracker in that frame N. The appearance model can be used to calculate the mass center for the tracker in frame N. In addition, when processing a later frame N+m, the appearance model calculated for the tracker at frame N can be used to calculate the mass center of the tracker in the later frame N+m.

The status of the blob tracker can be determined based on the difference between the color characteristics. For example, a determined status of a tracker can include a status associated with outputting the tracker immediately (e.g., for a current frame, a next frame, or the like) or a status associated with removing the tracker (also referred to as killing the tracker) from a list of trackers maintained for the video sequence (e.g., when the tracker is determined to be tracking a false positive object). In addition to outputting a tracker and/or killing a tracker, a tracker can be transitioned to an intermediate status. A tracker with an intermediate status can be kept or maintained for future iterations of the true-false positive detection process, in which case there is no need to either kill or output the tracker immediately.

In some cases, it can be beneficial to also have some pixel level analysis directed to finding a foreground pixel fullness ratio to determine whether a blob tracker (and the blob being tracked by the tracker) is related to a true positive blob (and object) or a false positive blob (and object). A foreground pixel fullness ratio can include a comparison (or ratio) between the area of a foreground portion of a video frame and the area of a bounding region (e.g., a bounding box or other suitable bounding region) that encloses the foreground portion. A low foreground pixel fullness ratio may indicate that the bounding box is associated with a false positive object.

In some implementations, the techniques and systems described herein can include a foreground pixel level analysis to provide a further mechanism for determining a status of a blob tracker (e.g., whether the blob tracker is associated with a false positive object). For example, based on one or more first characteristics of the object (e.g., a size of the object or other characteristic) and one or more second characteristics of the blob tracker (e.g., a state of the blob tracker, historical movements of a bounding region for the blob tracker, or other characteristic), a foreground pixel fullness analysis can be performed on a bounding region of the blob tracker in addition to the pixel level analysis described above (based on appearance characteristics of the object). The foreground pixel fullness analysis can include comparing a foreground pixel fullness ratio of the bounding region of the blob tracker against a foreground pixel fullness ratio threshold. The foreground pixel fullness ratio threshold can be determined based on the one or more first characteristics of the object and the one or more second characteristics of the blob tracker. In such implementations, a decision of whether the tracker is associated with a false positive blob (and object) can be made based on the results of the pixel level analysis and of the foreground pixel fullness analysis. In some cases, using the foreground pixel fullness analysis can provide a more accurate true/false positive decision for a blob tracker and the blob (and object) to be tracked by the blob tracker.

According to at least one example, a method of maintaining blob trackers for one or more video frames is provided. The method includes identifying a blob tracker for a current video frame. The blob tracker is associated with a blob detected for the current video frame. The blob includes pixels of at least a portion of one or more objects in the current video frame. The method further includes determining a current characteristic of pixels in a region of the current video frame associated with the blob tracker. The method further includes determining a previous characteristic of pixels in a region of a previous video frame associated with the blob tracker. The method further includes determining a difference between the current characteristic and the previous characteristic. The method further includes determining a status of the blob tracker based on the determined difference. The status of the blob tracker indicates whether to maintain the blob tracker for the one or more video frames.

In another example, an apparatus for maintaining blob trackers for one or more video frames is provided that includes a memory configured to store video data and a processor. The processor is configured to and can identify a blob tracker for a current video frame. The blob tracker is associated with a blob detected for the current video frame. The blob includes pixels of at least a portion of one or more foreground objects in the current video frame. The processor is further configured to and can determine a current characteristic of pixels in a region of the current video frame associated with the blob tracker. The processor is further configured to and can determine a previous characteristic of pixels in a region of a previous video frame associated with the blob tracker. The processor is further configured to and can determine a difference between the current characteristic and the previous characteristic. The processor is further configured to and can determine a status of the blob tracker based on the determined difference. The status of the blob tracker indicates whether to maintain the blob tracker for the one or more video frames.

In another example, a non-transitory computer-readable medium is provided that has stored thereon instructions that, when executed by one or more processors, cause the one or more processor to: identifying a blob tracker for a current video frame, wherein the blob tracker is associated with a blob detected for the current video frame, the blob including pixels of at least a portion of one or more foreground objects in the current video frame; determining a current characteristic of pixels in a region of the current video frame associated with the blob tracker; determining a previous characteristic of pixels in a region of a previous video frame associated with the blob tracker; determining a difference between the current characteristic and the previous characteristic; and determining a status of the blob tracker based on the determined difference, the status of the blob tracker indicating whether to maintain the blob tracker for one or more video frames.

In another example, an apparatus for maintaining blob trackers for one or more video frames is provided that includes means for identifying a blob tracker for a current video frame. The blob tracker is associated with a blob detected for the current video frame. The blob includes pixels of at least a portion of one or more foreground objects in the current video frame. The apparatus further includes means for determining a current characteristic of pixels in a region of the current video frame associated with the blob tracker. The apparatus further includes means for determining a previous characteristic of pixels in a region of a previous video frame associated with the blob tracker. The apparatus further includes means for determining a difference between the current characteristic and the previous characteristic. The apparatus further includes means for determining a status of the blob tracker based on the determined difference. The status of the blob tracker indicates whether to maintain the blob tracker for the one or more video frames.

In some aspects, the determined status of the blob tracker includes a first type of blob tracker that is output as an identified blob tracker-blob pair, a second type of blob tracker that is maintained for further analysis, or a third type of blob tracker that is removed from a plurality of blob trackers maintained for the one or more video frames.

In some examples, the status of the blob tracker is determined to be the first type of blob tracker when the difference is greater than a threshold difference.

In some examples, the status of the blob tracker is determined to be the first type of blob tracker when an object the blob tracker is tracking is larger than a threshold size and when the difference is greater than a threshold difference.

In some examples, the status of the blob tracker is determined to be the second type of blob tracker when the difference is less than a threshold difference.

In some examples, the status of the blob tracker is determined to be the second type of blob tracker when an object the blob tracker is tracking is larger than a threshold size and when the difference is less than a threshold difference.

In some examples, the status of the blob tracker is determined to be the third type of blob tracker when the difference is less than a threshold difference.

In some aspects, determining the current characteristic and the previous characteristic includes: obtaining an appearance model for the blob tracker, the appearance model including one or more color characteristics of the pixels in the region of the previous video frame included in a previous bounding region of the blob tracker; determining the previous characteristic of the blob tracker for the previous video frame using the appearance model; and determining the current characteristic of the blob tracker for the current video frame using the appearance model. In some cases, the one or more color characteristics of the appearance model include a previous color histogram of the pixels in the region of the previous video frame included in the previous bounding region of the blob tracker.

In some aspects, the previous characteristic includes a previous color mass center of the pixels in the region of the previous video frame included in the previous bounding region, and wherein the current characteristic of the blob tracker includes a current color mass center of the pixels in the region of the current video frame included in a current bounding region of the blob tracker.

In some aspects, determining the difference between the current characteristic and the previous characteristic includes determining a distance between the previous color mass center and the current color mass center. In some examples, determining the status of the blob tracker based on the determined difference includes: comparing the distance to a threshold distance; and determining the blob tracker is the third type of tracker when the distance is less than the threshold distance, where a tracker of the third type is removed from a plurality of blob trackers maintained for the one or more video frames. In some cases, the threshold distance is a percentage of a diagonal distance of the previous bounding region. In such cases, the distance between the previous color mass center and the current color mass center can be compared to the diagonal distance of the previous bounding region, and the result can be compared to the threshold distance (the percentage of the diagonal distance of the previous bounding region).

In some aspects, the methods, apparatuses, and computer-readable medium described above further comprise: performing a foreground pixel fullness analysis on the pixels in the region of the current video frame included in a current bounding region of the blob tracker, the foreground pixel fullness analysis including comparing a foreground pixel fullness ratio of the current bounding region against a foreground pixel fullness ratio threshold. In such aspects, determining the status of the blob tracker is based on the foreground pixel fullness analysis.

In some aspects, the methods, apparatuses, and computer-readable medium described above further comprise: determining that an input status of the blob tracker indicates that a determination of the status of the blob tracker is to be deferred to a subsequent video frame, the subsequent video frame occurring after the current video frame in a video sequence; and determining whether to perform the foreground pixel fullness analysis based on a confidence value associated with the blob tracker, the confidence value being determined based on a set of historical attributes associated with a bounding region of the blob tracker in a set of previous video frames of the video sequence.

In some aspects, the methods, apparatuses, and computer-readable medium described above further comprise: determining a correlation between color components of the current video frame and color components of a mean picture. In such aspects, the status of the blob tracker is determined based on the determined difference and the determined correlation.

In some aspects, the apparatus includes a camera for capturing the one or more video frames. In some aspects, the apparatus includes a display for displaying the one or more video frames. In some implementations, the apparatus includes a mobile device comprising a camera for capturing the one or more video frames and a display for displaying the one or more video frames.

According to at least one other example, a method of maintaining one or more object trackers for one or more video frames using a foreground pixel fullness analysis is provided. The method includes identifying an object tracker for a current video frame of the one or more video frames, the object tracker being associated with an object detected for the current video frame. The method further includes determining one or more first characteristics of the object and one or more second characteristics of the object tracker. The method further includes determining, based on the one or more first characteristics of the object and the one or more second characteristics of the object tracker, whether to perform a foreground pixel fullness analysis on a bounding box of the object when performing a pixel level analysis for the object. The foreground pixel fullness analysis includes comparing a foreground pixel fullness ratio of the bounding box against a foreground pixel fullness ratio threshold determined based on the one or more first characteristics of the object and the one or more second characteristics of the object tracker. The method further includes determining an output status of the object tracker based on a result of the pixel level analysis. The output status of the object tracker indicates whether to maintain the object tracker for the one or more video frames, to remove the object tracker, or to defer the determination of the output status of the object tracker to a subsequent video frame of the one or more video frames.

In another example, an apparatus for maintaining one or more object trackers for one or more video frames using a foreground pixel fullness analysis is provided. The apparatus may include a memory configured to store the one or more video frames, and a processor configured to: identify an object tracker for a current video frame of the one or more video frames, the object tracker being associated with an object detected for the current video frame; determine one or more first characteristics of the object and one or more second characteristics of the object tracker; determine, based on the one or more first characteristics of the object and the one or more second characteristics of the object tracker, whether to perform a foreground pixel fullness analysis on a bounding box of the object when performing a pixel level analysis for the object, the foreground pixel fullness analysis comprising comparing a foreground pixel fullness ratio of the bounding box against a foreground pixel fullness ratio threshold determined based on the one or more first characteristics of the object and the one or more second characteristics of the object tracker; and determine an output status of the object tracker based on a result of the pixel level analysis, the output status of the object tracker indicating whether to maintain the object tracker for the one or more video frames, to remove the object tracker, or to defer the determination of the output status of the object tracker to a subsequent video frame of the one or more video frames.

In another example of maintaining one or more object trackers for one or more video frames using a foreground pixel fullness analysis, a non-transitory computer-readable medium is provided that has stored thereon instructions that, when executed by one or more processors, cause the one or more processor to: identify an object tracker for a current video frame of the one or more video frames, the object tracker being associated with an object detected for the current video frame; determine one or more first characteristics of the object and one or more second characteristics of the object tracker; determine, based on the one or more first characteristics of the object and the one or more second characteristics of the object tracker, whether to perform a foreground pixel fullness analysis on a bounding box of the object when performing a pixel level analysis for the object, the foreground pixel fullness analysis comprising comparing a foreground pixel fullness ratio of the bounding box against a foreground pixel fullness ratio threshold determined based on the one or more first characteristics of the object and the one or more second characteristics of the object tracker; and determine an output status of the object tracker based on a result of the pixel level analysis, the output status of the object tracker indicating whether to maintain the object tracker for the one or more video frames, to remove the object tracker, or to defer the determination of the output status of the object tracker to a subsequent video frame of the one or more video frames.

In another example, an apparatus for maintaining one or more object trackers for one or more video frames using a foreground pixel fullness analysis is provided. The apparatus includes: means for identifying an object tracker for a current video frame of the one or more video frames, the object tracker being associated with an object detected for the current video frame; means for determining one or more first characteristics of the object and one or more second characteristics of the object tracker; means for determining, based on the one or more first characteristics of the object and the one or more second characteristics of the object tracker, whether to perform a foreground pixel fullness analysis on a bounding box of the object when performing a pixel level analysis for the object, the foreground pixel fullness analysis comprising comparing a foreground pixel fullness ratio of the bounding box against a foreground pixel fullness ratio threshold determined based on the one or more first characteristics of the object and the one or more second characteristics of the object tracker; and means for determining an output status of the object tracker based on a result of the pixel level analysis, the output status of the object tracker indicating whether to maintain the object tracker for the one or more video frames, to remove the object tracker, or to defer the determination of the output status of the object tracker to a subsequent video frame of the one or more video frames.

In some aspects, determining the one or more second characteristics of the object tracker can include determining an input status of the object tracker. In some aspects, determining whether to perform the foreground pixel fullness analysis on the bounding box of the object can include: determining that the input status of the object tracker indicates that the determination of the output status of the object tracker is to be deferred to the subsequent video frame; and determining whether to perform the foreground pixel fullness analysis based on a confidence value associated with the object tracker, the confidence value being determined based on a set of historical attributes associated with the bounding box in a set of previous video frames of the one or more video frames.

In some aspects, determining whether to perform the foreground pixel fullness analysis based on the confidence value associated with the object tracker can include: determining that the confidence value exceeds a first confidence threshold; determining that object tracker satisfies a freeze condition; and performing, based on the confidence value exceeding the first confidence threshold and the object tracker satisfying the freeze condition, a first pixel level analysis without the foreground pixel fullness analysis, the first pixel level analysis including analyzing a change in one or more color characteristics and texture characteristics of the object between the current video frame and a previous video frame of the one or more video frames.

In some aspects, determining whether the object tracker satisfies the freeze condition can include determining whether a movement of the object tracker across a pre-determined number of video frames of the one or more video frames is below a distance threshold.

In some aspects, determining whether to perform the foreground pixel fullness analysis based on the confidence value associated with the object tracker can include: determining that the confidence value exceeds a second confidence threshold, the second confidence threshold being higher than the first confidence threshold; determining that the object tracker does not satisfy the freeze condition; and maintaining, based on the confidence value exceeding the second confidence threshold and the object tracker not satisfying the freeze condition, the object tracker for the one or more video frames without performing the pixel level analysis and the foreground pixel fullness analysis.

In some aspects, determining whether to perform the foreground pixel fullness analysis based on the confidence value associated with the object tracker can include: determining that the confidence value is below a second confidence threshold, the second confidence threshold being higher than the first confidence threshold; determining that the one or more video frames are associated with a pre-determined test scenario; and performing, based on the confidence value being below the second confidence threshold and the one or more video frames being associated with the pre-determined test scenario, a first pixel level analysis with the foreground pixel fullness analysis, wherein the foreground pixel fullness ratio is determined based on the pre-determined test scenario. In one illustrative example, the pre-determined test scenario is associated with a home security system.

In some aspects, the methods, apparatuses, and computer-readable medium described above for maintaining one or more object trackers for one or more video frames using a foreground pixel fullness analysis can include: based on both a result of the foreground pixel fullness analysis and a result of the first pixel level analysis indicating a positive result, maintaining the object tracker for the one or more video frames.

In some aspects, the methods, apparatuses, and computer-readable medium described above for maintaining one or more object trackers for one or more video frames using a foreground pixel fullness analysis can include: based on a first result of the foreground pixel fullness analysis being contrary to a result of the first pixel level analysis, or based on both the result of the foreground pixel fullness analysis and the result of the first pixel level analysis indicating a negative result, deferring the determination of the output status of the object tracker to the subsequent video frame.

In some aspects, determining whether to perform the foreground pixel fullness analysis based on the confidence value associated with the object tracker can include: determining that the confidence value is between the first confidence threshold and a third confidence threshold, the third confidence threshold being lower than the first confidence threshold; and performing, based on the confidence value being between the first confidence threshold and the third confidence threshold, the first pixel level analysis without the foreground pixel fullness analysis.

In some aspects, the methods, apparatuses, and computer-readable medium described above for maintaining one or more object trackers for one or more video frames using a foreground pixel fullness analysis can include: based on a result of the first pixel level analysis indicating a positive result, maintaining the object tracker for the one or more video frames.

In some aspects, the methods, apparatuses, and computer-readable medium described above for maintaining one or more object trackers for one or more video frames using a foreground pixel fullness analysis can include: based on a result of the first pixel level analysis indicating a negative result, deferring the determination of the output status of the object tracker to the subsequent video frame.

In some aspects, determining whether to perform the foreground pixel fullness analysis based on the confidence value associated with the object tracker can include: determining that the confidence value is below the third confidence threshold; and performing, based on the confidence value being below the third confidence threshold, a second pixel level analysis without the foreground pixel fullness analysis, the second pixel level analysis being based on the one or more color characteristics of the object.

In some aspects, the methods, apparatuses, and computer-readable medium described above for maintaining one or more object trackers for one or more video frames using a foreground pixel fullness analysis can include: based on a result of the second pixel level analysis indicating a positive result, deferring the determination of the output status of the object tracker to the subsequent video frame.

In some aspects, the methods, apparatuses, and computer-readable medium described above for maintaining one or more object trackers for one or more video frames using a foreground pixel fullness analysis can include: based on a result of the second pixel level analysis indicating a negative result, removing the object tracker.

In some aspects, the one or more first characteristics of the object comprises a size of the object. Determining whether to perform the foreground pixel fullness analysis on the bounding box of the object may further include: determining that the input status of the object tracker indicates that the object tracker is a new tracker or a split-new tracker; determining whether the size of the object in the current video frame satisfies a size threshold; and determining whether to perform the foreground pixel fullness analysis on the bounding box of the object when performing the pixel level analysis for the object based on whether the object tracker is a new tracker or a split-new tracker and based on whether the size of the object satisfies the size threshold.

In some aspects, the methods, apparatuses, and computer-readable medium described above for maintaining one or more object trackers for one or more video frames using a foreground pixel fullness analysis can include: determining that the size of the object in the current video frame satisfies the size threshold; and performing, based on the size of the object satisfying the size threshold, the first pixel level analysis with the foreground pixel fullness analysis using a first foreground pixel fullness ratio.

In some aspects, the methods, apparatuses, and computer-readable medium described above for maintaining one or more object trackers for one or more video frames using a foreground pixel fullness analysis can include: based on both a result of the foreground pixel fullness analysis and a result of the first pixel level analysis indicating a positive result, maintaining the object tracker for the one or more video frames.

In some aspects, the methods, apparatuses, and computer-readable medium described above for maintaining one or more object trackers for one or more video frames using a foreground pixel fullness analysis can include: based on a result of the foreground pixel fullness analysis being contrary to a result of the first pixel level analysis, or based on both the result of the foreground pixel fullness analysis and the result of the first pixel level analysis indicating a negative result, deferring the determination of the output status of the object tracker to the subsequent video frame.

In some aspects, determining whether to perform the foreground pixel fullness analysis on the bounding box of the object can include: determining that the size of the object in the current video frame does not satisfy the size threshold; determining that the object tracker is a new tracker; and performing, based on the size of the object in the current video frame not satisfying the size threshold and the object tracker being the new tracker, performing the first pixel level analysis with the foreground pixel fullness analysis using a second foreground pixel fullness ratio, the second foreground pixel fullness ratio being higher than the first foreground pixel fullness ratio.

In some aspects, the methods, apparatuses, and computer-readable medium described above for maintaining one or more object trackers for one or more video frames using a foreground pixel fullness analysis can include: based on both a result of the foreground pixel fullness analysis and a result of the first pixel level analysis indicating a positive result, maintaining the object tracker for the one or more video frames.

In some aspects, the methods, apparatuses, and computer-readable medium described above for maintaining one or more object trackers for one or more video frames using a foreground pixel fullness analysis can include: based on a result of the foreground pixel fullness analysis being contrary to a result of the first pixel level analysis, or based on both the result of the foreground pixel fullness analysis and the result of the first pixel level analysis indicating a negative result, deferring the determination of the output status of the object tracker to the subsequent video frame.

In some aspects, determining whether to perform the foreground pixel fullness analysis on the bounding box of the object can include: determining that the size of the object in the current video frame does not satisfy the size threshold; determining that the object tracker is a split-new tracker; and performing, based on the size of the object in the current video frame not satisfying the size threshold and the object tracker being the split-new tracker, the first pixel level analysis without the foreground pixel fullness analysis.

In some aspects, the methods, apparatuses, and computer-readable medium described above for maintaining one or more object trackers for one or more video frames using a foreground pixel fullness analysis can include: based on both a result of the foreground pixel fullness analysis and a result of the first pixel level analysis indicating a positive result, maintaining the object tracker for the one or more video frames.

In some aspects, the methods, apparatuses, and computer-readable medium described above for maintaining one or more object trackers for one or more video frames using a foreground pixel fullness analysis can include: based on a result of the foreground pixel fullness analysis being contrary to a result of the first pixel level analysis, or based on both the result of the foreground pixel fullness analysis and the result of the first pixel level analysis indicating a negative result, deferring the determination of the output status of the object tracker to the subsequent video frame.

In some aspects, the methods, apparatuses, and computer-readable medium described above for maintaining one or more object trackers for one or more video frames using a foreground pixel fullness analysis can include: detecting a blob in the current video frame using background subtraction, the blob including pixels of at least a portion of the object in the current video frame.

In some aspects, the apparatus includes a camera for capturing the one or more video frames. In some aspects, the apparatus includes a display for displaying the one or more video frames. In some implementations, the apparatus includes a mobile device comprising a camera for capturing the one or more video frames and a display for displaying the one or more video frames.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 11 is a flowchart illustrating an example of a process of maintaining blob trackers, in accordance with some embodiments.

DETAILED DESCRIPTION

Figure 1:
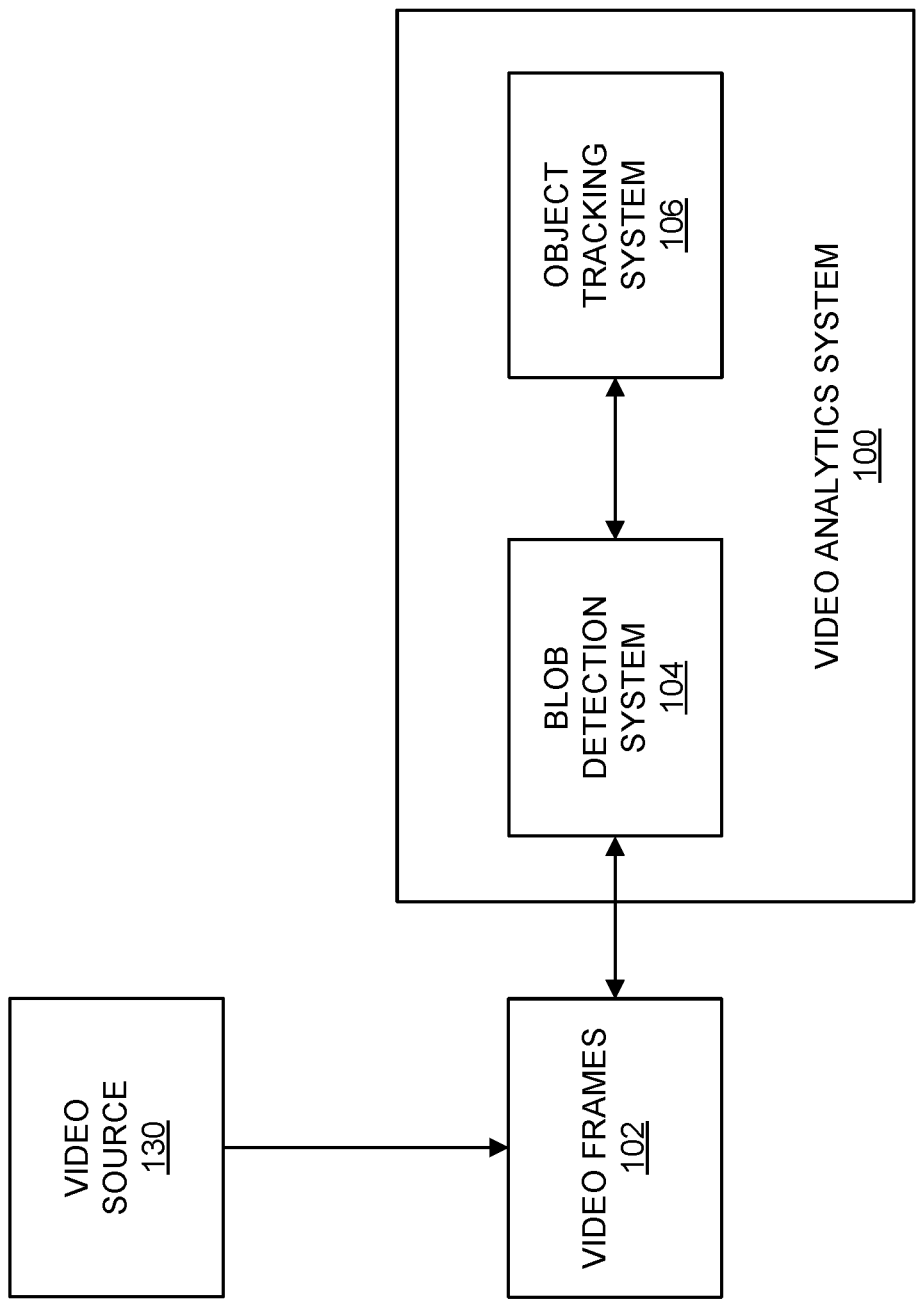
FIG. 1 is a block diagram illustrating an example of a system including a video source and a video analytics system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a sequence of video frames from a video source and can process the video sequence to perform a variety of tasks. One example of a video source can include an Internet protocol camera (IP camera) or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and can send an alert or alarm to a central control room to alert a user of the event of interest.

As described in more detail herein, a video analytics system can generate and detect foreground blobs that can be used to perform various operations, such as object tracking (also called blob tracking) or some of the other operations described above. A blob tracker (also referred to as an object tracker) can be used to track one or more blobs in a video sequence. In some cases, a tracked blob can be considered as an object. A blob tracker can start to be associated with a blob in one frame, and can continue to be associated with the blob across one or more subsequent frames. False positive blobs may be generated during the blob detection process, and may be output as incorrect objects to the video analytics system after the object/blob tracking process. As described in more detail below, systems and methods are described herein for determining the status of objects (and their blob trackers) as true or false positives for object tracking. Details of an example video analytics system with blob detection and object tracking are described below with respect to FIG. 1-FIG. 4.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection system 104 and an object tracking system 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection system 104 can detect one or more blobs in video frames (e.g., video frames 102) of a video sequence, and the object tracking system 106 can track the one or more blobs across the frames of the video sequence. As used herein, a blob refers to foreground pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding region. A bounding region of a blob or tracker can include a bounding box, a bounding circle, a bounding ellipse, or any other suitably-shaped region representing a tracker and/or a blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection system 104 and the object tracking system 106, the video analytics system 100 can perform blob generation and detection for each frame or picture of a video sequence. For example, the blob detection system 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection system 104 and the object tracking system 106 are described with respect to FIGS. 3-4.

Figure 2:
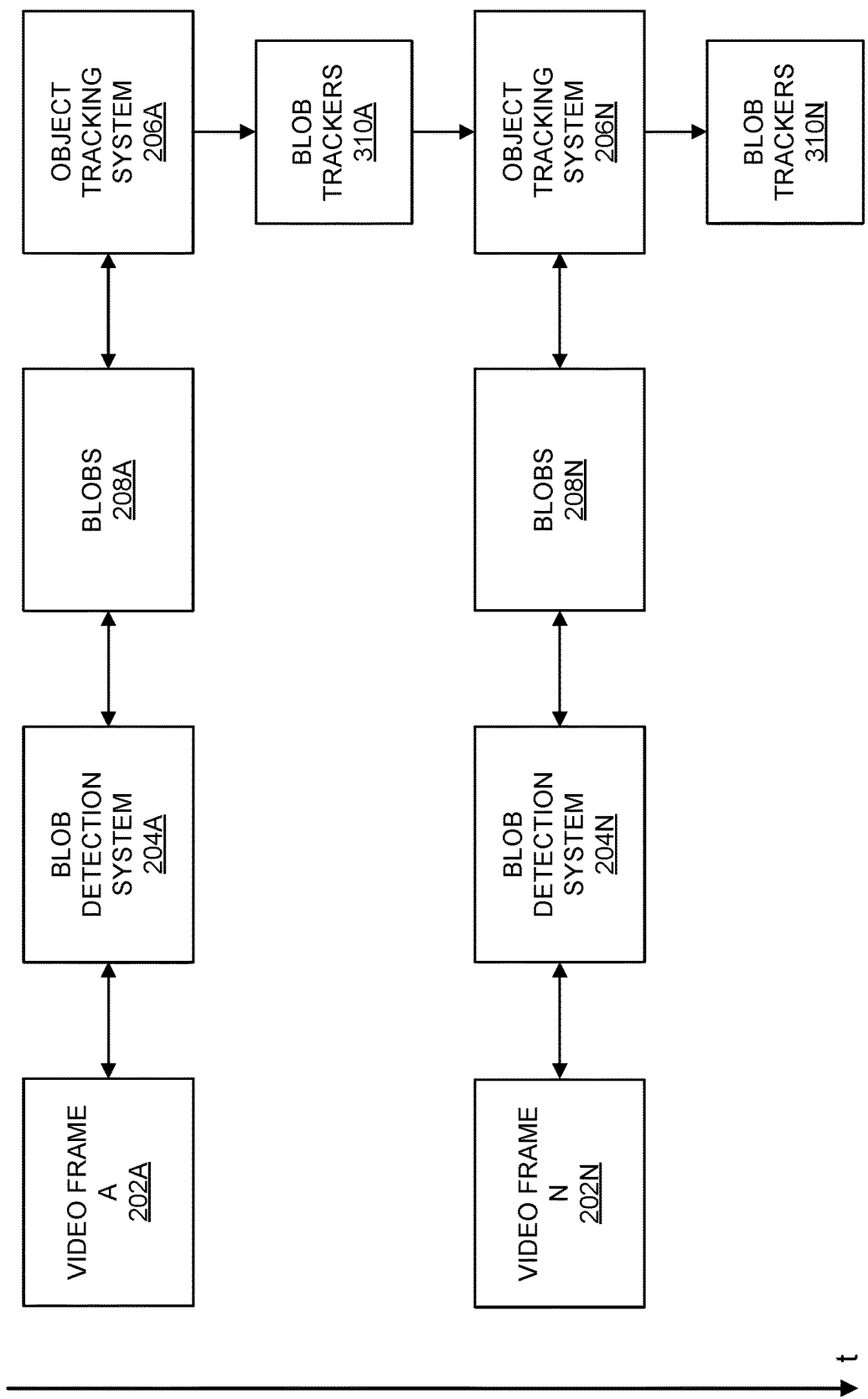
FIG. 2 is an example of a video analytics system processing video frames, in accordance with some examples.

FIG. 2 is an example of the video analytics system (e.g., video analytics system 100) processing video frames across time t. As shown in FIG. 2, a video frame A 202A is received by a blob detection system 204A. The blob detection system 204A generates foreground blobs 208A for the current frame A 202A. After blob detection is performed, the foreground blobs 208A can be used for temporal tracking by the object tracking system 206A. Costs (e.g., a cost including a distance, a weighted distance, or other cost) between blob trackers and blobs can be calculated by the object tracking system 206A. The object tracking system 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection system 204N generates foreground blobs 208N for the frame N 202N. The object tracking system 206N can then perform temporal tracking of the blobs 208N. For example, the object tracking system 206N obtains the blob trackers 310A that were updated based on the prior video frame A 202A. The object tracking system 206N can then calculate a cost and can associate the blob trackers 310A and the blobs 208N using the newly calculated cost. The blob trackers 310A can be updated according to the data association to generate updated blob trackers 310N.

Figure 3:
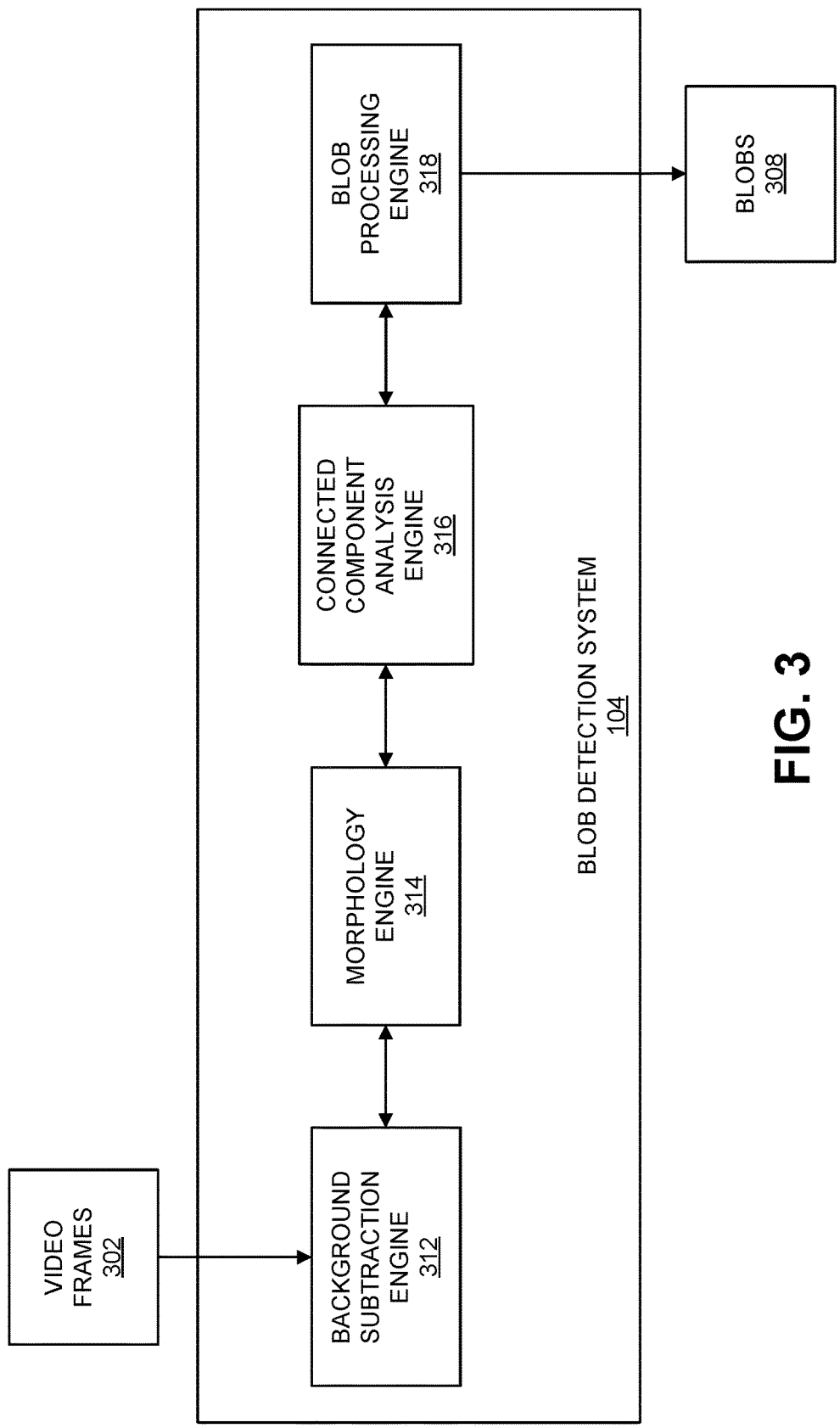
FIG. 3 is a block diagram illustrating an example of a blob detection system, in accordance with some examples.

FIG. 3 is a block diagram illustrating an example of a blob detection system 104. Blob detection is used to segment moving objects from the global background in a scene. The blob detection system 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N\left(X_t \mid \mu_{i,t}, \sum_{i,t}\right)$$

Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM change over time after one frame (at time t) is processed. In GMM or any other learning based background subtraction, the current pixel impacts the whole model of the pixel location based on a learning rate, which could be constant or typically at least the same for each pixel location. A background subtraction method based on GMM (or other learning based background subtraction) adapts to local changes for each pixel. Thus, once a moving object stops, for each pixel location of the object, the same pixel value keeps on contributing to its associated background model heavily, and the region associated with the object becomes background.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. In some implementation of connected component analysis, a set of bounding boxes are returned in a way that each bounding box contains one component of connected pixels. One example of the connected component analysis performed by the connected component analysis engine 316 is implemented as follows:

```
for each pixel of the foreground mask {
-if it is a foreground pixel and has not been processed, the following steps
apply:
    -Apply FloodFill function to connect this pixel to other foreground
    and generate a connected component
    -Insert the connected component in a list of connected components.
    -Mark the pixels in the connected component as being processed }
```

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection system 104. In some examples, there may be a filtering process for the connected components (bounding boxes). For instance, the blob processing engine 318 can perform content-based filtering of certain blobs. In some cases, a machine learning method can determine that a current blob contains noise (e.g., foliage in a scene). Using the machine learning information, the blob processing engine 318 can determine the current blob is a noisy blob and can remove it from the resulting blobs that are provided to the object tracking system 106. In some cases, the blob processing engine 318 can filter out one or more small blobs that are below a certain size threshold (e.g., an area of a bounding box surrounding a blob is below an area threshold). In some examples, there may be a merging process to merge some connected components (represented as bounding boxes) into bigger bounding boxes. For instance, the blob processing engine 318 can merge close blobs into one big blob to remove the risk of having too many small blobs that could belong to one object. In some cases, two or more bounding boxes may be merged together based on certain rules even when the foreground pixels of the two bounding boxes are totally disconnected. In some embodiments, the blob detection system 104 does not include the blob processing engine 318, or does not use the blob processing engine 318 in some instances. For example, the blobs generated by the connected component analysis engine 316, without further processing, can be input to the object tracking system 106 to perform blob and/or object tracking.

In some implementations, density based blob area trimming may be performed by the blob processing engine 318. For example, when all blobs have been formulated after post-filtering and before the blobs are input into the tracking layer, the density based blob area trimming can be applied. A similar process is applied vertically and horizontally. For example, the density based blob area trimming can first be performed vertically and then horizontally, or vice versa. The purpose of density based blob area trimming is to filter out the columns (in the vertical process) and/or the rows (in the horizontal process) of a bounding box if the columns or rows only contain a small number of foreground pixels.

The vertical process includes calculating the number of foreground pixels of each column of a bounding box, and denoting the number of foreground pixels as the column density. Then, from the left-most column, columns are processed one by one. The column density of each current column (the column currently being processed) is compared with the maximum column density (the column density of all columns). If the column density of the current column is smaller than a threshold (e.g., a percentage of the maximum column density, such as 10%, 20%, 30%, 50%, or other suitable percentage), the column is removed from the bounding box and the next column is processed. However, once a current column has a column density that is not smaller than the threshold, such a process terminates and the remaining columns are not processed anymore. A similar process can then be applied from the right-most column. One of ordinary skill will appreciate that the vertical process can process the columns beginning with a different column than the left-most column, such as the right-most column or other suitable column in the bounding box.

The horizontal density based blob area trimming process is similar to the vertical process, except the rows of a bounding box are processed instead of columns. For example, the number of foreground pixels of each row of a bounding box is calculated, and is denoted as row density. From the top-most row, the rows are then processed one by one. For each current row (the row currently being processed), the row density is compared with the maximum row density (the row density of all the rows). If the row density of the current row is smaller than a threshold (e.g., a percentage of the maximum row density, such as 10%, 20%, 30%, 50%, or other suitable percentage), the row is removed from the bounding box and the next row is processed. However, once a current row has a row density that is not smaller than the threshold, such a process terminates and the remaining rows are not processed anymore. A similar process can then be applied from the bottom-most row. One of ordinary skill will appreciate that the horizontal process can process the rows beginning with a different row than the top-most row, such as the bottom-most row or other suitable row in the bounding box.

One purpose of the density based blob area trimming is for shadow removal. For example, the density based blob area trimming can be applied when one person is detected together with his or her long and thin shadow in one blob (bounding box). Such a shadow area can be removed after applying density based blob area trimming, since the column density in the shadow area is relatively small. Unlike morphology, which changes the thickness of a blob (besides filtering some isolated foreground pixels from formulating blobs) but roughly preserves the shape of a bounding box, such a density based blob area trimming method can dramatically change the shape of a bounding box.

Figure 4:
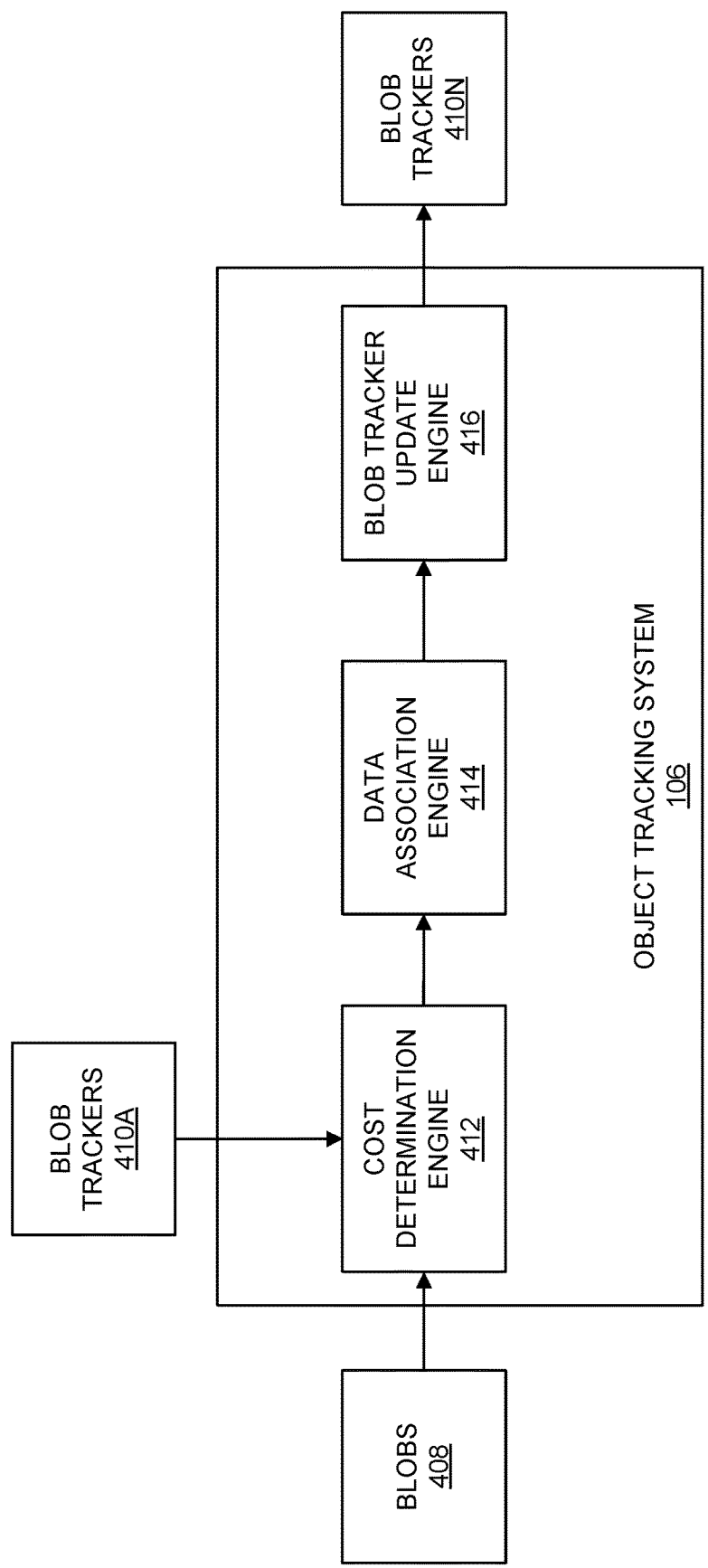
FIG. 4 is a block diagram illustrating an example of an object tracking system, in accordance with some examples.

Once the blobs are detected and processed, object tracking (also referred to as blob tracking) can be performed to track the detected blobs. FIG. 4 is a block diagram illustrating an example of an object tracking system 106. The input to the blob/object tracking is a list of the blobs 408 (e.g., the bounding boxes of the blobs) generated by the blob detection system 104. In some cases, a tracker is assigned with a unique ID, and a history of bounding boxes is kept. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking system 106 can obtain the blobs 408 of a current video frame from the blob detection system 104. The cost determination engine 412 can also obtain the blob trackers 410A updated from the previous video frame (e.g., video frame A 202A). A cost function can then be used to calculate costs between the blob trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker (or tracker bounding box) with a corresponding blob (or blob bounding box) and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible. Regardless of the association technique that is used, the data association engine 414 can rely on the distance between the blobs and trackers.

Once the association between the blob trackers 410A and blobs 408 has been completed, the blob tracker update engine 416 can use the information of the associated blobs, as well as the trackers' temporal statuses, to update the status (or states) of the trackers 410A for the current frame. Upon updating the trackers 410A, the blob tracker update engine 416 can perform object tracking using the updated trackers 410N, and can also provide the updated trackers 410N for use in processing a next frame.

The status or state of a blob tracker can include the tracker's identified location (or actual location) in a current frame and its predicted location in the next frame. The location of the foreground blobs are identified by the blob detection system 104. However, as described in more detail below, the location of a blob tracker in a current frame may need to be predicted based on information from a previous frame (e.g., using a location of a blob associated with the blob tracker in the previous frame). After the data association is performed for the current frame, the tracker location in the current frame can be identified as the location of its associated blob(s) in the current frame. The tracker's location can be further used to update the tracker's motion model and predict its location in the next frame. Further, in some cases, there may be trackers that are temporarily lost (e.g., when a blob the tracker was tracking is no longer detected), in which case the locations of such trackers also need to be predicted (e.g., by a Kalman filter). Such trackers are temporarily not shown to the system. Prediction of the bounding box location helps not only to maintain certain level of tracking for lost and/or merged bounding boxes, but also to give more accurate estimation of the initial position of the trackers so that the association of the bounding boxes and trackers can be made more precise.

As noted above, the location of a blob tracker in a current frame may be predicted based on information from a previous frame. One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) (e.g., the blob(s) bounding box(es)) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, the state or status of a tracker can also, or alternatively, include a tracker's temporal state or status. The temporal state of a tracker can include a new state indicating the tracker is a new tracker that was not present before the current frame, a normal state for a tracker that has been alive for a certain duration and that is to be output as an identified tracker-blob pair to the video analytics system, a lost state for a tracker that is not associated or matched with any foreground blob in the current frame, a dead state for a tracker that fails to associate with any blobs for a certain number of consecutive frames (e.g., two or more frames, a threshold duration, or the like), and/or other suitable temporal status. Another temporal state that can be maintained for a blob tracker is a duration of the tracker. The duration of a blob tracker includes the number of frames (or other temporal measurement, such as time) the tracker has been associated with one or more blobs.

There may be other state or status information needed for updating the tracker, which may require a state machine for object tracking. Given the information of the associated blob(s) and the tracker's own status history table, the status also needs to be updated. The state machine collects all the necessary information and updates the status accordingly. Various statuses of trackers can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration (a threshold duration) has passed, the tracker may be promoted to be a normal tracker. A normal tracker is output as an identified tracker-blob pair. For example, a tracker-blob pair is output at the system level as an event (e.g., presented as a tracked object on a display, output as an alert, and/or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

As noted above, blob trackers can have various temporal states, such as a new state for a tracker of a current frame that was not present before the current frame, a lost state for a tracker that is not associated or matched with any foreground blob in the current frame, a dead state for a tracker that fails to associate with any blobs for a certain number of consecutive frames (e.g., 2 or more frames, a threshold duration, or the like), a normal state for a tracker that is to be output as an identified tracker-blob pair to the video analytics system, or other suitable tracker states. Another temporal state that can be maintained for a blob tracker is a duration of the tracker. The duration of a blob tracker includes the number of frames (or other temporal measurement, such as time) the tracker has been associated with one or more blobs.

A blob tracker can be promoted or converted to be a normal tracker when certain conditions are met. A tracker is given a new state when the tracker is created and its duration of being associated with any blobs is 0. The duration of the blob tracker can be monitored, as well as its temporal state (new, lost, hidden, or the like). As long as the current state is not hidden or lost, and as long as the duration is less than a threshold duration T1, the state of the new tracker is kept as a new state. A hidden tracker may refer to a tracker that was previously normal (thus independent), but later merged into another tracker C. In order to enable this hidden tracker to be identified later due to the anticipation that the merged object may be split later, it is still kept as associated with the other tracker C which is containing it.

The threshold duration T1 is a duration that a new blob tracker must be continuously associated with one or more blobs before it is converted to a normal tracker (transitioned to a normal state). The threshold duration can be a number of frames (e.g., at least N frames) or an amount of time. In one illustrative example, a blob tracker can be in a new state for 30 frames (corresponding to one second in systems that operate using 30 frames per second), or any other suitable number of frames or amount of time, before being converted to a normal tracker. If the blob tracker has been continuously associated with blobs for the threshold duration (duration ≥T1), the blob tracker is converted to a normal tracker by being transitioned from a new status to a normal status If, during the threshold duration T1, the new tracker becomes hidden or lost (e.g., not associated or matched with any foreground blob), the state of the tracker can be transitioned from new to dead, and the blob tracker can be removed from blob trackers maintained for a video sequence (e.g., removed from a buffer that stores the trackers for the video sequence).

In some examples, objects may intersect or group together, in which case the blob detection system can detect one blob (a merged blob) that contains more than one object of interest (e.g., multiple objects that are being tracked). For example, as a person walks near another person in a scene, the bounding boxes for the two persons can become a merged bounding box (corresponding to a merged blob). The merged bounding box can be tracked with a single blob tracker (referred to as a container tracker), which can include one of the blob trackers that was associated with one of the blobs making up the merged blob, with the other blob(s)' trackers being referred to as merge-contained trackers. For example, a merge-contained tracker is a tracker (new or normal) that was merged with another tracker when two blobs for the respective trackers are merged, and thus became hidden and carried by the container tracker.

A tracker that is split from an existing tracker is referred to as a split-new tracker. The tracker from which the split-new tracker is split is referred to as a parent tracker or a split-from tracker. In some examples, a split-new tracker can result from the association (or matching or mapping) of multiple blobs to one active tracker. For instance, one active tracker can only be mapped to one blob. All the other blobs (the blobs remaining from the multiple blobs that are not mapped to the tracker) cannot be mapped to any existing trackers. In such examples, new trackers will be created for the other blobs, and these new trackers are assigned the state "split-new." Such a split-new tracker can be referred to as the child tracker of the original tracker its associated blob is mapped to. The corresponding original tracker can be referred to as the parent tracker (or the split-from tracker) of the child tracker. In some examples, a split-new tracker can also result from a merge-contained tracker. As noted above, a merge-contained tracker is a tracker that was merged with another tracker (when two blobs for the respective trackers are merged) and thus became hidden and carried by the container tracker. A merge-contained tracker can be split from the container tracker if the container tracker is active and the container tracker has a mapped blob in the current frame.

As previously described, the threshold duration T1 is a duration that a new blob tracker must be continuously associated with one or more blobs before it is converted to a normal tracker. A threshold duration T2 is a duration a split-new tracker must be continuously associated with one or more blobs before it is converted to a normal tracker. In some examples, the threshold duration T2 used for split-new trackers can be the same as the threshold duration T1 used for new trackers (e.g., 20 frames, 30 frames, 32 frames, 60 frames, 1 second, 2 seconds, or other suitable duration or number of frames). In other examples, the threshold duration T2 for split-new trackers can be a shorter duration than the threshold duration T1 used for new trackers. For example, T2 can be set to a smaller value than T1. In some implementations, the duration T2 can be proportional to T1. In one illustrative example, T1 may indicate one second of duration, and thus is equal to the (average) frame rate of the input video (e.g., 30 frames at 30 frames per second, 60 frames at 60 frames per second, or other suitable duration and frame rate). In such an example, the duration T2 can be set to half of T1.

As described above, blob detection can be performed for one or more video frames to generate or identify blobs for the one or more video frames. Temporal information of the blobs can be used to identify stable objects or blobs so that a tracking layer can be established. For example, a cost between the blob trackers and blobs can be calculated, and data association can be performed to associate the trackers and blobs using the calculated costs (e.g., using a cost matrix). The blob trackers can then be updated according to the data association, in which case the updated state and location can be calculated and the tracking of the current frame can be fulfilled.

Object tracking attempts to detect and track objects and to output metadata about the detected objects. However, a video analytics system may detect false positive blobs and associated objects. For example, blob detection may detect one or more false positive blobs for the false positive objects in a frame. A false positive blob may be output as a tracked object when a blob tracker associated with the false positive blob is converted to a normal status, causing a false positive object to be tracked. A tracker used to track a false positive object (and the corresponding blob(s)) is referred to as a false positive tracker.

False positive objects can include background objects that should not be tracked, including moving foliage due to wind or other external event, an object (e.g., umbrella, flag, balloon, or other object) that is generally static but has some movement due to external elements (e.g., wind, a person brushing the object, or other cause), glass doors, objects detected due to lighting condition changes, isolated shadows, objects detected due to shadows of real objects, and any other types of background objects that may have movement.

False positive objects are common and can have a serious impact on the performance of the video analytics system. Tracking of false positive objects can even cause the system to trigger false alarms. In some cases, false positive objects can be irregular in size and can have an irregular or arbitrary moving direction or velocity magnitude compared to real objects. In some cases, false positive objects can remain still (e.g., objects due to lighting condition changes, such as a shadow from overcast cloud, or other suitable false positive objects).

Figure 5A:
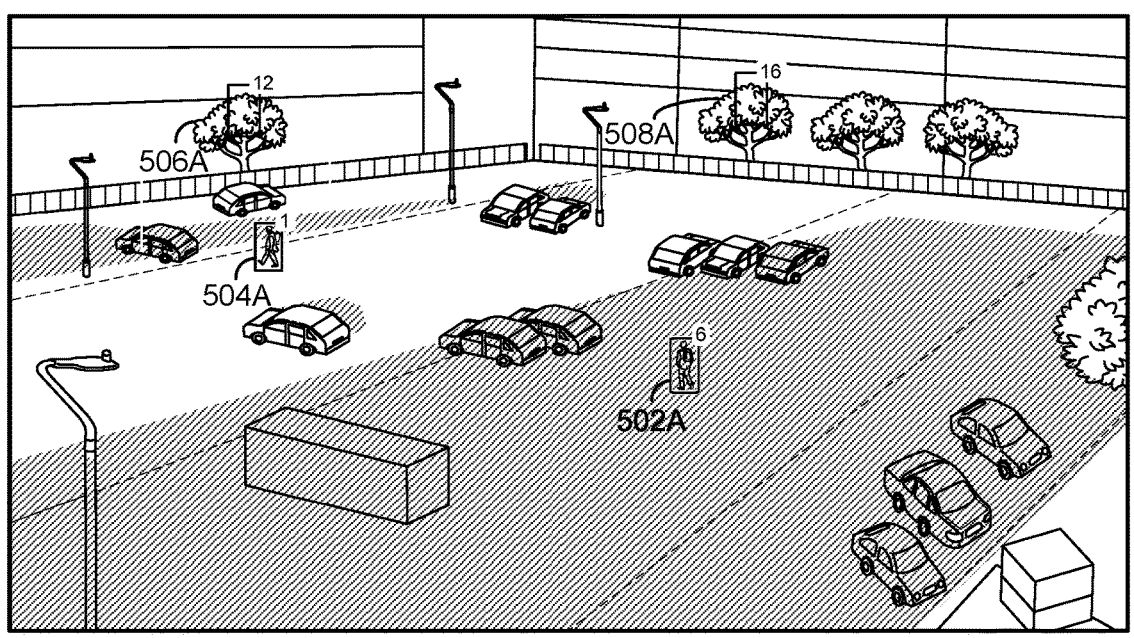
FIG. 5A is an illustration of a video frame of an environment in which various objects are tracked, in accordance with some examples.

FIG. 5A illustrates an example of a video frame 500A of an environment in which various objects are tracked. The video frame 500A can be generated by a camera system (e.g., one or more IP cameras) monitoring a parking lot. The objects being tracked for the video frame 500A include a person 502A, a person 504A, a portion of a tree 506A, and a portion of a tree 508A. The tracked objects are shown with their respective bounding boxes. The person 502A and person 504A are real objects (referred to herein as true positive objects), and are tracked with a blob tracker with tracker ID 6 and a blob tracker with tracker ID 1, respectively. However, the trees 506A and 508A are false positive objects that were detected during blob detection, due to slight movement of the portions of the trees 506A and 508A being tracked. The trackers (with IDs 12 and 16) associated with the blobs detected for the trees 506A and 508A are continuously associated with the trees 506A and 508A for a threshold duration, and thus are converted to a normal status. As a result, the tracker with ID 12 is output for tracking the portion of the tree 506A and the tracker with ID 16 is output for tracking the portion of the tree 508A.

Figure 5B:
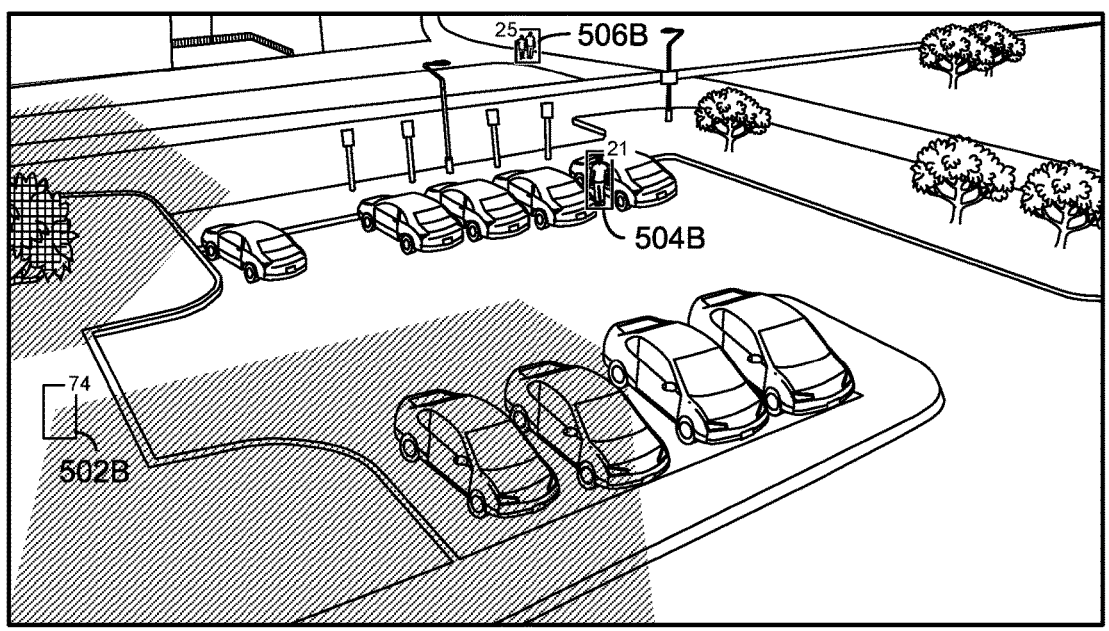
FIG. 5B is an illustration of a video frame of an environment in which various objects are tracked, in accordance with some examples.

FIG. 5B illustrates another example of a video frame 500B of an environment in which various objects are tracked. The video frame 500B can be generated by a camera system (e.g., one or more IP cameras) monitoring a parking lot. The objects being tracked for the video frame 500B include a portion of a shadow 502B, a person 504B, a group of persons 506B. The tracked objects are shown with their respective bounding boxes. The person 504B and persons 506B are true positive objects that should be tracked. Blob trackers with tracker ID 21 and tracker ID 25 are used to track the person 504B and the persons 506B, respectively. The shadow 502B is a false positive object detected during blob detection, due to movement of the portion of the shadow 502B as the sun moves. The tracker (with ID 74) associated with the blob detected for the portion of the shadow 502B is continuously associated with the portion of the shadow 502B for a threshold duration, and is then converted to a normal status. When converted to normal, the tracker with ID 74 is output for tracking the portion of the shadow 502B.

Figure 5C:
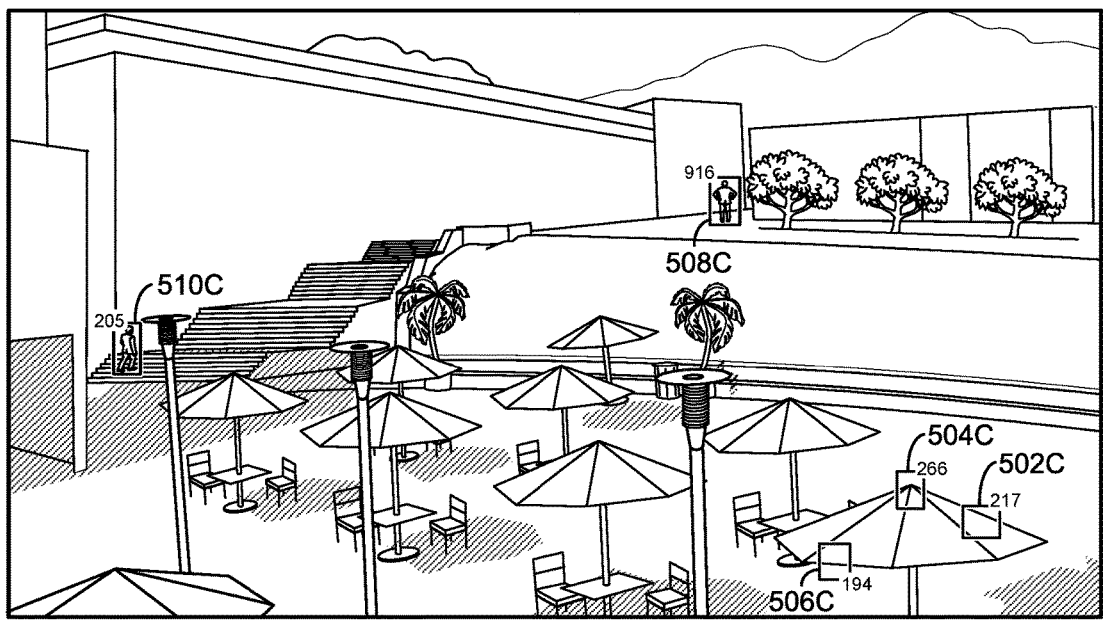
FIG. 5C is an illustration of a video frame of an environment in which various objects are tracked, in accordance with some examples.

FIG. 5C illustrates another example of a video frame 500C of an environment in which various objects are tracked. The video frame 500C can be generated by a camera system (e.g., one or more IP cameras) monitoring a seating area of a building. The objects being tracked for the video frame 500C include a side portion 502C of an umbrella, a top portion 504C of an umbrella, a front portion 506C of an umbrella, a person 508C, and a person 510C. The tracked objects are shown with their respective bounding boxes. The person 508C and person 510C are real objects that are of interest for tracking by a video analytics system. Blob trackers with tracker ID 916 and tracker ID 205 are used to track the person 508C and the person 510C, respectively. The side portion 502C, the top portion 504C, and the front portion 506C of the umbrella are false positive objects detected during blob detection, due to movement of the umbrella (e.g., due to wind, due a person moving the umbrella, due to rain, or other cause). The trackers (trackers with ID 217, ID 266, and ID 194) associated with the blobs detected for the side portion 502C, the top portion 504C, and the front portion 506C of the umbrella are continuously associated with the portions 502C, 504C, 506C for a threshold duration, causing the trackers to be converted to a normal status. When converted to normal, the trackers with ID 217, ID 266, and ID 194 are output for tracking the side portion 502C, the top portion 504C, and the front portion 506C of the umbrella, as shown in FIG. 5C.

Figure 5D:
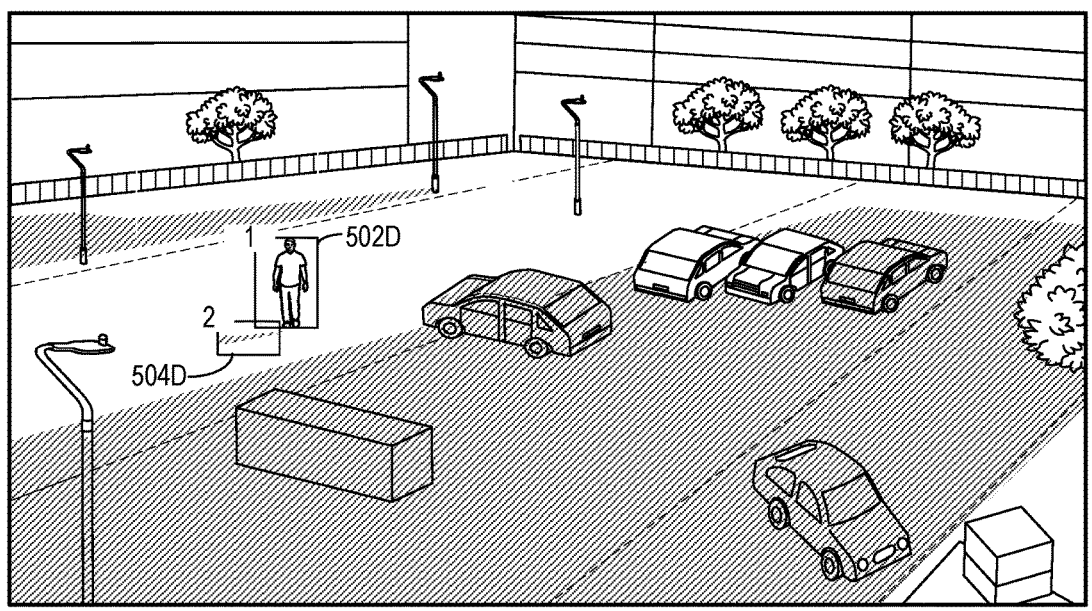
FIG. 5D is an illustration of a video frame of an environment in which various objects are tracked, in accordance with some examples.

FIG. 5D illustrates an example of a video frame 500D of an environment in which various objects are tracked. The video frame 500D can be generated by a camera system (e.g., one or more IP cameras) monitoring a parking lot. The objects being tracked for the video frame 500D include a person 502D and a shadow 504D. The tracked person 502D and shadow 504D are shown with their respective bounding boxes. Person 502D is a real object (referred to herein as true positive objects) and is tracked with a blob tracker with a tracker ID 1. Shadow 504D is also be tracked with a tracker ID 2. However, shadow 504D (of person 502D) is a false positive object detected during blob detection due to, for example, a slight movement of the shadow caused corresponding to a slight movement of person 502D. The tracker (with ID 2) associated with the blobs detected for shadow 504D may be continuously associated with shadow 504D for a threshold duration, and thus is converted to a normal status. As a result, the tracker with ID 2 is output for tracking shadow 504D.

Figure 5E:
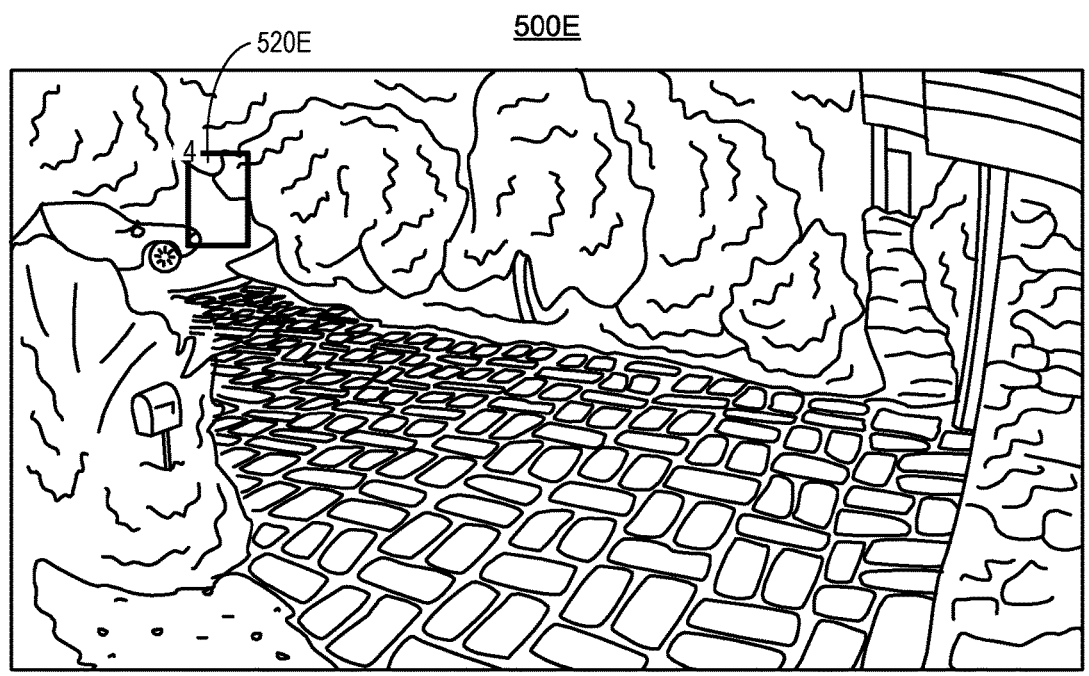
FIG. 5E is an illustration of a video frame of an environment in which various objects are tracked, in accordance with some examples.

FIG. 5E illustrates another example of a video frame 500E of an environment in which various objects are tracked. The video frame 500E can be generated by a camera system monitoring a front porch of a building. The object being tracked for the video frame 500E include foliage 520E and the portion is enclosed within a bounding box. Foliage 520E is a false positive object detected during blob detection due to, for example, a slight movement of the foliage (e.g., due to wind). The tracker (with ID 4) associated with the one or more blobs detected for foliage 520E may be continuously associated with foliage 520E for a threshold duration, in which case the tracker tracking the one or more blobs will be converted to a normal status. As a result, the tracker with ID 4 is output for tracking foliage 520E.

One short duration technique for handling false positive objects can include determining, after a fixed duration of time (e.g., a half second, one second, or other duration), whether a currently tracked object should be considered as a true positive object or a false positive object. For instance, the bounding box history of a tracker (of an object) within the fixed duration can be relied upon to determine if the tracker (and the tracked object) should be considered as true positive or false positive. False positives can be detected and removed based on common characteristics of false positive objects (for which blobs are generated), such as objects that remain still or static (frozen or freeze objects) and objects that move in an arbitrary direction and/or with irregular direction and speed (jumping objects). Such a technique for detecting false positives determines within a very short duration whether an object is a false positive or not, and is largely based on the movement of the object. For example, a first type of tracker detection can be applied to determine whether the object moves in a relatively static or limited manner (called a freeze or frozen tracker). As another example, a second type of tracker detection can be applied to determine if the object has irregular motion or size (called a jumping tracker), which can be based on one or more of object size inconsistency, motion direction inconsistency, and motion magnitude inconsistency. If any inconsistency is detected, irregular motion and/or size is detected for the tracker. If a tracker has irregular motion or is detected as freeze tracker, it will be determined to be a false positive tracker.

If the tracker (and object) is considered as a true positive, the tracker may be transited to a normal tracker (that the status has been confirmed and will be used for output to the end-to-end video analytics system). If the tracker (and object) is considered as false positive, the tracker may be killed and no longer maintained. However, if an object is a true positive object, but has been incorrectly determined to be a false positive and is killed, it will take at least the same fixed duration (e.g., half second, one second, or other duration) after the object tracker has been killed for the object to go to the stage where it will be analyzed again to determine if it should be output as a true positive. Further, when the tracker goes to this stage, the same false positive detection mechanism will be applied to determine whether the object should be removed or not, in which case the object may again be determined to a be a false positive.

In some cases, a long duration technique can be used for handling false positive objects. The long duration technique can be based on bounding box history of a tracker. For example, a long duration true-false positive detection method can use the bounding box history of a tracker to derive a confidence level for the tracker, which can be used to determine whether the tracker and its associated blob will be a true positive or a false positive. Instead of outputting or killing a tracker immediately, the system can wait until a next cycle of the long duration true-false positive detection to determine whether the tracker should be output or killed. In addition, such a framework may enable a pixel level analysis, such as correlation, to be further used to confirm if an object is a true positive.

However, various issues can arise with false positive removal mechanisms. For example, for some false positive objects, if the movement and the size of the object tends to be regular, the short and long duration false positive removal tools may still not be able to remove such objects and may output them to the system incorrectly (as false positive objects). In addition, correlation is a strong tool to remove false positive if the pixels within the bounding boxes appear to be moving but are not really moving (e.g., they may have changes in intensity due to the fact of lighting condition change). Furthermore, when objects such as foliage move by a small amount (e.g., due to wind or other external factor), the correlation might not be able to determine an object generated under such a situation is a true positive or not, since there may be a small correlation in such cases, which will likely not be discriminative enough. Even further, when big objects are present in the scene, there lacks a more accurate criteria to determine whether the objects are true positives or not. Even when big objects are present and there are ways to determine an object is not a true positive object yet, the complexity associated with the big object is relatively high, since conditions for checking big objects may be much easier to meet (no duration constraint basically), and thus a pixel level analysis would be required with a much higher frequency than normal objects.

Systems and methods are described herein that provide an appearance based true-false positive detection process for determining the status of objects (and their blob trackers) as true or false positive objects for object tracking using appearance characteristics of the objects. In some examples, the object tracking system 106 can perform the methods described herein. In other examples, one or more other components of a video analytics system can perform the methods described herein. The proposed systems and methods may work independently or jointly to improve object tracking.

The appearance based true-false positive detection process can apply an Appearance Model based False positive Removal (AMFR) process, which itself works as a strong indication of whether a current object is true positive or a false positive. In addition, in some implementations, since the AMFR process requires pixel level calculations, the appearance based true-false positive detection process can also rely on bounding box history to reduce complexity in the true-false positive detection process. Altogether, the appearance based true-false positive detection process can fit into the video analytics system without a noticeable complexity increase, and while significantly reducing the false positive rate.

The appearance characteristics used by the AMFR process can include color characteristics (e.g., an appearance model, a color mass center, and/or other color characteristics) that are determined for a tracker. The color characteristics can be based on the pixels in a region of a frame included in a tracker's bounding region (e.g., a bounding box of the tracker). Color characteristics of a tracker can be determined in multiple frames of a video sequence, and can be compared to determine a difference between the color characteristics in the multiple frames. The status of the blob tracker can then be determined based on the difference between the color characteristics. For example, a determined status of a tracker can include outputting the tracker immediately, removing the tracker from a list of trackers maintained for the video sequence (also referred to as killing the tracker), and transitioning the tracker to an intermediate status. A tracker with an intermediate status can be kept or maintained for future iterations of the true-false positive detection process, in which case there is no need to either kill or output the tracker immediately.

In some examples, the color characteristics of a blob tracker can be represented using one or more appearance models determined for the blob tracker. An appearance model of a tracker can includes one or more color characteristics of pixels (of a video frame) included in a bounding box of the tracker. For example, the one or more color characteristics can be calculated using the values of pixels of a given frame that are included within the bounding box of the tracker. In some examples, the one or more color characteristics of an appearance model can include a color feature space (e.g., a histogram) of pixels included in the bounding box, a color mass center of pixels included in the bounding box, or a combination thereof. In some cases, the color feature space includes a histogram statistically describing the color characteristics of a patch of pixels in a video frame within a tracker bounding box. In some implementations, the color feature space can be the quantized color spaces, using the luminance (Y) and hue (H) components of an HSV color space. In some implementations, the features of the feature space may be from the Y, U and V components of a YUV color space (e.g., the YUV 4:2:0 space, YUV 4:4:4 space, YUV 4:2:2 space, or other suitable YUV color space). Any other suitable color space can be used.

In some examples, the color mass center (or mass center) of a tracker can be calculated using an appearance model of the tracker, such as by counting the mass center of the feature space applied to the pixels of a given frame that are within the bounding box of the tracker. For instance, an appearance model (e.g., a color probability model, histogram, or the like) can first be determined. For example, a color probability model may be determined by calculating the probability of the feature value in each pixel location. The mass center of all pixels within the whole bounding box can then be calculated according to the per-pixel probability model.

In some implementations, when calculating the color probability model, the color space of the tracker bounding box may need to be quantized so that the probability model is limited to contain only up to a fixed number of entries (e.g., 1024 for Y and H component or 2048 for YUV). In some cases, when calculating the color mass center, the pixel locations may also need to be quantized. For example, when contributing to the calculation of the mass center, the X and Y coordinate may be quantized (e.g., by a right shift of 2 (divided by 4), or other suitable amount) such that the bounding box is divided into small grids. Even though each pixel within a grid may have a different probability, each pixel's coordinates are considered the same when calculating the mass center. Using such quantized pixel locations can allow the AMFR process to be more robust to distortions (e.g., a small phase shift of the pixels of input images).

Detailed implementations of an appearance model are now described as illustrative examples. An illustrative example of an implementation of the YUV color probability model includes (Note that this process establishes an appearance model which is illustrated by a histogram array denoted as HIST):

1. Initialize the color histogram HIST to all zeros.
2. For each pixel P in the bounding box, get its Y, U, V components, each components are 8 bits.
3. Quantize the YUV components as Y=Y>>3, U=U>>5, V=V>>5; [with >>being a right bit shift operator]
4. The HIST index is given by idx=(Y<<6)±(U<<3)+V; [with <<being a left bit shift operator]
5. Then increase the HIST(idx) by 1.
6. Finally, HIST is normalized by the bounding box size.

An illustrative example of an implementation of the mass center calculation includes:

1. Initialize the mass center (CX, CY) as (0, 0). Set the sum of probability P_SUM=0.
2. Given the color histogram HIST, for each pixel P in the bounding box, get its Y, U, V components and do the following:
3. Quantize the YUV components as Y=Y>>3, U=U>>5, V=V>>5;
4. The HIST index is given by idx=(Y<<6)+(U<<3)+V;
5. P_SUM=P_SUM+HIST(idx)
6. Get the pixel coordinates X and Y.
7. Update the mass center as CX=CX+(X>>2)*HIST(idx), CY=CY+(Y>>2)*HIST(idx).
8. Finally, normalize the (CX, CY) by the P_SUM.

Note that, in the frame at which an appearance model is just calculated, its mass center can be calculated (similarly as in step 6 and step 7) in order to know the initial mass center of the appearance model. In some cases, the appearance model of each tracker bounding box is designed in a way that all pixels of a bounding box are maintained. In other cases, the appearance model of each bounding box is designed in a way that it is always of a constant size regardless of the bounding box size. In such cases, the possibility of uncontrollable memory increase is avoided, which may occur when multiple large bounding boxes exist.

In some implementations, an initial appearance model (e.g., a color probability model, histogram, or the like) together with a target bounding box may be created for a new tracker (or split-new tracker) in the frame at which the tracker is initially created (or split). For example, the tracker bounding box tracking the object in the frame can be designated as the target bounding box, and pixels of the frame within the target bounding box can be used to create the initial appearance model.

In some implementations, instead of creating the initial appearance model and the target bounding box in the first frame at which a new tracker is created (or a split-new tracker is split), the initial appearance model and the target bounding box can be created with a delay, which can remove temporal noise. The delay is denoted as a duration Tc, which can be related proportionally (or as a monotonic increasing function) to T in case of new tracker and to Ts in case of a split-new tracker, where T and Ts are the status durations for a new tracker or split-new tracker, respectively, that define when the new (or split-new) tracker will be firstly inspected by the true-false positive detection process. In one illustrative example, Tc is set to T/2 in case of a new tracker and Ts/2 in case of a split-new tracker. When the duration of a tracker (since the tracker was created or when it was split) is Tc frames, the initial appearance model as well as the target bounding box is calculated and maintained. In some cases, as described in more detail below, an initial mass center $C_0$ is calculated when the initial appearance model is created. For example, the initial appearance model (e.g., the histogram or probability model) can be used to calculate the initial mass center $C_0$.

In some cases, before an object is being identified as a true positive and output to the system, the appearance model for the tracker (tracking the object) is kept unchanged (is kept as the initial appearance model), in order to avoid potential complexity related to updating the appearance model.

The object tracking system, using the AMFR process, can use the initial appearance model and the target bounding box to determine a mass center ($C_t$) of the pixels associated with the tracker in one or more future frames, which can be used for comparison with the initial mass center $C_0$ of the tracker before an object the tracker is tracking (and the tracker) is determined to be a true positive or a false positive object. For example, the AMFR process can compare appearance models (or information calculated using the appearance models, such as a color mass center or other information) of the tracker to determine if color characteristics of the tracker in two frames are similar enough to consider the tracker as false positive. Such a comparison of color characteristics can be used to determine that the texture (color) of the object being tracked remains similar in the two frames, which indicates that the object remains in the scene in the subsequent frame at relatively the same location as when the initial appearance model was created in the prior frame. The non-moving (or little moving) object can be considered as false positive.

In some examples, once there is a need to perform true-false positive detection in a current frame (e.g., when the status duration T or Ts is met) and when it is determined that pixel level analysis is required and that there is a need to invoke appearance model based false positive removal (AMFR), the initial appearance model as well as the target bounding box of a tracker can be used to calculate the mass center $C_t$ of the current frame. For example, the initial appearance model can include a color probability model that may be determined by calculating the probability of the feature value in each pixel location within the target bounding box in the previous frame at which the target bounding box was created. The mass center $C_t$ can then be determined by calculating the mass center of all pixels within the current bounding box of the blob tracker in the current frame according to the per-pixel probability model of the initial appearance model. The distance between $C_O$ and $C_t$ can then be calculated (denoted as $\|C_O-C_t\|$) and compared with a threshold distance (also referred to herein as a threshold difference). In one illustrative example, the threshold distance can be set to a percentage of the diagonal distance of the target bounding box (e.g., less than 1%, 2%, or other suitable value of the diagonal distance). If the determined distance between $C_O$ and $C_t$ is less than the threshold distance, the AMFR process can identify the object as a false positive object. The object can be removed or transitioned to the intermediate status ("next round").

If the distance between the mass centers $C_O$ and $C_t$ is within the threshold distance, the tracker (and the object it is tracking) can be considered a false positive object and can be removed or transitioned to the intermediate status in some cases ("next round"). For instance, a small distance between the mass centers $C_O$ and $C_t$ means the texture of a patch (included in a previous bounding box of the tracker) in the initial frame is similar to the texture of the patch (included in a current bounding box of the tracker) in the current frame. The patch in the initial frame being similar to the patch in current frame can statistically mean that the patch may have changed slightly between the frames, but statistically, the patch (and thus the tracker) is kept in the same location and thus is not moving. A non-moving patch is considered as a false positive (e.g., due to the characteristic that true positive objects consistently move in a scene), and thus the tracker can be considered as a false positive tracker.

In some implementations, the appearance model based true-false positive detection process can apply a lightweight pixel level analysis and/or a strong pixel level analysis. In some implementations, the strong pixel level analysis may include both AMFR and a Correlation based False positive Removal (CFR) to determine whether a current object is a true positive or a false positive. In such implementations, only when both AMFR and CFR determine the current object is a true object, the strong pixel level analysis returns a positive result. The lightweight pixel level analysis can include only the CFR, in which case the lightweight pixel level analysis returns a positive result when the CFR determines the current object is a true object. In some cases, when the strong pixel level analysis or the lightweight pixel level analysis returns a negative result, the current object (and its tracker) can be determined to be a false positive object or can be transitioned to the intermediate status ("next round").

To perform CFR, the true-false positive detection process can determine a correlation between the current texture of the blob (representing the object) associated with the current tracker in the current frame and the co-located texture of a mean background picture (referred to herein as a mean picture). The mean picture can be synthesized using the background models maintained by a background subtraction engine (e.g., background subtraction engine 312). For example, each pixel location in a mean picture can be generated based on a respective background model maintained for each pixel location. There are several ways to generate a mean picture. In one example, a mean picture can be synthesized using the values of a statistical model (e.g., a Gaussian model) maintained for each pixel location in the mean picture, regardless of whether a current pixel belongs to a background pixel or foreground pixel.

In another example, a mean picture can be generated using a Gaussian mixture model (GMM) for each pixel location. For example, a pixel value of a synthesis mean picture for a pixel location can be set as the expectation (or average or mean) of a model from the GMM for that pixel location, without taking into account whether the current pixel belongs to a background pixel or foreground pixel. In some examples, the model is chosen as the most probable model, which is the model with a highest weight from the GMM for a current pixel location can be used to synthesize the mean picture for that pixel location. The model with the highest weight from a GMM is referred to herein as the most probable model. In some examples, the model from the GMM for a current pixel location whose distance to the current input pixel (in a current frame) is the smallest among all the existing models in the GMM for the current pixel location can be used to synthesize the mean picture for that pixel location. The model from a GMM for a pixel location with the smallest distance to the current input pixel is referred to herein as the closest model.

In some implementations, the most probable model or the closest model can always be used to generate the mean (or expected) pixel values for the various pixel locations of the mean picture. In some implementations, a closest background picture can be used, which can selectively choose a model to use for updating a pixel location, instead of always using a certain model (e.g., only the most probable model of the closest model). For example, the closest mean picture selects for each of its pixel locations either the most probable model when a current pixel is identified to be a foreground pixel, or the closet model when the current pixel is identified to be a background pixel. As noted above, the most probable model for a pixel location is the model (e.g., from the GMM) that has the highest weight. The closest background model is the model whose distance to the current input pixel is the smallest among all the existing models for the current pixel location. As described by Equation 1 above, the intensity of each pixel location can be modelled by a mixture of K Gaussian Models. Each model has its own weight, mean and variance. The intensity of each pixel location of the mean picture is the mean of the selected Gaussian Model of that location. If, in current frame, the current pixel location is determined as a foreground pixel, then the intensity of the background has to be estimated or guessed. The most possible intensity value is the mean $\mu_i$ of the most probable model (the model with highest weight $w_i$) among the K Gaussian Models. If, in the current frame, the current location is determined as a background pixel, then the model which best represents the intensity of pixel location in the current frame is selected out of the K Gaussian models. For example, if the intensity of a pixel location in the current frame is p, the $\mu_i$ which is closest to p than all other $\mu_j$ (where j=1, ..., K, j!=i) can be selected as the intensity of the mean picture for the current location.

A correlation can be calculated between the texture of the current blob associated with the current tracker (for the current picture) and a corresponding, co-located texture of the mean picture. For example, the pixel values of the current blob in the current picture can be compared to pixel values in the mean picture that are in the same coordinate locations as the pixels in the current picture (e.g., a correlation can be calculated for pixels located at a 0,0 coordinate of the current frame and the mean picture). A correlation (also referred to as a correlation coefficient) is a number that quantifies some type of correlation and dependence, meaning statistical relationships between two or more random variables or observed data values. In some examples, a correlation can have values in the range of −1 to 1, inclusive. In one illustrative example, the correlation (co) can be defined as co=COV(X,Y)/Sqrt(COV(X,X)*COV(Y,Y)).

The covariance COV(X,X) is the variance of X (denoted as VAR(X)), and the covariance COV(Y,Y) is the variance of Y (denoted as VAR(Y)). The covariance of X and Y is defined as COV(X,Y)=E((X−E(X))(Y−E(Y))). E(X) is the expectation of X (or average of X), and E(Y) is the expectation of Y (or average of Y). In some cases, when background subtraction only applies for the luminance component, the correlation may apply only in the luminance domain, instead of the YUV or RGB domain.

A high correlation value (e.g., higher than a correlation threshold) between the texture (pixel values) of a current frame and the co-located texture (pixel values) of the mean picture indicates that the textures are expected to be statistically similar (e.g., linearly or other statistical relationship) and thus may be considered as false positives because the background texture is similar to the current texture. For example, the background texture of the mean picture indicates the texture of the background area, and the high correlation indicates the similarity of the two textures. If the texture of the patch in the current frame (of the current blob) is statistically similar to the texture of the co-located patch (based on the high correlation value) in the background represented by the mean picture, the patch in the current frame is also statistically likely to be a background patch, in which case the object represented by the current blob (and the corresponding tracker) can be considered as a false positive.

In such implementations, as noted previously, the appearance based true-false positive detection process can also be based on a bounding box history that is maintained for a relatively long duration of time (e.g., one and a half seconds, two seconds, or other suitable period of time or number of frames). For example, the AMFR process may be integrated into a bounding box history based true-false positive detection process. In some cases, the AMFR and CFR together can be used as a strong pixel analysis module in the bounding box history based true-false positive detection process, while CFR alone can be used as a lightweight pixel analysis module.

In such implementations, the appearance based true-false positive detection process can analyze the bounding box history of a current tracker and can output a confidence value (also referred to as a confidence level). The confidence value for a tracker can be determined based on different characteristics of the bounding box history of the tracker. Based on the confidence value, the tracker can be output (e.g., as a normal tracker), can be removed (or killed) from a list of trackers maintained for the video sequence, or can be transitioned to the intermediate status and maintained for future iterations of the true-false positive detection process. A tracker having the intermediate status is not killed or output based on the current iteration of the true-false positive detection process. By utilizing the bounding box history, the appearance based true-false positive detection process is able to analyze bounding box history characteristics crossing a duration longer than, for example, a half second, one second, or the like, leading to accurate true-false positive results. In some cases, a tracker can be represented by a bounding region other than a bounding box (e.g., a bounding ellipse, a bounding triangle, or other suitable shape), in which case a bounding region history can be maintained and used for the true-false positive detection process.

Figure 6A:
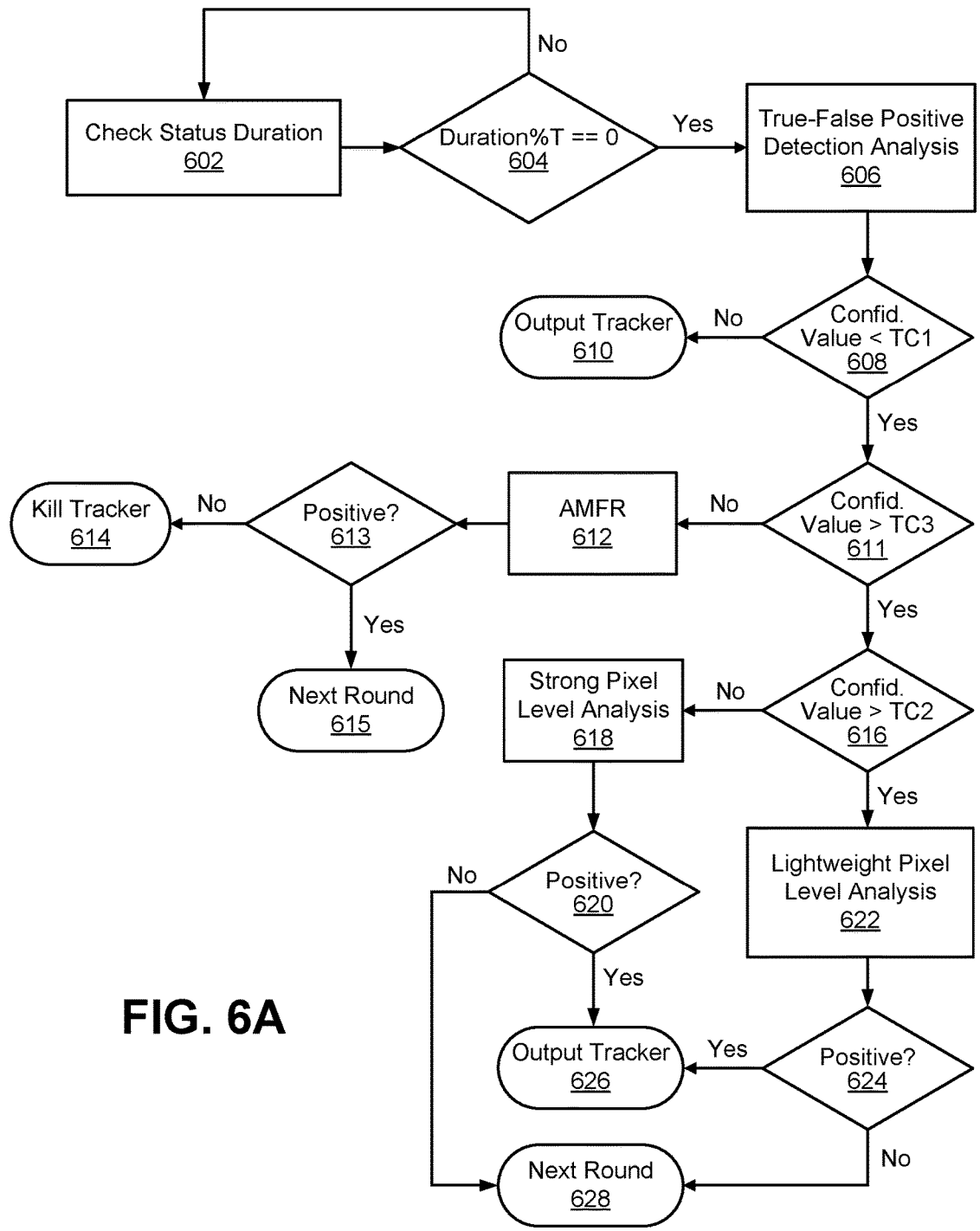
FIG. 6A is a flowchart illustrating an example of a process for determining whether an object (and its tracker) is a true positive or a false positive using appearance characteristics of the object, in accordance with some examples.

FIG. 6A is a flowchart illustrating an example of an appearance based true-false positive detection process 600A for determining whether a tracker (and the object the tracker is tracking) is a true positive or a false positive. In some examples, the true-false positive detection process 600A can be performed by the object tracking system 106. In some examples, another component of the video analytics can perform the true-false positive detection process 600A and can interact with the object tracking system 106. The appearance based true-false positive detection process 600A can be performed on video frames of a video sequence. The video sequence can be captured by an image capture device (e.g., an IP camera, or other suitable image capture device). Trackers can be maintained for the video sequence for tracking one or more objects in a scene captured by the video sequence.

The appearance based true-false positive detection process 600A can be periodically performed for each tracker (from the maintained trackers) in an iterative manner based on a status duration. The status duration is denoted as n*T for new trackers. For example, each round of analysis by the true-false positive detection process 600A for a tracker can be periodically invoked when the duration of the tracker (since the tracker was created, for example, as a new tracker or a split-new tracker) reaches n*T frames, where T can be set to a number of frames (e.g., 30 frames, 60 frames) or an amount of time (e.g., 1 second, 2 seconds, or other suitable amount of time) and where n is an integer value. T can be the same as the threshold duration T1 described above. The status duration can be checked for each tracker for each input frame. A frame currently being processed is referred to herein as a current frame. In one illustrative example, T can be set to 30 frames and n can be an integer. In such an example, the true-false positive detection process 600A can be invoked at every integer value n multiple of T. For instance, in such an example, the process 600A will be invoked for a tracker at frame 30 (for n=1 after the tracker is created), at frame 60 (for n=2), at frame 90 (for n=3), and so on.

In some implementations, a split-new tracker may be tested when the duration is equal to a threshold Ts, which can be smaller than the threshold T. For example, the threshold Ts can be equal to T/2. Ts can be the same as the threshold duration T2 described above for split-new trackers.

In some cases, the duration of a tracker (before it is output) can be tracked by a counter starting from 0 when the tracker is created (as a new tracker or a split-new tracker). The counter can increase by one for every frame. The counter can be denoted as Duration % T, and can be used to determine when the status duration n*T has been met (e.g., when Duration % T is equal to 0, denoted as Duration % T==0). The counter can be set to N*(T/2) for split-new trackers. Referring to FIG. 6A, for example, the process 600A can check the status duration for a current tracker at a current frame at step 602. To check the status duration, the process 600A determines, at step 604, whether the counter Duration % T is equal to 0 (Duration % T==0). If the status duration is not met for a current tracker (Duration % T is not equal to 0), the process 600A returns to step 602 to check the status duration for the current tracker at a next frame. Once the status duration is met, the counter is reset to 0.

As described above, in some implementations, an initial appearance model and a target bounding box can be created for a new tracker (or split-new tracker) at the frame at which the tracker is initially created (or split). For instance, the tracker bounding box tracking the object in the frame can be designated as the target bounding box, and pixels of the frame within the target bounding box can be used to create the initial appearance model. In some implementations, the initial appearance model and the target bounding box can be created at a frame occurring at a duration Tc after the new tracker is created (or a split-new tracker is split), rather than creating the initial appearance model and the target bounding box at the frame at which the new tracker is created (or a split-new tracker is split). The duration Tc can be set to T/2 for a new tracker and Ts/2 for a split-new tracker. When the duration since a tracker was created or split is Tc frames, the initial appearance model as well as the target bounding box is calculated and maintained.

If the status duration n*T or n*Ts is determined to be met for a current tracker (Duration % T==0), the process 600A proceeds to step 606 to perform true-false positive detection analysis. The true-false positive detection performed at step 606 may include determining one or more characteristics or features extracted from a bounding box history of a tracker, and utilizing the characteristics or features individually or jointly to generate a confidence value or level for the tracker. Such a process is referred to herein as long duration bounding box analysis. While a bounding box history of a tracker is used herein as an illustrative example, a bounding region history other than a bounding box history can be used (e.g., a history of bounding circles used to track an object, or other suitable shape). Further details relating to the true-false positive detection analysis and long duration bounding box analysis are described below with respect to FIG. 7-FIG. 10.

The true-false positive detection analysis performed at step 606 can provide a confidence value for a tracker. For example, the long duration bounding box analysis, when performed, can be used to determine a confidence value for a tracker. A confidence value for a tracker may fall into different confidence ranges, such as a very high confidence range (higher than a first confidence threshold TC1), a high confidence range (between a first confidence threshold TC1 and a second confidence threshold TC2), a low confidence range (between a second confidence threshold TC2 and a third confidence threshold TC3), and a very low confidence range (less than a third confidence threshold TC3), with the several thresholds TC1, TC2, and TC3 being between the different ranges. Illustrative examples of the different confidence thresholds TC1, TC2 and TC3 can include 10, 2, and 1, for instance. One of ordinary skill will appreciate that other suitable values for the confidence thresholds TC1, TC2 and TC3 can be used. If the confidence value of a tracker is larger than TC1, the tracker will be in the very high confidence range. If the confidence value of the tracker is larger than TC2 and less than TC1, it will be in the high confidence range. If the confidence value of the tracker is less than TC2, but greater than TC3, it will be in the low confidence range. If the confidence value of the tracker is smaller than TC3, it will be in the very low confidence range.

In some cases, the highest confidence range (very high) can lead to immediate output of the current tracker. Trackers in the high and low range can be transitioned to an intermediate status (denoted as "Next Round"), which keeps the trackers for a next round of analysis by the appearance based true-false positive detection process 600A. When the confidence level is in the very low range (e.g., less than TC3), instead of directly killing the tracker, the AMFR process can be performed, as described below.

As noted above, when the confidence value of a tracker is very high (greater than the first confidence threshold TC1), the tracker may be determined to be a true positive (turned to output as a normal tracker). For example, at step 608, the process 600A can determine whether the confidence value of a current tracker is less than the first confidence threshold TC1. If the confidence value of the current tracker is not less than the first confidence threshold TC1, the current tracker is output at step 610 (e.g., at the current frame, after the current frame is processed, or other time suitable for outputting trackers). In some cases, step 608 can determine whether the confidence value of the current tracker is greater than the threshold TC1, and if the confidence value is greater than the threshold TC1, the tracker is output at step 610. If the confidence value of the current tracker is less than TC1 (or is not greater than TC1), the process 600A proceeds to step 611.

When the confidence value of a tracker is very low (less than the third confidence threshold TC3), instead of directly killing the tracker, the AMFR process can be performed, as described below. The AMFR process can be a strong indicator of a false positive when the motion of an object for the current tracker being tested is relatively small or irregular. For example, as described above, the AMFR process can determine that the texture of an object being tracked remains similar in a previous frame and a subsequent frame (e.g., a small distance between the mass center of the previous frame $C_0$ and the subsequent frame $C_t$). The similarity in texture indicates that the object remains in the scene in the subsequent frame at relatively the same location as when the initial appearance model was created in the prior frame. The non-moving (or little moving) object can be considered as false positive.

Therefore, in some implementations, when the confidence level is in the very low range, the AMFR process can be performed to check the appearance of the tracker before possibly killing the tracker. For example, at step 611, the process 600A can determine whether the confidence value of a current tracker is greater than the third confidence threshold TC3. If the confidence value of the current tracker is not greater than the third confidence threshold TC3, the AMFR process is performed at step 612. In some cases, step 611 can determine whether the confidence value of the current tracker is less than the threshold TC3, and if the confidence value is less than the threshold TC3, the AMFR process is performed at step 612.

The AMFR process includes comparing the initial appearance model (e.g., the histogram/color probability model) and the target bounding box of the current tracker with an appearance model of the current tracker determined using information in the current frame. For example, as previously described, the initial appearance model can be used to calculate the mass center $C_0$ of the pixels included in the target bounding box of the tracker in the initial frame at which the initial appearance model was created (at Tc). The initial appearance model can also be used to calculate the mass center $C_1$ of the pixels included in the current bounding box of the tracker in the current frame. The mass center $C_t$ can then be compared with the mass center $C_0$ to determine whether the current tracker (and the object being tracked by the tracker) is a false positive.

If the distance between the mass centers $C_0$ and $C_t$ is within a threshold distance, the tracker (and the object it is tracking) can be considered a false positive object and can be removed or transitioned to the intermediate status in some cases ("next round"). In one illustrative example, the threshold distance can be set to a percentage of the diagonal distance of the target bounding box (e.g., less than 1%, 2%, or other suitable value of the diagonal distance). A distance between the mass centers $C_0$ and $C_t$ that is below the threshold distance indicates that the texture of a patch (included in the target bounding box of the tracker) in the initial frame is similar to the texture of the patch (included in the current bounding box of the tracker) in the current frame, and is used to determine that tracker (and the tracked object) is a false positive. When the distance is determined to be below the threshold distance, a negative result is returned at step 613 based on the AMFR process performed at step 612. When the distance is determined not to be below the threshold distance (or determined to be greater than the threshold distance), a positive result is returned at step 613.

At step 613, if the AMFR process returns a negative result (the distance between the mass centers $C_0$ and $C_t$ is below the threshold distance), the tracker is killed at step 614 (e.g., immediately at the current frame, after the current frame is processed, or other time suitable for outputting trackers). If the AMFR process returns a positive result at step 613, the tracker is not immediately killed. In such cases, the tracker can be considered as possibly not being related to a false positive object, and can be transitioned to the intermediate status at step 615 ("next round"). A tracker having the intermediate status can kept in the buffer for the next round of the appearance based true-false positive detection process 600A.

If the confidence value of the current tracker is greater than TC3 (or is not less than TC3), the process 600A proceeds to step 616. When the confidence value for a tracker is high (between the first confidence threshold TC1 and the second confidence threshold TC2) or when the confidence level is low (between the second confidence threshold TC2 and the third confidence threshold TC3), the tracker may go through some pixel level confirmation analysis. The pixel level analysis may be applied as a supplementary way of determining whether the current object (being tracked by the current tracker) is a true positive or a false positive object. In some cases, when the confidence level of a tracker is in a certain range (either high or low), the pixel level analysis may apply to determine whether the current tracker is to be output immediately or to be transitioned to the intermediate status (kept for a "Next Round" without removing the tracker). In such cases, tracking delay may be greatly reduced for the tracker and the object it is tracking. In some cases, a tracker with a low or high confidence level may be killed if the pixel level analysis is not positive for the tracker.

In some implementations, trackers in two different confidence ranges may have different types pixel level analysis applied to them in order to further reduce false positives. For example, when the confidence value for a tracker is larger than or equal to TC2, the lightweight pixel level analysis described above may be applied (e.g., CFR only). In another example, when the confidence level of a tracker is smaller than or equal to TC2, the strong pixel level analysis described above may be applied (e.g., application of both AMFR and CFR). A lightweight pixel level analysis module requires less complexity as compared to a strong pixel level analysis module; the system design may rely on the confidence level of a tracker to determine whether more complexity should be used during the true-false positive detection process 600A for a tracker. Applying the pixel level analysis only for certain ranges and even allowing a lightweight version of the pixel level analysis can reduce the complexity of the whole process to a much lower level, as compared to always applying pixel level analysis.

Returning to FIG. 6A, at step 616, when the confidence value for a current tracker is determined not to be greater than the second confidence threshold TC2 (indicating a low confidence level), the strong pixel level analysis is performed at step 618. As described above, the strong pixel level analysis module can perform both AMFR and CFR. In some cases, the CFR may include a correlation between one or more color components (e.g., one, two, or three color components) of pixels within a bounding box of the current tracker. In some implementations, as shown in FIG. 6A, if the strong pixel level analysis returns a positive result at step 620 (e.g., AMFR determines the distance is greater than the threshold distance and the correlation is determined to be below the correlation threshold), the tracker can be output at step 626 (e.g., immediately for the current frame, once all trackers for the current frame have been processed, or at some other time). In such implementations, if the strong level pixel analysis returns a negative result (e.g., AMFR determines the distance is less than the threshold distance and the correlation is determined to be above the correlation threshold), the tracker can be transitioned to the intermediate status and kept in the memory at step 628 for the next round of analysis by the true-false positive detection process 600A. The next round of analysis will occur when the status duration is met again (duration % T is determined to be equal to 0 at step 604). In other implementations (not shown in FIG. 6A), if a positive result is determined at step 620, the tracker may be kept in the memory for the next round of analysis (instead of being output), and, if a negative result is found at step 620, the tracker can be killed and removed from the trackers maintained by the video analytics system (instead of being held for the next round).

If, at step 616, the confidence value for a tracker is determined to be greater than the second confidence threshold TC2 (indicating a high confidence level), the lightweight pixel level analysis is performed at step 622. As described above, the lightweight pixel level analysis module may, for the current bounding box, perform only CFR to check the correlation between the current frame and a mean picture. If the correlation is determined to be below a correlation threshold, indicating a low correlation, a positive result is returned at step 624. When a positive result is returned at step 624, the tracker can be output at step 626 (e.g., immediately for the current frame, once all trackers for the current frame have been processed, or at some other time). If the correlation is determined to be above the correlation threshold, indicating a high correlation, a negative result is returned at step 624. When a negative result is returned at step 624, the tracker can be kept in the memory at step 628 for the next round of analysis by the true-false positive detection process 600.

In some cases, larger objects may be captured by one or more frames of a video sequence. For example, an object may be close to a camera and can appear very large in frames captured by the camera. As described below, a large object can be classified as a big object or a huge object based on certain conditions. In such cases, when big or huge objects are present, instead of using only CFR, the strong pixel level analysis (both AMFR and CFR) can be performed to determine whether the large object is a true positive or a false positive. In some cases, the strong pixel level analysis is always required for big or huge objects.

Figure 6B:
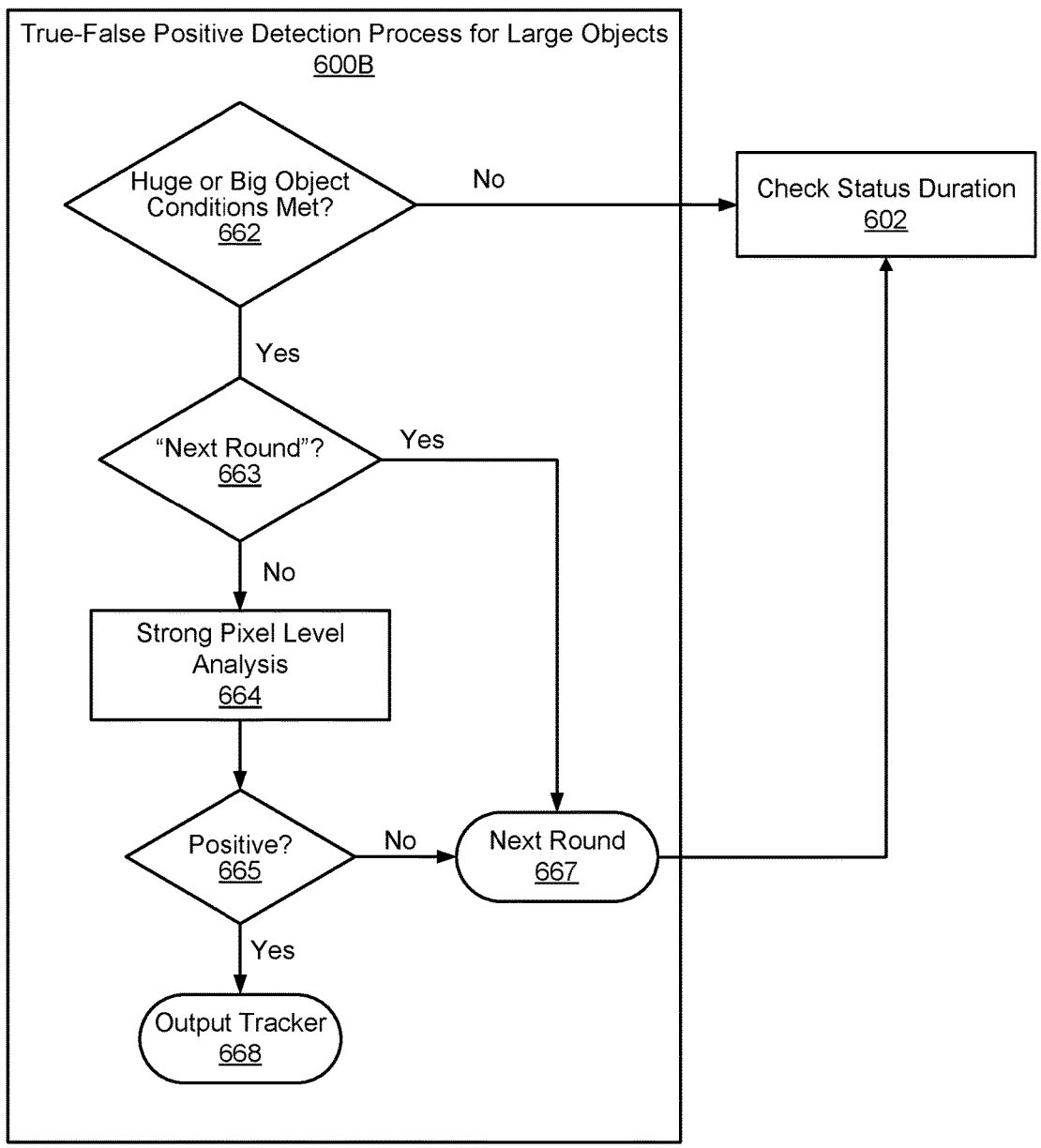
FIG. 6B is a flowchart illustrating an example of a process for determining whether a large object (and its tracker) is a true positive or a false positive, in accordance with some examples.

An example true-false positive detection process 600B for large objects is shown in FIG. 6B. At step 662, the process 600B checks whether huge or big object conditions are met. For example, certain size conditions can be used to determine whether an object is a big object or a huge object, including a huge blob size threshold and a big blob size threshold. As used herein, a huge blob is a blob with a size greater than a huge blob size threshold. The huge blob size threshold can be denoted as $T_h$. The object in the scene that the huge blob represents is also considered to be a huge object. The huge blob size threshold can be based on the size of the frame or image in which the object is captured. For example, the huge blob size threshold can be set as a fraction of the entire frame size or image size, such as half of the frame size (½×frame size), a quarter of the frame size (¼×frame size), or other suitable fractional amount. In one illustrative example, the huge blob size threshold $T_h$ can be set to a tenth of the frame size. Accordingly, a blob that takes up the fractional amount of the frame according to the huge blob size threshold (e.g., half the frame, a quarter of the frame, or other suitable amount) is considered to be a huge blob.

As used herein, a big blob is a blob with a size greater than a big blob size threshold, which is smaller than the huge blob size threshold. The big blob size threshold can be denoted as $T_b$. The object in the scene that the big blob represents is also considered to be a big object. The big blob size threshold can be based on the size of the frame or image in which the object is captured. For example, the big blob size threshold can be set as a fraction of the entire frame size or image size, such as a fifth of the frame size (⅕×frame size), a sixth of the frame size (⅙×frame size), a tenth of the frame size (¹⁄₁₀×frame size), or other suitable fractional amount that is smaller than the fractional amount used for the huge blob size threshold. In one illustrative example, the big blob size threshold $T_b$ can be set to a ¹⁄₁₅ of the frame size. A blob that takes up the fractional amount of the frame according to the big blob size threshold (e.g., a fifth of the frame, a sixth of the frame, a tenth of the frame, or other suitable amount) is considered to be a big blob.

In some examples, only one blob size threshold is used, instead of a huge and big blob size thresholds. Such a threshold can be referred to as a large blob size threshold, and can be denoted as $T_l$. The large blob size threshold can be based on the size of the frame or image in which the object is captured. For example, the large blob size threshold can be set as a fraction of the entire frame size or image size, such as a fifth of the frame size (⅕×frame size), a sixth of the frame size (⅙×frame size), a tenth of the frame size (¹⁄₁₀×frame size), or other suitable fractional amount. In one illustrative example, the large blob size threshold $T_l$ can be set to a ¹⁄₁₅ of the frame size. A blob that takes up the fractional amount of the frame according to the large blob size threshold (e.g., a fifth of the frame, a sixth of the frame, a tenth of the frame, or other suitable amount) is considered to be a large blob, and the object represented by the blob is considered to be a large blob.

If the huge blob size threshold, the big blob size threshold, or the large blob size threshold is not met at step 662, the process 600B proceeds to check the status duration (n*T or n*Ts) at step 602, and the process 600A proceeds to check whether Duration % T is equal to 0. The process 600A then proceeds with the remaining steps described above.

If the huge blob size threshold, the big blob size threshold, or the large blob size threshold is met at step 662, indicating that a large object is present, the process 600B checks a status of the current tracker that is tracking the large object. In some cases, when the current tracker is created (or at some other point in time after the tracker is created), the tracker can be initiated as having a "None" status. The current tracker can later be transited to the intermediate ("next round") status. For example, since the conditions for determining whether an object is a huge or a big object may be met multiple times for the object, and even continuously for the object across multiple video frames, the initial status of a tracker for the object can be set to "None." Once the strong pixel level analysis returns a negative result (at step 665), the status of the tracker is transited to the intermediate status ("next round"). Transitioning the status of the tracker of a large object to the intermediate status ("next round") can prevent the high complexity strong pixel level analysis from being performed every time the huge or big object conditions are met. For example, once the status of the tracker is set to the intermediate status ("next round"), in the future, the strong pixel level analysis is not applied even though the conditions for determining a huge or big object are met. This way, the complexity required for invoking the strong pixel level analysis can be significantly reduced.

If the status of the tracker is determined to be the intermediate status ("next round") at step 663, the process 600B maintains the tracker for the next round of the true-false positive detection process 600A at step 667. The process 600B then proceeds to step 602 of the process to check the status duration.

If the status of the tracker is determined not to be the intermediate status ("next round") at step 663 (or determined to be the "none" status), the process 600B performs the strong pixel level analysis at step 664. As previously described, the strong pixel level analysis includes performing both AMFR and CFR. If the strong pixel level analysis returns a positive result at step 665 (indicating that the object is a true positive), the process 600B outputs the tracker at step 668. If the strong pixel level analysis returns a negative result at step 665 (indicating that the object is possibly a false positive), the process 600B maintains the tracker for the next round of the true-false positive detection process 600A at step 667. The process 600B then proceeds to step 602 of the process to check the status duration.

Figure 7:
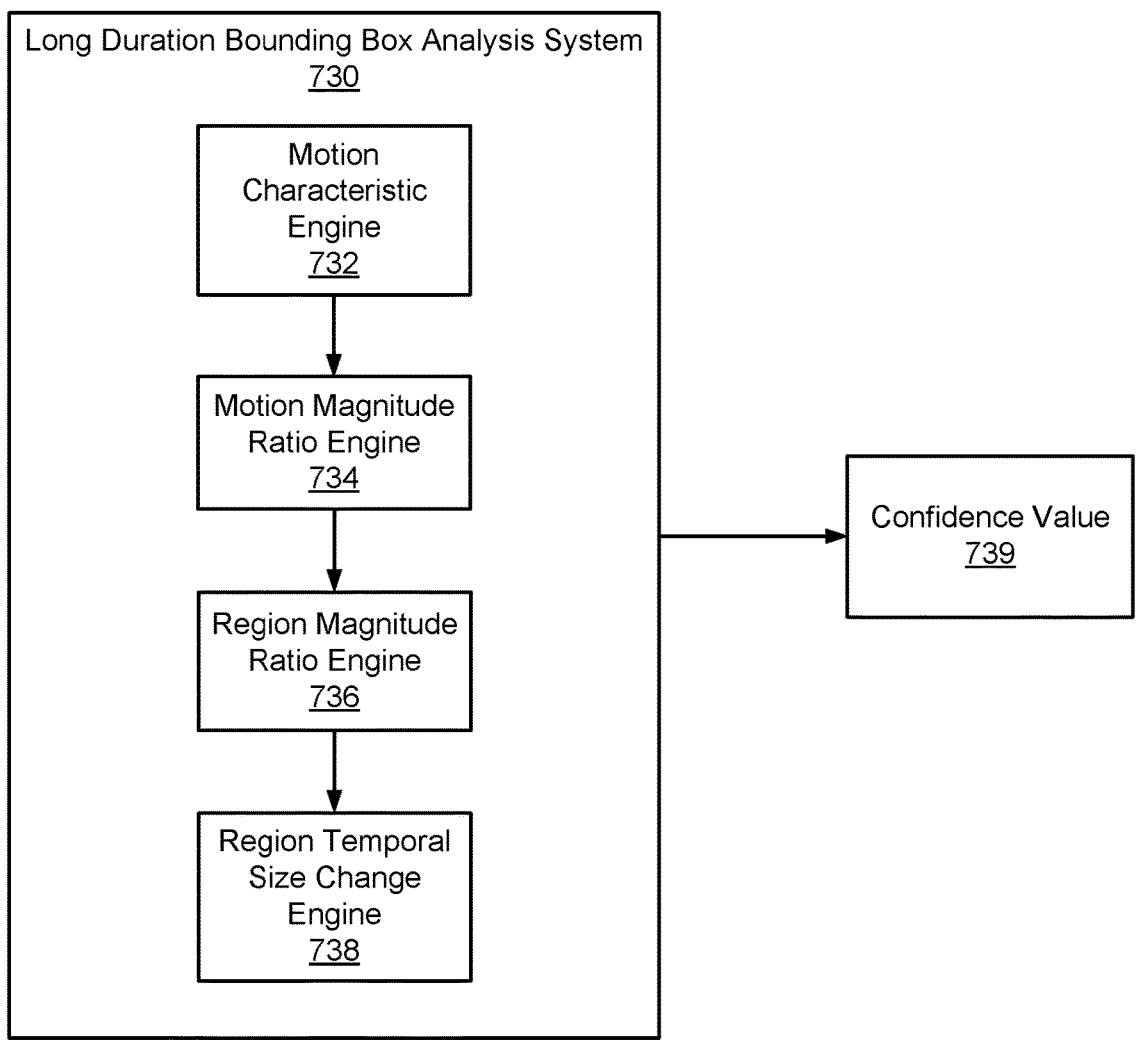
FIG. 7 is a block diagram illustrating an example of a long duration bounding box analysis system, in accordance with some examples.

Returning to FIG. 6A, the true-false positive detection analysis is performed at step 606 when the status duration is met for a current tracker, as described above. The true-false positive detection analysis can include a long duration bounding box analysis used to determine one or more characteristics of a current blob tracker (in a current frame) using a bounding box history of the tracker. FIG. 7 is a block diagram illustrating an example of a long duration bounding box analysis system 730 that can perform the long duration bounding box analysis. The bounding box history of a tracker can include the bounding boxes of the blob tracker in one or more previous frames that are earlier in the video sequence than the current frame and thus are obtained by the true-false positive detection process 600A prior to the current frame. The bounding boxes of the tracker in the previous frames can be identified by a unique tracker identifier (ID) associated with the tracker. The bounding box history of the tracker can also include the locations, sizes, and/or other features of the bounding boxes in the bounding box history.

The characteristics of a tracker can include a motion characteristic determined by the motion characteristic engine 732, a motion magnitude ratio determined by a motion magnitude ratio engine 734, a region magnitude ratio determined by a region magnitude ratio engine 736, a region temporal size change determined by a region temporal size change engine 738, and/or any other suitable characteristic of a tracker. As described in more detail below, the characteristics determined for a current tracker can be used individually or jointly to generate a confidence value 739 indicating a confidence level that the current tracker is a true-positive. The confidence value 739 is output for further analysis by the true-false positive detection process 600A, as described above.

The motion characteristic (or feature) can be referred to as "full-body motion" of a tracker. The motion characteristic can be defined as the maximum movement of the tracker from either the vertical direction or the horizontal direction in units of object height (for vertical) or width (for horizontal). In one illustrative example, the motion characteristic engine 732 can determine the motion characteristic of the tracker by determining an average width (avgWidth) and an average height (avgHeight) of the bounding boxes of the tracker through all bounding boxes in the bounding box history (e.g., from the first previous video frame in the history to the current video frame). The motion characteristic engine 732 can also determine a global movement of the tracker. The global movement can be calculated using the center positions of the first and last bounding boxes in the history for the x-coordinate (horizontal direction) and the y-coordinate (vertical direction) separately. Such horizontal and vertical movement is denoted as globalMoveX and globalMoveY, respectively. For example, the motion characteristic engine 732 can determine an amount of movement of a bounding box of the tracker from its location in the first previous frame of the history to the current location of the bounding box of the tracker in the current frame, both in the horizontal direction (globalMoveX) and in the vertical direction (globalMoveY). The motion characteristic (or full-body motion) can then be determined as the maximum value from among the amount of movement of the bounding region in the horizontal direction divided by the average width and the amount of movement of the bounding region in the vertical direction divided by the average height. Such a calculation can be denoted as—full-body motion is calculated as Max (abs(globalMoveX)/avgWidth, abs(globalMoveY)/avgHeight).

If the full-body motion (the motion characteristic) is more than a first motion characteristic threshold (denoted as Tf1), the confidence value is increased by a first amount (e.g., by 8, 9, 10, or other suitable amount). The first motion characteristic threshold Tf1 can be set to any suitable value, such as a value of 2. If the full-body motion is more than a second motion characteristic threshold (denoted as Tf2), but less than the first threshold Tf1, the confidence value is increased by a second amount (e.g., by 1, 2, 3, 4, or other suitable amount). The second motion characteristic threshold Tf2 can be set to any suitable value (e.g., a value of 1) that is less than the value of the first motion characteristic threshold Tf1. In some cases, if the full-body motion is less than the second motion characteristic threshold Tf2, the confidence value for the tracker is not increased or decreased. In some cases, the confidence value for the tracker can be decreased by some amount if the full-body motion is less than the second motion characteristic threshold Tf2.

The motion magnitude ratio can be determined by the motion magnitude ratio engine 734 by comparing the step-by-step accumulated motion magnitude of the tracker with the global motion magnitude of the tracker. Motion of a tracker can also be referred to as velocity. The magnitude of the motion (or velocity) associated with the current tracker of each frame is denoted as velMagnitude, and can be calculated by the center position of two temporally consecutive bounding boxes' center positions in two consecutive frames (by L-2 norm). The sum of the velMagnitude for all the frame pairs in the bounding box history can be calculated and denoted as sumVelMag. For instance, the sumVelMag indicates the accumulated motion between consecutive video frames of bounding boxes in the bounding box history of the current tracker (e.g., velMagnitude of the tracker bounding box from frame 1 to frame 2 plus the velMagnitude of the tracker bounding box from frame 2 to frame 3, and so on until the current frame is reached). The magnitude of the global motion (globalMoveX, globalMoveY) can also be calculated (by L-2 norm), in a similar manner as that described above for the motion characteristic. The magnitude of the global motion is denoted as globalMagnitude. The motion magnitude ratio is then calculated as sumVelMag/globalMagnitude.

If the motion magnitude ratio is smaller than first motion ratio threshold (denoted as Tm1), the confidence value of the tracker is increased by a first amount (e.g., by 2 or other suitable amount). The first motion ratio threshold Tm1 can be set to any suitable value, such as 5.0 or other suitable value. If the motion magnitude ratio is smaller than a second motion ratio threshold (denoted as Tm2) but greater than the first threshold Tm1, the confidence value can be increased by a second amount (e.g., by 1 or other suitable amount that is less than the first amount). The second motion ratio threshold Tm2 can be set to any suitable value (e.g., 10.0 or other suitable value) that is greater than the first motion ratio threshold Tm1. In some cases, if the motion magnitude ratio of a tracker is larger than a third motion ratio threshold (denoted as Tm3), the confidence value for the tracker is decreased by an amount (e.g., decreased by 2 or other suitable amount). The third motion ratio threshold Tm3 can be set to any suitable value (e.g., 15.0 or other suitable value) that is greater than the first and second motion ratio thresholds Tm1 and Tm2. In some cases, if the motion magnitude ratio for a tracker is between Tm2 and Tm3, the confidence value may not be increased or decreased.

The region magnitude ratio can be referred to as a "relevant region magnitude ratio," and can be determined by the region magnitude ratio engine 736 by comparing the regions generated by the periodically sampled bounding boxes (at each status duration n*T for new trackers or n*(T/2) for split-new trackers) and the regions generated by all the bounding boxes in the bounding box history of a tracker. The bounding region magnitude ratio can include a union of bounding regions of the blob tracker in at least two key frames divided by a union of bounding regions of the blob tracker in each frame of the bounding box history (between the first previous frame in the history and the current frame). A key frame is a frame that is aligned with the status duration (e.g., frame 30, frame 60, frame 90, and so on).

Figure 8:
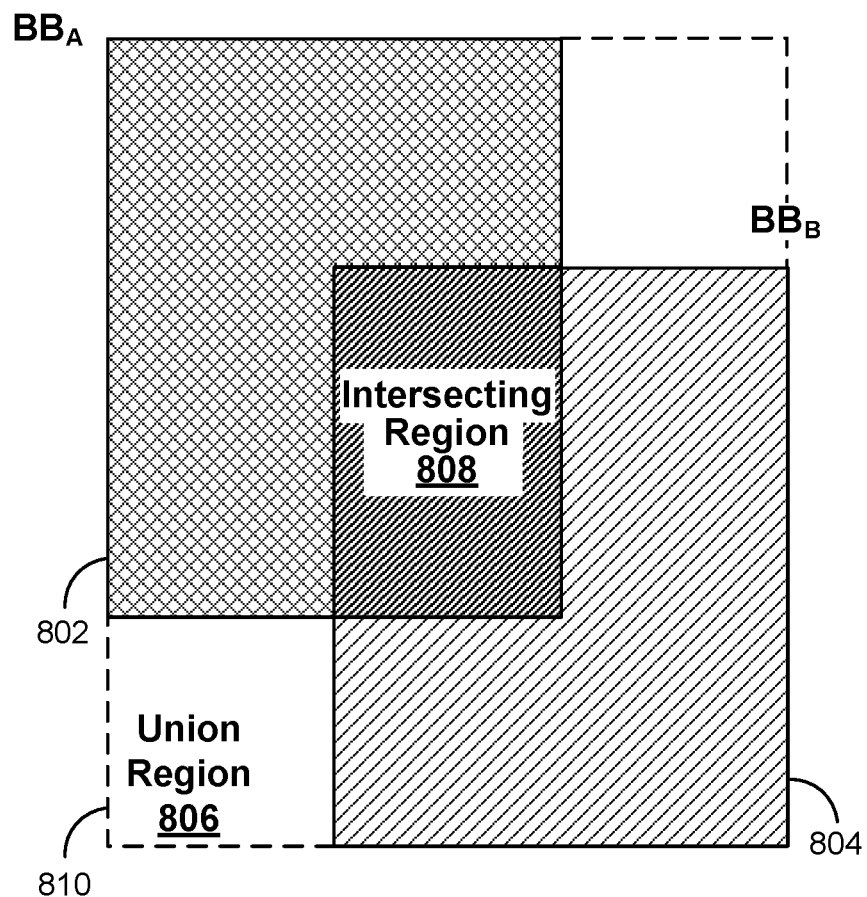
FIG. 8 is a diagram illustrating an example of an intersection and union of two bounding boxes, in accordance with some examples.

FIG. 8 is a diagram showing an example of an intersection I and union U of two bounding boxes, including bounding box $BB_A$ 802 of the blob tracker in the current frame and bounding box BBB 804 of the blob tracker in the previous frame. The intersecting region 808 includes the overlapped region between the bounding box $BB_A$ 802 and the bounding box BBB 804.

The union region 806 includes the union of bounding box $BB_A$ 802 and bounding box BBB 804. The union of bounding box $BB_A$ 802 and bounding box BBB 804 is defined to use the far corners of the two bounding boxes to create a new bounding box 810 (shown as dotted line). More specifically, by representing each bounding box with (x, y, w, h), where (x, y) is the upper-left coordinate of a bounding box, w and h are the width and height of the bounding box, respectively, the union of the bounding boxes would be represented as follows:

$$\text{Union}(BB_1, BB_2) = (\min(x_1, x_2), \min(y_1, y_2), (\max(x_1 + w_1 - 1, x_2 + w_2 - 1) - \min(x_1, x_2)), (\max(y_1 + h_1 - 1, y_2 + h_2 - 1) - \min(y_1, y_2)))$$

In one illustrative example of determining the region magnitude ratio, the allRelevantRegionBox denotes the union of all bounding boxes of the tracker in the tracker's bounding box history. The keyFrameRelevantRegionBox denotes as the union of bounding boxes in the key frames. As noted above, the key frames are those frames within the history with duration % T equal to 0 and are aligned with the frames where this true-false positive detection process is performed (at each status duration, such as frame 30, frame 60, frame 90, and the like). Using such notation, the region magnitude ratio is equal to the size of the union bounding box keyFrameRelevantRegionBox divided by the size of the union bounding box allRelevantRegionBox. Such a calculation is denoted as bbSize(keyFrameRelevantRegionBox)/bbSize(allRelevantRegionBox), with the term bbSize returning the size of an input bounding box.

If the region magnitude ratio is larger than a first bounding region magnitude ratio threshold (denoted as Tr1), the confidence value is increased by a first amount (e.g., by 1 or other suitable amount). The first region magnitude ratio threshold Tr1 can be set to any suitable value, such as 0.7 or other suitable value. If the region magnitude ratio is smaller than a second bounding region magnitude ratio threshold (denoted as Tr2), the confidence value is decreased by a second amount (e.g., 3 or other suitable amount). The second bounding region magnitude ratio threshold can be set to any suitable value (e.g., 0.3 or other suitable value) that is less than the first bounding region magnitude ratio threshold. In some cases, if the region magnitude ratio for a tracker is between Tr1 and Tr2, the confidence value for the tracker may not be increased or decreased.

The region temporal size change can be determined by the region temporal size change engine 738 by to determine the temporal size change of relevant regions of the bounding boxes in a tracker's bounding box history. The relevant regions are defined similarly as described above for the region magnitude ratio. However, for a given current time instance (e.g., n*T or n*(T/2)), not only the relevant regions of the current time instance are used, but also the relevant regions of the previous key frame time instance (e.g., (n−1)T) are used. For example, the region temporal size change can be determined by dividing the size of the bounding box region in the current key frame (the current frame being processed by the true-false positive detection process) by the union of the bounding box region sizes in all bounding boxes in the tracker's bounding box history. This region temporal size change characteristic can be used to accommodate the cases when an object works perpendicular to the image plane of the camera (e.g., a person is walking toward or away from the image plane).

When the temporal size change of relevant regions is larger than a first temporal size change threshold (denoted as Tt1) and is smaller than a second temporal size change threshold (denoted as Tt2), the confidence value is increased by a first amount (e.g., by 3 or other suitable amount). The first temporal size change threshold Tt1 can be set to any suitable value (e.g., 1.5 or other suitable value), and the second temporal size change threshold Tt1 can be set to any suitable value (e.g., set to 3.0 or other suitable value) that is larger than the first temporal size change threshold. When temporal size change of relevant regions is smaller than a third temporal size change threshold (denoted as Tt3), the confidence value is decreased by a second amount (e.g., by 10 or other suitable amount). The third temporal size change threshold Tt3 can be set to any suitable value (e.g., set to 1.03 or other suitable value) that is smaller than the first temporal size change threshold.

In some cases, the long duration bounding box analysis system 730 can complete the long duration bounding box analysis for a tracker and determine the final confidence value 739 for the tracker by combining all the above-described characteristics with an initial confidence value of 0.

A detailed illustrative implementation of the long duration bounding box analysis is provided below:

Inputs to the bounding box include the bounding box history of N frames and the previous globalBoxSize and the previous keyFrameBoxSize (although N is typically equal to n*T, but the function itself is designed to be generic).

For simplicity, denote a bounding box array of BBHis and each of it includes not only width, height, topLeftX, topLeftY as attributes, but also the centerX, centerY, fSizeRatio, fVelMagnitude, as additional attributes.

Here fSizeRatio of bounding box BBHis[i] is calculated as BBHis[i+1]/BBHis[i] for i from 0 through N−2, inclusive.

Here fVelMagnitude of bouding box BBHis[i] is calculated as:

sqrt((*BB*His[*i*+1].center*X*−*BB*His[*i*].centerX)*(*BB*His[*i*+1].center*X*−*BB*His[*i*].centerX)+(*BB*His[*i*+1].centerY−*BB*His[*i*].centerY)*(*BB*His[*i*+1].centerY−*BB*His[*i*].centerY))

Variable sumVelMag is initiated to be 0.

```
for (i = 0; i<N-1; i++)
{
    if (BBHis[i].fSizeRatio> 0.5 || BBHis[i].fSizeRatio<-0.33)
        iSizeJump++;
    else
    {
            iGoodSizeCnt++;
            iSizeSum += pTestTracker->sNewTrackerProStatus.hisBoxInfo[i].iBoxSize;
            iWidthSum += pTestTracker->sNewTrackerProStatus.hisBoxInfo[i].iBoxWidth;
            iHeightSum+= pTestTracker->sNewTrackerProStatus.hisBoxInfo[i].iBoxHeight;
    }
        sumVelMag+=BBHis[i]. fVelMagnitude;
}
avgWidth = iWidthSum / iGoodSizeCnt;
avgHeight= iHeightSum/ iGoodSizeCnt;
globalMoveX= BBHis[N - 1]. centerX - BBHis[0]. centerX;
globalMoveY= BBHis[N - 1]. centerY - BBHis[0]. centerY;
```

Full-body motion iFinalFullBodyMoveCounter is calculated as follows:

iFinalFullBodyMoveCounter = Max(abs(globalMoveX)/avgWidth, abs(globalMoveY)/avgHeight)

Motion magnitude ratio fFinalMotionMagnitudeRatio is calculated as follows:

```
globalMagnitude= sqrt(globalMoveX* globalMoveX+ globalMoveY*
globalMoveY);
fFinalMotionMagnitudeRatio = sumVelMag/ globalMagnitude;
Define two bounding boxes globalBox and keyFrameBox, both are
initiated as empty.
    for (i = 0; i<N; i++)
    {
        globalBox = Union(globalBox, BBHis[i];
        if (i%T==0) keyFrameBox = Union(keyFrameBox, BBHis[i]);
    }
fFinalGlobalSizeRatio = bbSize(keyFrameBox) / bbSize(globalBox);
iCurSizeGlobalBox = bbSize(globalBox);
iCurSizeKeyFrameBox = bbSize(keyFrameBox);
fRangeChangeRatio1 = iCurSizeGlobalBox / globalBoxSize;
fRangeChangeRatio2 = iCurSizeKeyFrameBox / keyFrameBoxSize;
fRangeChangeRatioMin =
MIN(fRangeChangeRatio1,fRangeChangeRatio2);
fRangeChangeRatioMax =
MAX(fRangeChangeRatio1,fRangeChangeRatio2);
iPreSamplingFrame is set to be the duration when the previous true/false
positive detection function is called for the current tracker.
iCurFrame is set to be the duration when the current true/false positive
detection function is called, which is equan to N.
fRangeChangeRatioPick = fRangeChangeRatioMin* (((iPreSampingFrame
* 2 − 4) >
iCurFrame ? 1.2 : 1.0));
iConfLevel =0;
    iConfLevel += (iFinalFullBodyMoveCounter >= 2 ? 10 : 0);
    iConfLevel += (iFinalFullBodyMoveCounter >= 1 ? 3 : 0);
    iConfLevel += (fFinalMotionMagnitudeRatio< 5.0 ? 2 : 0);
    iConfLevel += (fFinalMotionMagnitudeRatio< 10.1 ? 1 : 0);
    iConfLevel += (fFinalGlobalSizeRatio> 0.7 ? 1 : 0);
    iConfLevel += (fFinalGlobalSizeRatio< 0.5 ? −3 : 0);
    iConfLevel += (fFinalMotionMagnitudeRatio> 15.0 ? −2 : 0);
    iConfLevel += (fRangeChangeRatioPick>1.5 &&
    fRangeChangeRatioPick<3.0 ? 3 : 0);
    iConfLevel += (fRangeChangeRatioMax< 1.03 ? −10: 0);
globalBoxSize = iCurSizeGlobalBox;
keyFrameBoxSize = iCurSizeKeyFrameBox;
```

In some implementations, the true-false positive detection analysis performed at step 606 can use only the long duration bounding box analysis engine to determine the status of a tracker (e.g., to derive the final status of a tracker as being "Next Round", "output tracker" or "kill tracker," as shown in FIG. 6A. In such cases, the true-false positive detection analysis is equal to the long duration bounding box analysis.

In some implementations, additional false positive determination techniques can be combined with the long duration bounding box analysis. For example, in some cases, when it is the first determination cycle for a tracker (e.g., the first time the status duration T is met for a new tracker, such as at frame 30, or when the status duration Ts is met for a split-new tracker, such as at frame 15), an irregular motion-size detection process can be invoked. The irregular motion-size detection process may be invoked during the first determination cycle for a tracker due to the long duration bounding box analysis not being accurate enough to identify true and/or false positives when the bounding box history for the tracker is relatively short (e.g., having information for only 15 or 30 frames). In other cycles (e.g., defined by the status duration equal to n*T for a new tracker or n*Ts for a split-new tracker), the long duration bounding box analysis applies to determine whether the tracker is a true positive or a false positive, as described above with respect to FIG. 6A and FIG. 7.

Figure 9:
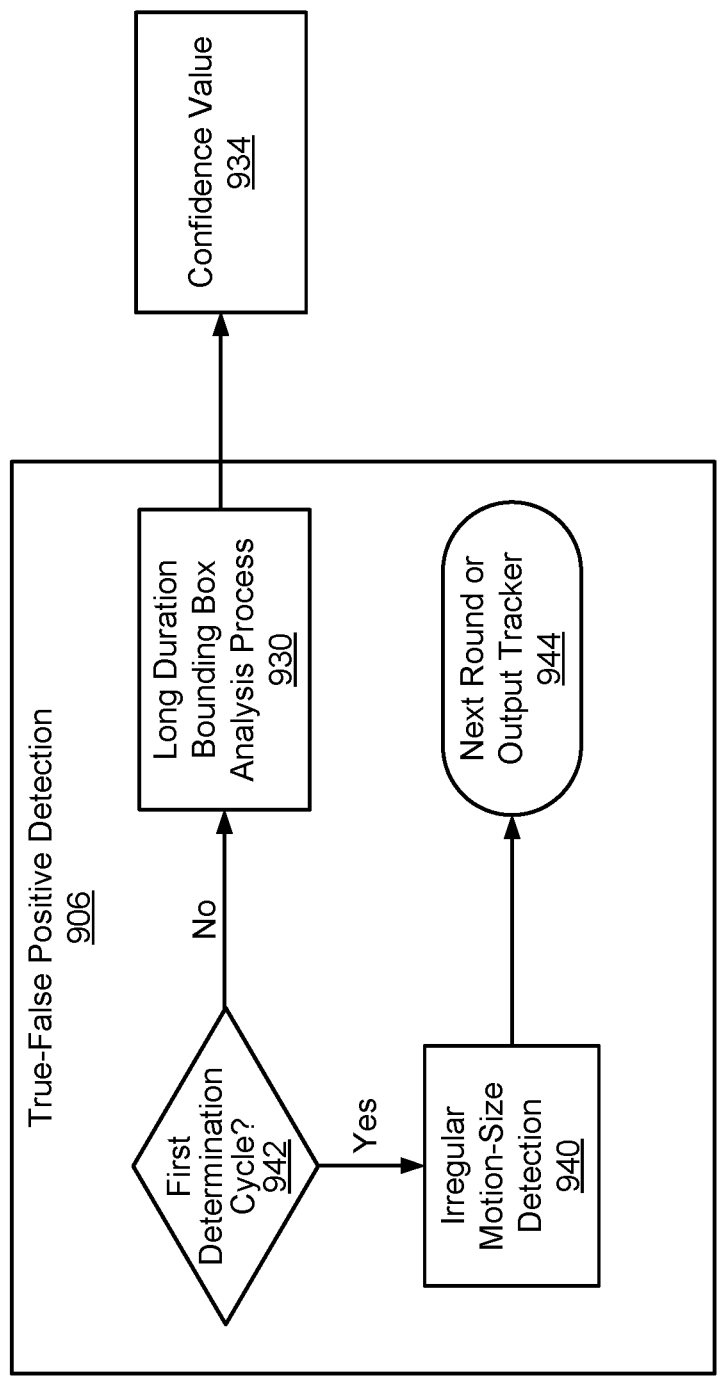
FIG. 9 is a flowchart illustrating an example of a true-false positive detection process, in accordance with some embodiments.

FIG. 9 is a flowchart illustrating an example of a true-false positive detection process 906 that includes the long duration bounding box analysis process 930 and the irregular motion-size detection process 940. At step 942, the true-false positive detection process 906 determines whether it is the first determination cycle for a tracker. For example, the process 906 can determine whether it is the first determination cycle after determining that the status duration has been met (e.g., after Duration % T==0 is determined at step 604 of the process 600A). If, at step 942, it is determined that it is not the first determination cycle for a tracker (e.g., determined to be n*T or n*Ts, with n>1), the long duration bounding box analysis process 930 is performed, as described above, to determine a confidence value 934 for the tracker.

If, at step 942, it is determined that it is the first determination cycle for a tracker (at 1*T or 1*Ts), the irregular motion-size detection process 940 is performed. The irregular motion-size detection process 940 can be used to determine trackers (and the objects they are tracking) whose size and/or motion are too irregular to be an object of interest. Such trackers are referred to as jumping trackers. Further details regarding jumping trackers are described below. If the irregular motion-size detection process 940 is positive, indicating the tracker and its object do not have irregular motion or size and thus is not a jumping tracker, the process 906 can output the tracker at step 944. If the irregular motion-size detection process 940 is not positive, indicating the tracker is possibly a jumping tracker due to an irregular motion or size, the process 906 can transition the tracker to the intermediate status ("next round") at step 944. The tracker can be transitioned to the intermediate status so that it is not immediately killed, allowing the long duration bounding box analysis process 930 to be performed at the next status duration (e.g., at 2*T or 2*Ts).

As noted above, irregular motion-size detection can be performed (e.g., by the object tracking system 106) to check if an object (and its corresponding tracker) has certain irregular size changes or has irregular motion according to the bounding box history of the tracker. For example, jumping trackers may correspond to objects from irrelevant neighboring blobs or from noisy background objects even when the blobs for the objects are consistently associated with a tracker.

In some examples, to identify whether a blob tracker has an irregular size change over the status duration, the size of the tracker within each frame t can be set to the size of the bounding box of the blob associated with the blob tracker in the frame. The size can be denoted as At. In one example, the size of a blob tracker can be determined by calculating the area of a bounding box associated with the blob tracker. The size ratio of a blob tracker across two consecutive frames is denoted as SRt, and is calculated as the bigger size bounding box divided by the smaller size bounding box, ensuring the size ratio is always set to be larger than or equal to 1.

An irregular size change can be determined when a change in size of the blob tracker between a previous video frame and the current video frame (as indicated by the size ratio SRt) is greater than a size change threshold. A number of irregular size changes that the blob tracker has experienced over its duration T can be determined, and the number of irregular size changes can be compared to a threshold number of irregular size changes. The blob tracker can be considered as a possible jumping tracker when the number of irregular size changes of the blob tracker is greater than the threshold number of irregular size changes.

In some aspects, different types of irregular size changes can be detected, and different threshold numbers can apply to the different types of irregular size changes. In some examples, the different types of irregular size changes can include dramatic size changes and significant size changes. A dramatic size change of a blob tracker's bounding boxes from one frame to another includes a size ratio greater than a dramatic size change threshold (denoted as $SR_t > R_d$). The term $R_d$ is the dramatic size change threshold of the size ratio and can be set to any suitable value (e.g., 2, 2.5, 3, 3.5, 4, 4.5, 5, or any other suitable value). In one illustrative example, if a bounding box of a blob tracker in a previous frame is 16×8 (e.g., 128 pixels) and a bounding box of the blob tracker in a current frame is 48×8 (e.g., 384 pixels), the size ratio SRt for the bounding box for the current frame is 3 (calculated as 384 divided by 128). In the same example, if the dramatic size change threshold $R_d$ is set to 2, the change in size of the blob tracker is considered a dramatic size change since the size ratio SRt of 3 is greater than the dramatic size change threshold of 2.

A significant size change of a blob tracker's bounding boxes from one frame to another includes a size ratio greater than a significant size change threshold (denoted as $SR_t > R_s$). The term $R_s$ is the significant size change threshold of the size ratio and can be set to any suitable value less than the dramatic size change threshold $R_d$ (e.g., 0.5, 1, 1.5, 2, or any other suitable value). In some cases, the significant size change threshold $R_s$ can be set to value that is close to, but less than, the dramatic size change threshold $R_d$. In one illustrative example, the dramatic size change threshold $R_d$ can be set to 2, and the significant size change threshold $R_s$ can be set to 1.5.

A number of dramatic size changes for a current blob tracker within the duration T (or Ts) can be calculated as $DC_T = \Sigma_{t=1}^{T}(SR_t > R_d? 1:0)$. Similarly, the number of significant size changes for a current blob tracker within the duration T (or Ts) can be calculated as $SC_T = \Sigma_{t=1}^{T}(SR_t > R_s? 1:0)$. If the number of dramatic size changes $DC_T$ is larger than a first threshold number C0, or the number of significant size changes $SC_T$ is larger than a second threshold number C1, the current blob tracker may be considered as a jumping tracker. The threshold numbers C0 and C1 can be set to any suitable number indicating a consistent pattern of size changes. In one illustrative example, C0 can be set to 3 and C1 can be set to 6. In some examples, a mixture of dramatic size changes and significant size changes may be detected and used to detect a blob tracker as a jumping tracker. For example, if any combination of dramatic size changes and significant size changes for a current blob tracker exceeds a third threshold number C2, the current blob tracker can be considered as a possible jumping tracker. The third threshold number C2 can be set to any suitable value, and can be the same as or different than the first and second threshold numbers C0 and C1. In one illustrative example, C0 can be set to 3 and C1 and C2 can be set to 6. In another illustrative example, C0 can be set to 3, C1 can be set to 6, and C3 can be set to 5.

In some examples, the threshold numbers C0 and/or C1 can be adjusted or set as different values for a new tracker than the values used for a split-new tracker. For example, smaller values can be used for split-new trackers because the threshold duration T2 for split-new trackers may be shorter than the threshold duration T1 for new trackers.

The irregular motion-size detection process 940 can also identify a blob tracker as a possible jumping tracker based on irregular motion changes of the blob tracker over the duration T (or Ts). For example, according to the history of the bounding boxes for a blob tracker, the motion (also referred to as the velocity) of the blob tracker for each frame t is calculated based on the centers of two bounding boxes of the blob tracker in two consecutive frames. Such velocity or motion can be denoted as Vt, which is a two dimensional vector. For example, as previously described, the velocity of a blob tracker can include the displacement of the blob tracker between consecutive frames.

In some examples, the irregular motion change of a blob tracker can include a detected motion direction consistency of the blob tracker. The motion direction consistency is based on velocities of the blob tracker between consecutive frames. For example, given two consecutive velocities $V_t$ and $V_{t-1}$ (both of which can be two dimensional vectors) for two consecutive frames, the inner product of the $V_t$ and $V_{t-1}$ vectors is calculated. In some examples, the inner product can be normalized according to the length values of both vectors. The inner product equals to the cosine of the angle between the $V_t$ and $V_{t-1}$ vectors, denoted as Cost. The inner product provides the change in direction of the vectors $V_t$ and $V_{t-1}$. For example, the inner product is equal to a value of 1 (after normalization) when the two vectors $V_t$ and $V_{t-1}$ are in the same direction. As another example, the inner product is equal to a value of −1 (after normalization) when the two vectors $V_t$ and $V_{t-1}$ are in opposite directions.

In some examples, the inner products between the $V_t$ and $V_{t-1}$ vectors of the blob tracker between multiple pairs of consecutive frames are calculated and are accumulated. For example, the inner product (Cost) results that correspond to detectable velocities (the non-zero velocities) are accumulated together to describe the motion direction consistency of the tracker. In order to avoid the cases when one or the vectors becomes too close to zero magnitude, the motion direction consistency of the blob tracker can be denoted as $MIC = \Sigma_{t=2}^{T}(Sig_t? Cos_t:0)/\Sigma_{t=2}^{T}(Sig_t?1:0)$, wherein the function $Sig_t$ checks whether the length of $V_t$ and $V_{t-1}$ are both larger than a certain value (e.g., 1 or other suitable value), mainly to exclude the cases when there is no motion in a certain frame for the tracker. Only if both vectors are significant, the inner product is taken into consideration for the average. For example, $Sig_t$ is used to avoid the case where there is no movement, in which case $V_t$ or $V_{t-1}$ is 0 when there is no movement, and with a 0 velocity the inner product cannot be normalized because the Cost will return an invalid value (e.g., infinity). The accumulation of the inner products is from t=2 to the duration T (or Ts), with t=2 being the second frame after the blob tracker was first created at t=1.

The motion direction consistency of the blob tracker can then be compared to a motion direction threshold. For example, if direction consistency (calculated as MIC) is smaller than a motion direction threshold M, the motion direction consistency is determined to be too inconsistent, and the tracker is considered as a possible jumping tracker. The value of MIC is in the range of −1 to 1. The motion direction threshold M can be set to any suitable value (e.g., −0.75, −0.5, −0.25, 0, 0.25, or other suitable value). In one illustrative example, if M is set to −0.5 (which corresponds to an angle of 120° between the vectors $V_t$ and $V_{t-1}$), then the motion direction consistency of a tracker must be between 1 and −0.5, meaning a change of direction between 0° and 120°.

In some examples, the irregular motion change of a blob tracker can include a detected motion magnitude consistency of the blob tracker. The motion magnitude includes the magnitudes of the velocities of the blob tracker for each frame over the duration T. For example, the magnitudes of velocities $V_t$ for the blob tracker over the duration is summed up as $SV = \Sigma_{t=1}^{T}|Vt|$. The summed velocity magnitudes SV is compared to a global motion magnitude. The global motion magnitude is a velocity vector that is calculated as the motion between the centers of the last bounding box (for frame t=T) and the first bounding box (for frame t=1) of the blob tracker, giving a global motion from the beginning of the tracker bounding box history to the end of the tracker bounding box history. The magnitude of the global motion is denoted as GV. The global motion GV is thus the motion between the first bounding box and the last bounding box, and the summed velocity magnitude SV is the accumulation of motion between bounding boxes of consecutive frames from t=1 to T. In some cases, the global motion magnitude GV is L−2 norm based (magnitude=$\sqrt{x^2+y^2}$).

The motion magnitude of the blob tracker can then be compared to a motion magnitude threshold. For example, the summed velocity magnitudes SV can be compared to the global motion magnitude GV multiplied by a velocity threshold (denoted as VelThres). The velocity threshold VelThres may be set to any suitable value (e.g., 2, 3, 4, 5, or other suitable value). If the summed velocity magnitudes SV is less than the global motion magnitude GV multiplied by a velocity threshold (denoted as SV<VelThres*GV), the motion magnitude of the blob tracker is considered as consistent and the current tracker is not considered as a jumping tracker due to this check. For example, if the accumulated velocity of a blob tracker is less than the global velocity of the blob tracker multiplied by the velocity threshold, then the step by step motion (per frame) of the blob tracker is not large enough to be considered as a jumping tracker. Otherwise, the current tracker is considered as a possible jumping tracker. For example, if the summed velocity magnitudes SV is greater than the global motion magnitude GV multiplied by the velocity threshold (denoted as SV>VelThres*GV), the current blob tracker is considered as a jumping tracker.

In some examples, the x- and y-dimension of $V_t$ as well as that of the global motion can be used to quantify the motion consistency of a blob tracker. For example, instead of using magnitude of the vector for local motion, the absolute value of the x-dimension and the absolute value of the y-dimension of $V_t$ can be determined and added up. The summed value can be used instead of the magnitude. In one illustrative example, a vector with magnitude 5 can have a x-dimension value of 3 and a y-dimension value of 4, and the summed x- and y-dimension values are 7. The 7 value can be used instead of the 5 value in the motion consistency calculation. Similarly, the absolute value of the x-dimension and the absolute value of the y-dimension of the global motion can be used to in the motion magnitude consistency calculation. In such examples, the summed x- and y-dimensions of the velocity vectors of the blob tracker over the duration can be compared to the global motion x- and y-dimensions to determine the consistency of the motion magnitude for the blob tracker.

In some examples, the motion magnitude can be compared to the size of the current bounding box. For example, the size of the bounding box can be determined as its width and height (e.g., sum of width and height, product of the width and height, or the like), and the motion of the bounding box is determined from its center point. Here, the magnitude can be normalized according to the size of the bounding box. The velocity threshold VelThres used for motion magnitude consistency can thus be adjusted according to the size of the bounding box currently being analyzed. For example, for bigger bounding boxes, the velocity threshold VelThres may be lowered.

In some situations, it may be suitable to implement a less aggressive irregular motion-size detection process. For example, there are cases when the motion of an object in a scene is at least partially perpendicular to the image plane (e.g., an object moving towards the camera or moving away from the camera). In such cases, even when the motion is relatively significant, the SV or other summed up local motion according to center position movement of an object will be relatively small, leading to a tracker associated with a real object being detected as a jumping tracker and the object being transitioned to the intermediate state ("next round"). In such situations, the relevant thresholds can be adaptively adjusted to make them larger (thus less aggressive) based the content in a scene.

To implement less aggressive jumping tracker detection, a half-way global motion (denoted as $V_h$) of a blob tracker can be calculated. The half-way global motion $V_h$ is derived from the center positions of two bounding boxes of the blob tracker at two relative timestamps 1 and T/2, with T/2 being the frame halfway between the original frame for which the blob tracker was created and the duration T (in such cases, T can be replaced with Ts for split-new trackers). The magnitude of $V_h$ is then derived and scaled by a value (e.g., a value of 2, 3, or other suitable value). The magnitude of $V_h$ is denoted as GVH, with GVH=|Vh|). The ratio between GVH and GV is calculated as r=min (GVH, GV)/max (GVH, GV). The velocity threshold VelThres can then be set to be a function of r. The GVH and GV are compared to one another because ideally the GVH and GV values should be proportional over the duration T of a blob tracker, assuming uniform motion. If GVH and GV are consistent, then the velocity threshold VelThres can be left unchanged. However, if GVH and GV are inconsistent (as indicated by the ratio r), then the velocity threshold VelThres can be adjusted according to the ratio r.

In some cases, there can be situations when none of the above jumping tracker checks (e.g., size change, motion direction consistency, and motion magnitude consistency) individually leads to a blob tracker being detected as a possible jumping tracker. In some examples, the factors of the above checks can be jointly considered to determine whether a blob tracker is a possible jumping tracker. For example, if the comparisons of the various characteristics are close to the conditions for each jumping tracker check (within a certain percentage, such as 5%, 10%, 15%, or any other suitable value), the blob tracker can be considered as a possible jumping tracker.

As noted above, once the blob tracker is detected as a possible jumping tracker, the tracking system 106 can transition the blob tracker to the intermediate status ("next round") at step 944.

In some implementations, a freeze tracker detection process can be applied in addition to the long duration bounding box analysis process and the irregular motion-size detection process. For example, in some cases, when it is the first determination cycle for a tracker (e.g., the first time the status duration T is met for a new tracker, such as at frame 30, or when the status duration Ts is met for a split-new tracker, such as at frame 15), a tracker may only be output (e.g., as a normal tracker immediately for the current frame, when all trackers for the current frame are processed, or the like) when the tracker passes both the freeze tracker detection process and the irregular motion-size detection process. In some cases, if the freeze tracker detection process or the irregular motion-size detection process is not positive (the tracker is a freeze tracker or a jumping tracker), the tracker may be transitioned to the intermediate status ("next round" status). In some cases, even when a tracker passes both the freeze tracker detection process and the irregular motion-size detection process, a strong pixel level analysis (or a lightweight pixel level analysis) may be applied before the tracker can be output. However, in the first determination cycle, even when both the freeze tracker detection process and the irregular motion-size detection process imply a false positive object (due to a freeze tracker determination and a jumping tracker determination), the tracker is not killed immediately, but is instead transitioned to the intermediate status so that it will wait for the next round of the true-false positive detection process 600A to be possibly killed by the long duration bounding box analysis. Using such a technique, the tracking delay may be greatly reduced for a tracker.

Figure 10:
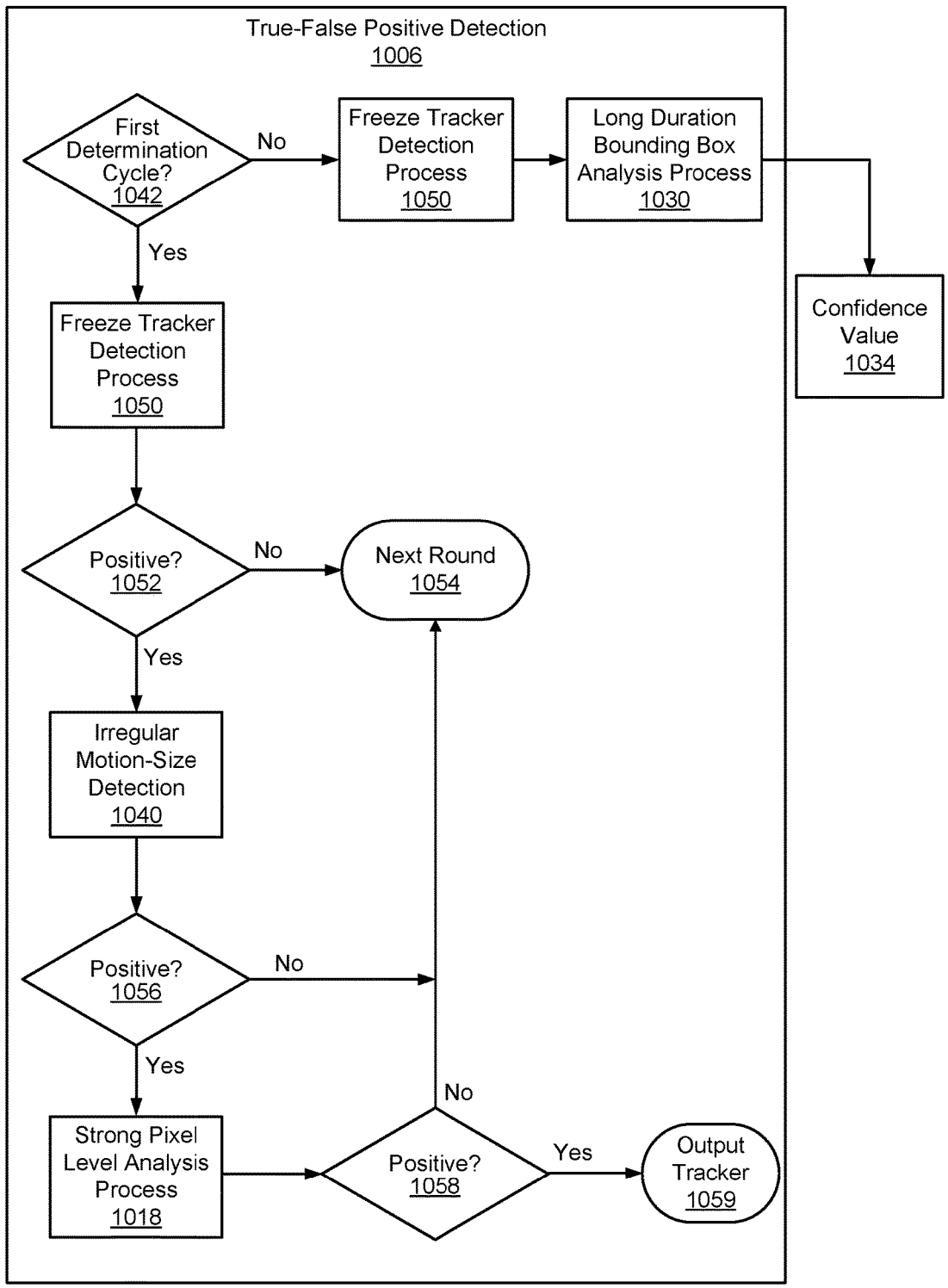
FIG. 10 is a flowchart illustrating another example of a true-false positive detection process, in accordance with some embodiments.

FIG. 10 is a flowchart illustrating an example of a true-false positive detection process 1006 that includes the long duration bounding box analysis process 1030, the freeze tracker detection process 1050, and the irregular motion-size detection process 1040. At step 1042, the true-false positive detection process 1006 determines whether it is the first determination cycle for a tracker. For example, the process 1006 can determine whether it is the first determination cycle after determining that the status duration has been met (e.g., after Duration % T=0 is determined at step 604 of the process 600A). If, at step 1042, it is determined that it is not the first determination cycle for a tracker (e.g., determined to be n*T or n*Ts, with n>1), the long duration bounding box analysis process 1030 is performed, as described above, to determine a confidence value 1034 for the tracker.

If, at step 1042, it is determined that it is the first determination cycle for a tracker (at 1*T or 1*Ts), the freeze tracker detection process 1050 is performed. The freeze tracker detection process 1050 can be used to determine trackers (and the objects they are tracking) that are relatively frozen or still, which are referred to as frozen trackers or freeze trackers. Further details regarding freeze tracker detection is described below. In some cases, the freeze tracker detection process 1050 is only applied in the first determination cycle for a tracker. In other cases, the freeze tracker detection process 1050 can also be applied in other cycles (other than the first determination cycle) before the long duration bounding box analysis process 1030 is applied, as shown in FIG. 10. In such cases, instead of checking the whole bonding box history for the tracker, only the recent T frames can be checked. In some implementations, if a current tracker is detected as a freeze tracker, a strong pixel level analysis may apply in the long duration bounding box analysis process 1030 regardless of the confidence value of the tracker (e.g., even when the confidence value is determined to be larger than TC2 at step 616).

As noted above, the freeze tracker detection process 1050 can be performed (e.g., by the object tracking system 106) to check if an object (and its corresponding tracker) is too still or static according to the bounding box history of the tracker. In some examples, an alignment threshold and an overlapping ratio between bounding boxes of a tracker can be used to detect frozen objects and frozen trackers. The overlapping ratio can be compared to the alignment threshold to determine if the tracker is still or static in the current frame (relative to a previous frame). The alignment threshold (denoted as $F_{Align}$) indicates how much of overlap in terms of percentage the history of bounding boxes of a current blob tracker aligns. In some cases, the percentage of overlap can be normalized to 0 and 1. As previously noted, the current blob tracker is the tracker currently being analyzed in the current frame.

In some cases, the alignment threshold $F_{Align}$ can be set to be adaptive to the size of a current bounding box. For example, a small size may corresponds to a smaller alignment threshold. The current bounding box can be the bounding box for the current blob tracker (e.g., determined from the bounding box of the current blob with which the current blob tracker is associated). In some examples, the alignment threshold $F_{Align}$ can be set to a relatively smaller value for a smaller bounding box below a first size threshold, and can be set to a larger value for a larger bounding box above a second size threshold. The first size threshold and the second size threshold can be the same value or a different value. In one illustrative example, the alignment threshold $F_{Align}$ is set as follows:

$$F_{Align} = \begin{cases} 0.7, & \text{if size} < T_A \\ 0.85, & \text{if size} > T_B \\ 0.8, & \text{otherwise} \end{cases} \qquad \text{Equation (2)}$$

where $T_A$ is the first size threshold, $T_B$ is the second size threshold, and size is the size of the bounding box of the current blob tracker in the current frame. In one illustrative example, $T_A$ can be equal to 129 (e.g., corresponding to a 16×8, 8×16, 4×32, 32×4, or other suitable size bounding box) and $T_B$ can be equal to 4096 (e.g., corresponding to a 64×64, 32×128, 128×32, or other suitable size bounding box). As shown by equation 2, when the size of the bounding box of the current blob tracker is less than $T_A$, the alignment threshold is set to 0.7. When the size of the current bounding box of the current blob tracker is greater than $T_B$, the alignment threshold is set to 0.85, which is much larger than 0.7. When the otherwise condition is met, meaning that the size of the current bounding box is not less than $T_A$ and is not more than $T_B$, the alignment threshold is set to 0.8. One of ordinary skill in the art will appreciate that the example in equation 2 is illustrative, and that any other values of the alignment threshold and the size thresholds $T_A$ and $T_B$ can be used.

In order to measure the level of stillness of the current object (and the corresponding current blob tracker) being tested, an overlapping ratio can be measured. The overlapping ratio includes a ratio of the intersection and union of two bounding boxes of the current blob tracker over two consecutive frames. For example, the two bounding boxes can include the bounding box of the current blob tracker from the current frame and the bounding box of the current blob tracker from the previous frame. In one illustrative example, for a later frame t (e.g., a current frame), the intersection of the two bounding boxes is denoted as $I_t$ and the union is denoted as $U_t$. Using such notation, the overlapping ratio for the two bounding boxes is defined as $\alpha_t = I_t/U_t$ and therefore is the overlapping ratio for the current blob tracker for frame t. As explained previously, FIG. 8 illustrates an example of an intersection I and union U of two bounding boxes $BB_A$ 802 of the blob tracker in the current frame and bounding box $BB_B$ 804 of the blob tracker in the previous frame.

The overlapping ratio $\alpha_t$ of the current blob tracker can be compared to the alignment threshold $F_{Align}$ to determine if the blob tracker is still (or static) in the current frame. For example, if the overlapping ratio $\alpha_t$ is larger than the alignment threshold $F_{Align}$ (denoted as $\alpha_t > F_{Align}$), the blob tracker is considered to be static in the current frame t (compared to the previous frame). In some examples, if the ratio $\alpha_t$ is smaller than the alignment threshold $F_{Align}$ (denoted as $\alpha_t \geq F_{Align}$), the blob tracker is considered to be not static in the current frame t (compared to the previous frame).

In some examples, the number of frames the current blob tracker is considered as being still can be determined. In such examples, the total number of still frames within a duration is firstly used as a condition to determine if a tracker is freeze tracker. The number of frames the current blob tracker is considered as being still can be denoted as $s_T = \Sigma_{t=1}^{T}(\alpha_t > F_{Align}? 1:0)$, where the bounding boxes, blobs, and the containing frames are denoted with the relative timestamp of t, with t being from 1 through T (or Ts), and where 1 is the time when the tracker was created and T (or Ts, e.g., measured in frames) is the time when the tracker is being checked to be a frozen tracker. The terminology "?1:0" indicates that a counter is incremented (with a value of 1) when the condition $\alpha_t > F_{Align}$ is met, and that the counter is not incremented when the condition $\alpha_t > F_{Align}$ is not met. In one illustrative example, if T is equal to 10 frames (indicating that it has been ten frames since the blob tracker was created), and the condition $\alpha_t > F_{Align}$ is met for eight out of the ten frames, the $s_T$ counter will have a value of eight.

The number of frames $s_T$ the current blob tracker is considered as being still can then be compared to a threshold number of frames to determine if the current blob tracker is a possible frozen tracker or if the tracker is a good candidate to be detected as a frozen tracker. In one illustrative example, the number of frames $s_T$ is compared with the total number of frames T since the tracker was created. For example, a threshold To can be set as a percentage of the total number of frames since the tracker is created (and can be denoted as a threshold number of frames To). A multiplier m can be set to a relatively large number close to 1 (e.g., 0.7, 0.75, 0.8, 0.85, 0.9, or other suitable value), such that the threshold To requires a blob tracker to be still in most of the frames since it was created to be considered as a frozen tracker. The threshold To can be denoted as To=m*T. If the number of frames $s_T$ is larger than the threshold To (denoted as $s_T > m*T$), the current tracker is considered as a frozen tracker or as a good candidate to be detected as a frozen tracker. In one illustrative example, if m is set to 0.85, to be considered as a frozen tracker, the number of frames ($s_T$) the blob tracker must be detected as being still is 85% of the total number of frames (T) since the blob tracker was created.

In some cases, when a blob tracker does not meet the condition $s_T > m*T$, the blob tracker is determined not to be a good candidate for a freeze tracker, and the whole frozen tracker detection process (e.g., step 1050 in FIG. 10) can terminate for the blob tracker and can identify the blob tracker as not being a frozen tracker. In such cases, the process 1006 can determine, at step 1052, that the freeze tracker detection process 1050 provides a positive result (indicating a possible true positive), and can proceed to the irregular motion-size detection process 1040.

In some cases, when a blob tracker meets the condition $s_T > m*T$, the blob tracker can be detected as a frozen tracker and is a candidate for a false positive tracker. In such cases, the process 1006 can determine, at step 1052, that a negative result is provided by the freeze tracker detection process 1050, and can transition the tracker to the intermediate status ("next round") at step 1054 so that the tracker can be evaluated using the long duration bounding box analysis process 1030 (and possibly the freeze tracker detection process 1050) when the next status duration is met (at the next round of the true-false positive detection process 600A).

In some examples, when a blob tracker meets the condition $s_T > m*T$, the blob tracker can be considered as a good candidate for a frozen tracker. In such cases, even a blob tracker that is a good candidate for a frozen tracker can be associated with a blob for a real object. For example, the blob tracker (and its associated blob and object) may just move slowly, but consistently, in one direction. Such movement of a blob tracker may lead to the condition $s_T > m*T$ being satisfied by the history of the blob tracker. Therefore, in order to prevent a blob tracker with such type of movement from being detected as a frozen tracker, in addition to the stillness inspection between always two consecutive frame pairs, the global stillness can be checked to determine whether the current tracker is still. More specifically, several pairs of bounding boxes can be sampled from the beginning and end of the bounding box history for the blob tracker. For example, the sample pairs of bounding boxes can be associated with timestamp pairs of (1+i, T−i), wherein i is equal to 1 through n, and wherein n can be a number (e.g., 4, 5, 6, 7, or any other suitable number). In one illustrative example, if T is equal to 30, and i is equal to 0 through 4 (with n=5), the sampled pairs of bounding boxes for the blob tracker include the bounding box pairs (1, 29), (2, 28), (3, 27), (4, 26), and (5, 25), with the notation (a, b) referring to (frame a, frame b) of the given duration T. Therefore, n pairs of bounding boxes can be chosen.

An overlapping ratio $\alpha_i'$ is calculated similarly as $\alpha_t$, but $\alpha_i'$ is based on the intersection and union of blobs in frame 1+i and frame T−i instead of consecutive frames. The overlapping ratio $\alpha_i'$ can be compared to a threshold $F_r$ to determine global movement of the blob tracker. The threshold $F_r$ can be a fixed value (e.g., 0.75, 0.80, 0.85, or other suitable value). In one illustrative example, if $\alpha_i'$ is smaller than a threshold $F_r$ (denoted as $\alpha_i' < F_r$), the blob tracker is considered to be moving and thus not a frozen tracker. In such an example, the whole frozen tracker detection process (e.g., step 1050 in FIG. 10) can terminate for the blob tracker and can identify the blob tracker as not being a frozen tracker. The process 1006 can determine a positive result at step 1052 and can proceed to the irregular motion-size detection process 1040.

In some examples, when, for any pair among the n pairs of tracker bounding boxes, the overlapping ratio $\alpha_i'$ is always larger than $F_r$ (indicating the global movement is small due to much overlap), the blob tracker that was considered as a good candidate for a frozen tracker is finally identified as a frozen tracker. Once the blob tracker is detected as a frozen tracker, the process 1006 can determine, at step 1052, that a negative result is provided by the freeze tracker detection process 1050. The process 1006 can then transition the tracker to the intermediate status ("next round") at step 1054 so that the tracker can be evaluated using the long duration bounding box analysis process 1030 (and possibly the freeze tracker detection process 1050) at the next status duration.

As noted above, once a positive freeze tracker detection result is determined for a tracker at step 1052 (a tracker is not considered a freeze tracker), the irregular motion-size detection process 1040 is applied to the tracker. The irregular motion-size detection process 1040 is described above with respect to FIG. 9, and is used to determine whether a tracker (and the object it is tracking) has size changes and/or motion that are too irregular to be tracking an true positive object. For example, if a positive result is determined at step 1056 based on the irregular motion-size detection process 1040, the strong pixel level analysis process 1018 is performed, as described above. If a positive result is returned at step 1058 based on the strong pixel level analysis process 1018, the process 1006 can output the tracker at step 1059. If a positive result is not returned at step 1058 based on the strong pixel level analysis process 1018, the process 1006 can transition the tracker to the intermediate status ("next round") at step 1054 so that the tracker can be evaluated using the long duration bounding box analysis process 1030 (and possibly the freeze tracker detection process 1050) at the next status duration. If a negative result is determined at step 1056 (or a positive result is not determined) based on the irregular motion-size detection process 1040, the process 1006 can transition the tracker to the intermediate status ("next round") at step 1054.

For example, if the irregular motion-size detection process 1040 determines the tracker (and the object) is potentially a jumping tracker (e.g., the size and/or motion of the tracker are too irregular to be an object of interest) using the techniques described above, the process 1006 can determine, at step 1056, that a negative result is provided by the irregular motion-size detection process 1040. The process 1006 can then transition the tracker to the intermediate status ("next round") at step 1054 so that the tracker can be evaluated using the long duration bounding box analysis process 1030 (and possibly the freeze tracker detection process 1050) at the next status duration.

If the irregular motion-size detection process 1040 is positive, indicating the tracker and its object do not have irregular motion or size and thus is not a jumping tracker, the process 1006 can perform a strong pixel level analysis process 1018. In some cases, a lightweight pixel level analysis can be performed at step 1018. One example of a lightweight pixel level analysis can include determining a correlation between the texture of the current blob associated with the tracker for the current frame and the co-located texture of a mean (background) picture, as described above. An example of a strong pixel level analysis can include calculating a correlation using two or more color components of each pixel making up the current blob. For instance, a correlation can be calculated between all three color components of the pixels of the current blob and all three color components of the corresponding pixels of the mean picture.

If the strong level pixel level analysis process 1018 (or a lightweight pixel level analysis) determines that the correlation is above the correlation threshold described above, indicating a high correlation, the process 1006 can determine, at step 1058, that a negative result is provided by the strong pixel level analysis process 1018 (or a lightweight pixel level analysis). When a negative result is returned at step 1058, the process 1006 can transition the tracker to the intermediate status ("next round") at step 1054 so that the tracker can be evaluated using the long duration bounding box analysis process 1030 (and possibly the freeze tracker detection process 1050) at the next status duration. In some cases, when a negative result is returned at step 1052, 1056, or 1058, the tracker can be kept in the memory for the next round of analysis by the true-false positive detection process 1006.

If the strong level pixel level analysis process 1018 (or a lightweight pixel level analysis) determines that the correlation is below the correlation threshold described above, indicating a low correlation, the process 1006 can determine, at step 1058, that a positive result is provided by the strong pixel level analysis process 1018 (or a lightweight pixel level analysis). When a positive result is determined at step 1058, the process 1006 can output the tracker at step 1059 (e.g., immediately for the current frame, once all trackers for the current frame have been processed, or at some other time).

FIG. 11 is a flowchart illustrating an example of a process 1100 of maintaining blob trackers for one or more video frames using the techniques described herein. At step 1102, the process 1100 includes identifying a blob tracker for a current video frame. The blob tracker is associated with a blob detected for the current video frame. The blob includes pixels of at least a portion of one or more objects in the current video frame.

At step 1104, the process 1100 includes determining a current characteristic of pixels in a region of the current video frame associated with the blob tracker. For example, region of the current frame may be included in a bounding region (e.g., a bounding box) of the blob tracker. At step 1106, the process 1100 includes determining a previous characteristic of pixels in a region of a previous video frame associated with the blob tracker. For example, region of the previous frame may be included in a bounding region (e.g., a bounding box) of the blob tracker. The current characteristic and the previous characteristic can include color characteristics of the corresponding pixels.

At step 1108, the process 1100 includes determining a difference between the current color characteristic and the previous color characteristic. At step 1110, the process 1100 includes determining a status of the blob tracker based on the determined difference. The status of the blob tracker indicates whether to maintain the blob tracker for the one or more video frames. For example, the blob tracker can be maintained for future frames and can be re-checked by the appearance based true-false positive detection process at the next status duration. In some examples, the determined status of the blob tracker includes a first type of blob tracker that is output as an identified blob tracker-blob pair, a second type of blob tracker that is maintained for further analysis, or a third type of blob tracker that is removed from a plurality of blob trackers maintained for the one or more video frames.

In some examples, the status of the blob tracker is determined to be the first type of blob tracker when the difference is greater than a threshold difference. The threshold difference can also be referred to as a threshold distance. In one illustrative example, the threshold difference (or distance) can be set to a percentage of the diagonal distance of a bounding box of the blob tracker (e.g., less than 1%, 2%, or other suitable value of the diagonal distance), such as the target bounding box of the blob tracker, as described above. In some implementations, the status of the blob tracker is determined to be the first type of blob tracker when an object the blob tracker is tracking is larger than a threshold size and when the difference is greater than the threshold difference. For example, the true-false positive detection process 600B for large objects can be performed for the blob tracker, as previously described, to determine that the blob tracker is tracking a blob representing a large object and is to be output at the system level.

In some examples, the status of the blob tracker is determined to be the second type of blob tracker when the difference is less than the threshold difference. In some implementations, the status of the blob tracker is determined to be the second type of blob tracker when an object the blob tracker is tracking is larger than a threshold size and when the difference is less than a threshold difference. For example, the true-false positive detection process 600B for large objects can be performed for the blob tracker, as previously described, to determine that the blob tracker is tracking a blob representing a large object and is to be maintained for a next round of analysis by the appearance based true-false positive detection process 600A.

In some examples, the status of the blob tracker is determined to be the third type of blob tracker when the difference is less than the threshold difference. For example, the blob tracker can be killed and thus removed from the blob trackers maintained for the one or more video frames when the difference between the current color characteristic and the previous color characteristic is less than the threshold difference.

In some examples, determining the current color characteristic and the previous color characteristic includes obtaining an appearance model for the blob tracker. The appearance model can be denoted as the initial appearance model for the blob tracker. The appearance model includes one or more color characteristics of the pixels in the region of the previous video frame included in a previous bounding region of the blob tracker. In one illustrative example, the appearance model can include a color probability model or a color histogram of the pixels in the region of the previous video frame. For instance, the one or more color characteristics of the initial appearance model can include a previous color histogram of the pixels in the region of the previous video frame included in the previous bounding region. Other suitable techniques for representing the pixels in the region can be used. In such examples, the process 1100 further includes determining the previous color characteristic of the blob tracker for the previous video frame using the appearance model. In such examples, the process 1100 further includes determining the current color characteristic of the blob tracker for the current video frame using the appearance model.

In some implementations, the previous color characteristic includes a previous color mass center of the pixels in the region of the previous video frame included in the previous bounding region. For example, the previous bounding region can include the target bounding region (e.g., target bounding box) of the blob tracker and the previous video frame can include the frame at which the blob tracker is initially created (or split). As previously described, the target bounding box (or other bounding region) can be created for the blob tracker in the previous frame at which the tracker is initially created (or split), or can be created at a frame that occurs at a duration Tc. The initial appearance model for the blob tracker can also be created when the target bounding region (e.g., target bounding box) is created.

In some implementations, the current color characteristic of the blob tracker includes a current color mass center of the pixels in the region of the current video frame included in a current bounding region of the blob tracker. For example, the current bounding region can include a current bounding region of the blob tracker for the current frame, in which case the appearance model and the pixels included in the current bounding region in the current frame are used to determine the current color mass center.

In some examples, determining the difference between the current color characteristic and the previous color characteristic includes determining a distance between the previous color mass center and the current color mass center (denoted above as $\|C_o - C_t\|$). In such examples, determining the status of the blob tracker based on the determined difference includes comparing the distance to a diagonal distance of the previous bounding region (e.g., of the target bounding box of the blob tracker). In such examples, determining the status of the blob tracker further includes determining the blob tracker is the third type of tracker (e.g., is to be killed and removed from the maintained blob trackers) when the distance is less than a threshold distance (or threshold difference). In some cases, the threshold distance is a percentage of the diagonal distance of the previous bounding region.

In some examples, the process 1100 can include performing a foreground pixel fullness analysis on the pixels in the region of the current video frame included in a current bounding region of the blob tracker. As described herein, the foreground pixel fullness analysis can include comparing a foreground pixel fullness ratio of the current bounding region against a foreground pixel fullness ratio threshold. In examples for which the foreground pixel fullness analysis is performed, determining the status of the blob tracker is based on the foreground pixel fullness analysis. In some case, the process 1100 can include determining that an input status of the blob tracker indicates that a determination of the status of the blob tracker is to be deferred to a subsequent video frame (e.g., a "next round" status). The subsequent video frame occurs after the current video frame in a video sequence that includes the one or more video frames. The process 1100 can further include determining whether to perform the foreground pixel fullness analysis based on a confidence value associated with the blob tracker, the confidence value being determined based on a set of historical attributes associated with a bounding region of the blob tracker in a set of previous video frames of the video sequence. The process 1100 can perform other aspects of the foreground pixel fullness analysis described herein, including, for example, one or more of the techniques described below with respect to the process 2200 illustrated by the flowchart shown in FIG. 22.

In some examples, the process 1100 can include determining a correlation between color components of the current video frame and color components of a mean picture. The mean picture can be determined using the techniques described above. In such examples, the status of the blob tracker is determined based on the determined difference and the determined correlation. Such examples can include the strong pixel level analysis described above, in which case the AMFR process and CFR process are both performed.

In some examples, the process 1100 may be performed by a computing device or an apparatus, such as the video analytics system 100. For example, the process 1100 can be performed by the video analytics system 100 shown in FIG. 1. In some cases, the computing device or apparatus may include a processor, microprocessor, microcomputer, or other component of a device that is configured to carry out the steps of process 1100. In some examples, the computing device or apparatus may include a camera configured to capture video data (e.g., a video sequence) including video frames. For example, the computing device may include a camera device (e.g., an IP camera or other type of camera device) that may include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other image capture device that captures the video data is separate from the computing device, in which case the computing device receives the captured video data. The computing device may further include a network interface configured to communicate the video data. The network interface may be configured to communicate Internet Protocol (IP) based data.

Process 1100 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Using the above-described appearance based true-false positive detection techniques, objects can be more accurately identified as true or false positives prior to being output at the system level. For example, false positive objects/blobs can always be detected. However, as long as they are not output at the system level and no events (e.g., display of a tracker tracking the object, an alarm, and/or other event) are formulated according to those false positive blobs, the whole system is still stable. The proposed techniques attempt to get rid of the system level false positive events, and is critical to the overall performance of the tracking system in the video analytics system. However, a false positive removal mechanism that uses a correlation-based pixel level analysis may not be successful in detecting false positive objects that undergo small local movements (e.g., due to wind or other external event). Using the techniques described herein, objects with such small local movements (e.g., of foliage or other false positive object) can be very well captured by the AMFR process.

In addition, although the long duration bounding box module may accurately detect false positive objects with significant motion, it may not be reliable for determining whether an object with small motion should be considered as a false positive and removed immediately from the buffer. However, AMFR in this case plays a good role to further confirm the false positive status, and thus can help to keep true positive objects for tracking with a high probability.

Various test conditions are described below and objective simulation results are shown in Table 1 and Table 2 in order to illustrate results of the techniques discussed herein. Simulations are done by utilizing the so-called VAM report (which has been upgraded recently) to include criteria such as object level true positive rate, false positive rate, maximum delay per video clip, and average delay over all objects per video clip. Conventional VIRAT video clips were used for Table 1 and other video clips were used for Table 2. All of the video clips are well labeled and the VAM report compares the results (as tracked bounding boxes) with a marked ground truth anchor method. The anchor method can include a false positive detection process that uses bounding box history and a correlation-based pixel level analysis. All 32 of the VIRAT video clips can be used for the professional security case, while the "other" dataset including 28 video clips can be used for the home security case. Both datasets range from easy to difficult video clips.

As shown in Table 1, maintaining a same true positive rate, the proposed techniques are able to further decrease the false positive rate by 2.5%. The increase in the tracking delay is at an acceptable level.

TABLE 1

Results for VIRAT Dataset

| VIRAT | True positive rate (%) | False positive rate (%) | Average tracking delay (sec.) | Max tracking delay (sec.) |
|---|---|---|---|---|
| Anchor | 87.42 | 6.85 | 2.04 | 7.69 |
| Proposed | 87.23 | 4.32 | 2.31 | 8.74 |

As shown in Table 2, for the sequences representing the home security case, the false positive rate has been decreased by more than half, which is quite significant. Again, the increase in the tracking delay is at an acceptable level.

TABLE 2

Results for Other Dataset

| Other | True positive rate (%) | False positive rate (%) | Average tracking delay (sec.) | Max tracking delay (sec.) |
|---|---|---|---|---|
| Anchor | 99.64 | 15.97 | 2.34 | 2.94 |
| Proposed | 99.64 | 7.61 | 2.53 | 3.13 |

Note that for both cases, the false positive rate was already in a level of less than 10% or around 15%, so a reduction of several percentage points in this case is huge from the end-to-end perspective.

Subjective results of the techniques discussed herein are described below with respect to FIG. 12-FIG. 19. Results of both methods are shown in bounding boxes with different tracker IDs—the tracker IDs ending in "a" result from using the techniques discussed herein and the tracker IDs ending in "b" result from using the anchor method. Tracker bounding boxes with two tracker IDs (one ending in "a" and the other ending in "b") indicate that there are two identical overlapping bounding boxes, one output using the techniques discussed herein and one output using the anchor method.

Figure 12:
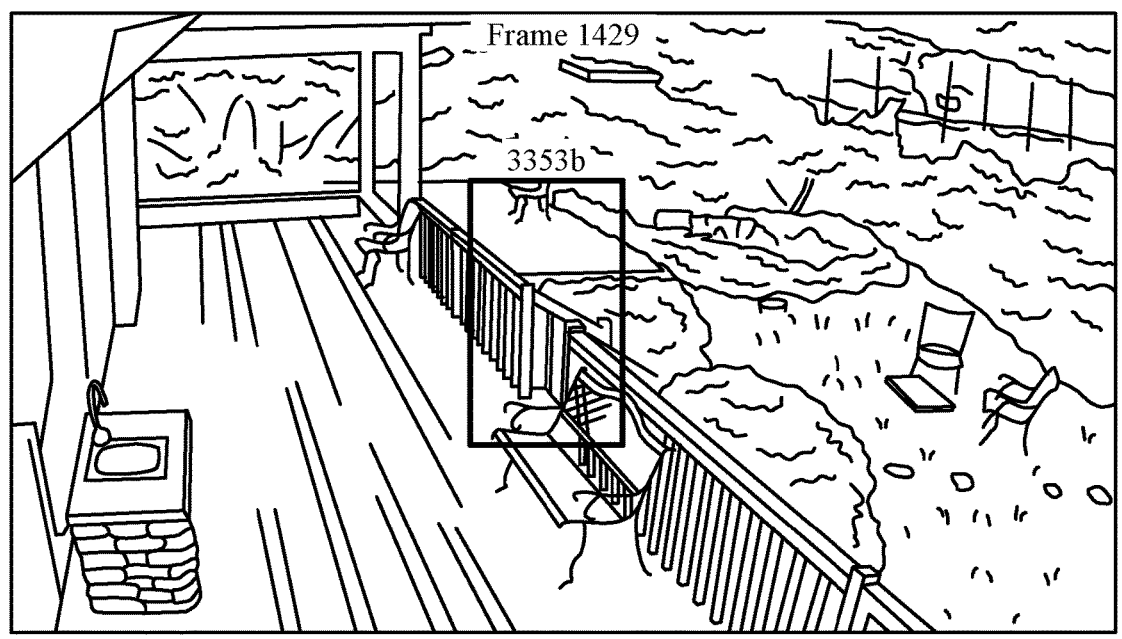
FIG. 12 is an illustration of a video frame of an environment in which various objects are tracked, in accordance with some examples.

As shown in FIG. 12 (frame 1429), the false positive object being tracked by a tracker with label 3353b is output using the anchor method due to small movements of the foliage (e.g., caused by wind or a person moving the foliage). The proposed appearance based true-false positive detection process identifies the object as a false positive and thus does not output the object.

Figure 13:
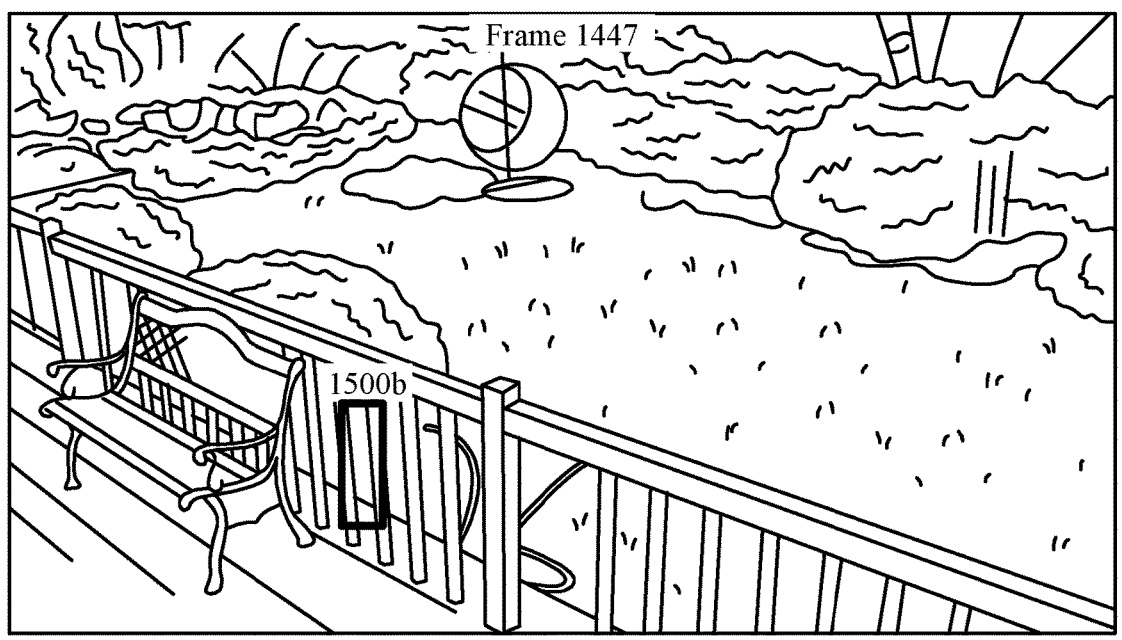
FIG. 13 is an illustration of a video frame of an environment in which various objects are tracked, in accordance with some examples.

As shown in FIG. 13 (frame 1447), the false positive object being tracked by a tracker with label 1500b is output using the anchor method, whereas the proposed appearance based true-false positive detection process identifies the object as a false positive and does not output the object.

Figure 14:
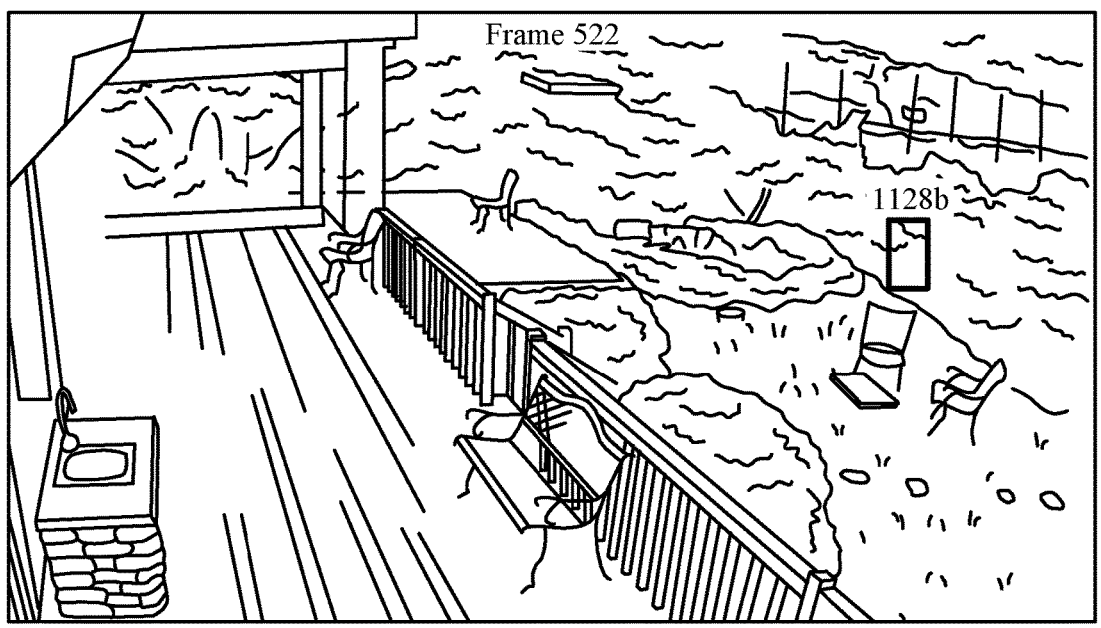
FIG. 14 is an illustration of a video frame of an environment in which various objects are tracked, in accordance with some examples.

As shown in FIG. 14 (frame 522), the false positive object being tracked by a tracker with label 1128b is output using the anchor method, whereas the proposed appearance based true-false positive detection process identifies the object as a false positive and thus does not output the object.

Figure 15:
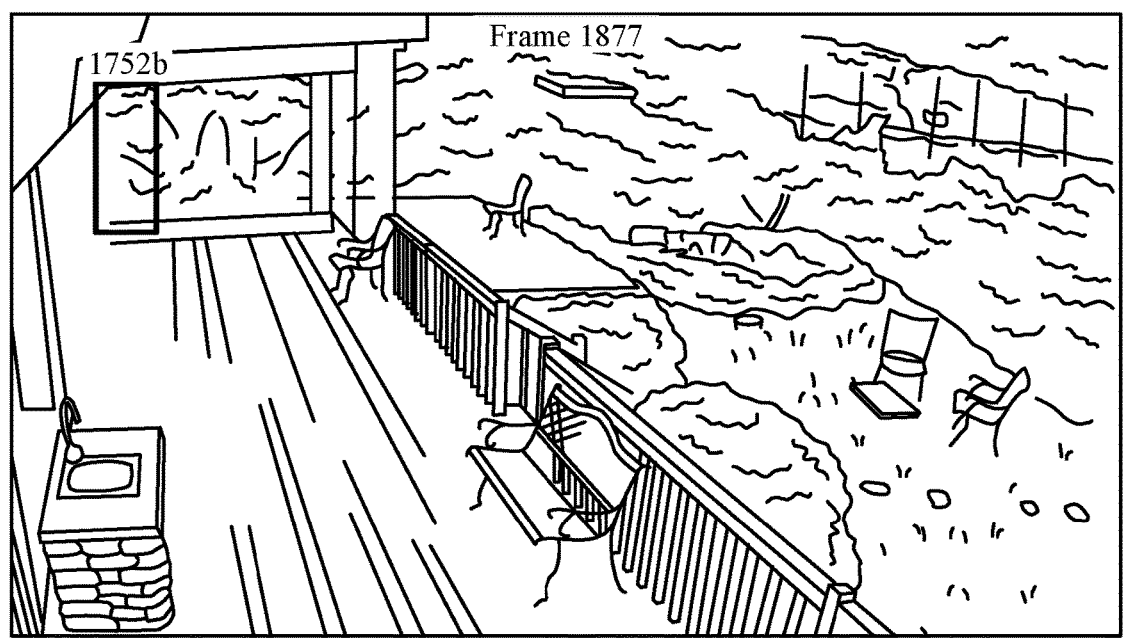
FIG. 15 is an illustration of a video frame of an environment in which various objects are tracked, in accordance with some examples.

As shown in FIG. 15 (frame 1877), the false positive object being tracked by a tracker with label 1752b is output using the anchor method. The proposed appearance based true-false positive detection process identifies the object as a false positive and thus does not output the object.

Figure 16:
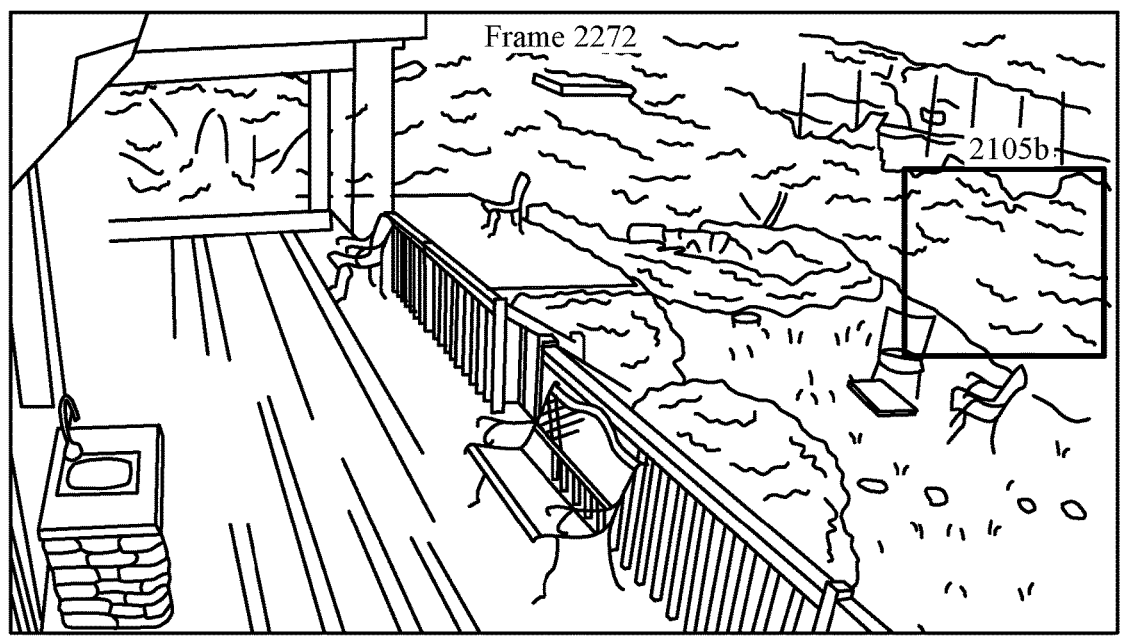
FIG. 16 is an illustration of a video frame of an environment in which various objects are tracked, in accordance with some examples.

As shown in FIG. 16 (frame 2272), the false positive object being tracked by a tracker with label 2105b is output using the anchor method, whereas the proposed appearance based true-false positive detection process identifies the object as a false positive and thus does not output the object.

Figure 17:
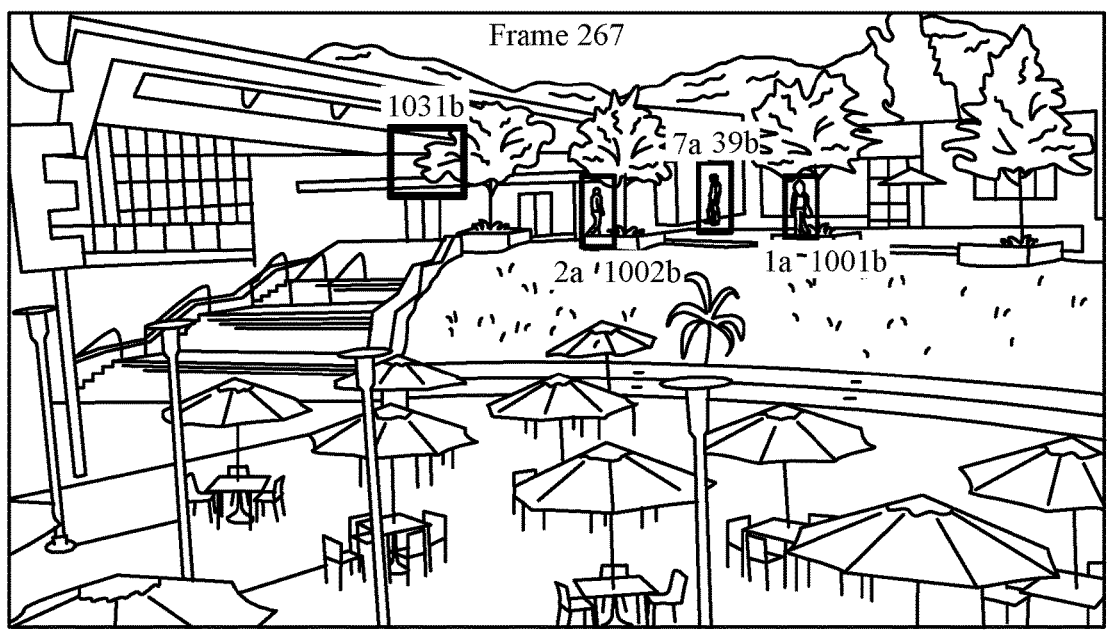
FIG. 17 is an illustration of a video frame of an environment in which various objects are tracked, in accordance with some examples.

As shown in FIG. 17 (frame 267), the false positive object being tracked by a tracker with label 1031b is output using the anchor method due to small movement of a portion of the tree. The proposed appearance based true-false positive detection process accurately identifies the object as a false positive and thus does not output the object.

Figure 18:
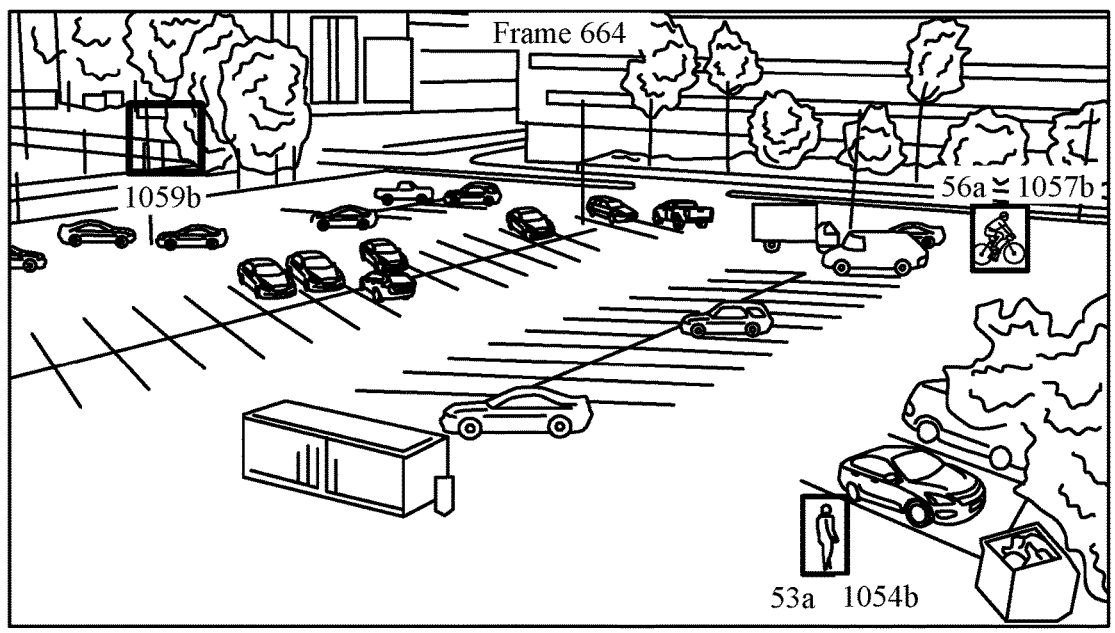
FIG. 18 is an illustration of a video frame of an environment in which various objects are tracked, in accordance with some embodiments.

As shown in FIG. 18 (frame 664), the false positive object being tracked by a tracker with label 1059b is output using the anchor method, whereas the proposed appearance based true-false positive detection process identifies the object as a false positive and thus does not output the object.

Figure 19:
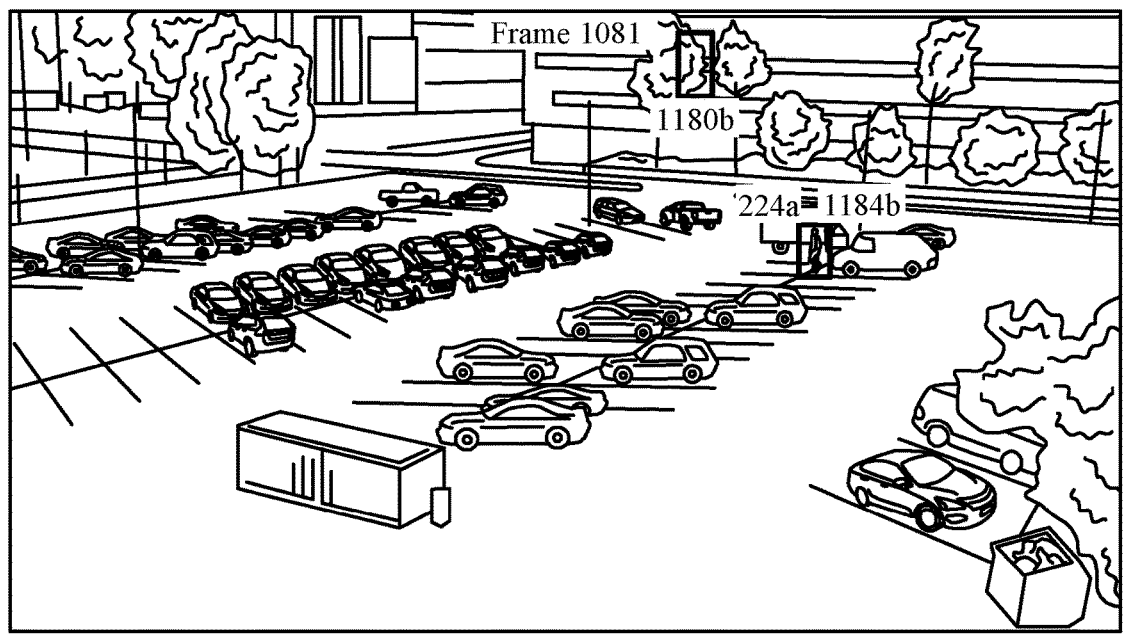
FIG. 19 is an illustration of a video frame of an environment in which various objects are tracked, in accordance with some embodiments.

As shown in FIG. 19 (frame 1081), the false positive object being tracked by a tracker with label 1180b is output using the anchor method, whereas the proposed appearance based true-false positive detection process identifies the object as a false positive and thus does not output the object.

In some cases, certain false positive objects may have certain characteristics that make it difficult for the false positive removal mechanisms described above to identify. For example, a false positive object may have a small foreground area compared with the background area in a bounding box associated with the object (e.g., shadow 504D of FIG. 5D). It may be difficult for the aforementioned false positive removal mechanisms to remove such an object. For instance, there may be insufficient pixel data to determine the correlation (e.g., for CFR) or color characteristics (e.g., AMFR) of the foreground pixels across frames to detect false objects. On the other hand, the CFR and/or the AMFR processes may be able to detect that foliage 520E of FIG. 5E is a false positive object. However, the foreground area within the bounding box may still be too small for the CFR process and/or the AMFR process to detect the foliage 520E as a false object with high confidence. As a result, CFR and/or AMFR may either detect the foliage 520E as a false positive object with low confidence, or may even fail to detect foliage 520 as a false object.

Systems and methods are described herein that further provide a Fullness based False Positive Removal (FFR) process that can be used, in some cases, for determining the status of objects (and their blob trackers) as true or false positive objects for object tracking. The FFR process can rely on a foreground pixel fullness (FPF) ratio to determine false positive blobs (and the objects represented by the blobs). The FPF ratio can be determined based on a ratio between a foreground area within a bounding box and the area of the bounding box. The foreground area can be determined based on, for example, a number of pixels associated with the foreground, whereas the bounding box area can be determined based on a number of pixels associated with bounding box. As part of the FFR process, the FPF ratio of an object can be compared against a FPF threshold. If the FPF ratio of the object equals or exceeds the FPF threshold, it may be determined that the blob (and the associated object) is likely to be a true-positive blob (and object). If the FPF ratio is below the threshold, it may be determined that blob (and object) is likely to be a false object.

Figure 20A:
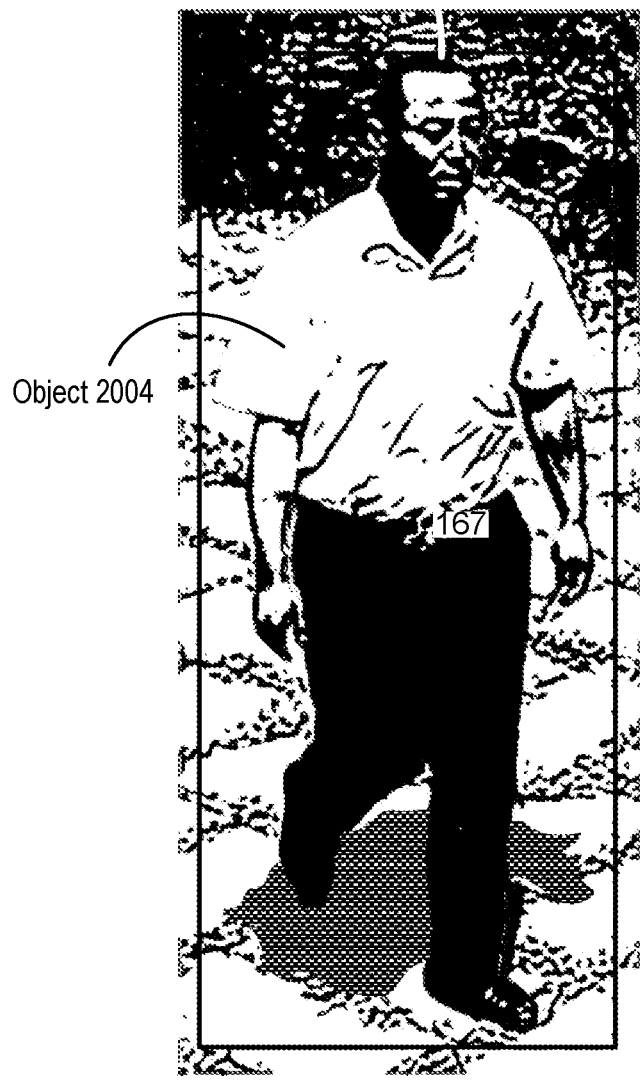
FIG. 20A, FIG. 20B, FIG. 20C, and FIG. 20D illustrate examples of foreground pixel fullness ratio determinations.
Figure 20B:
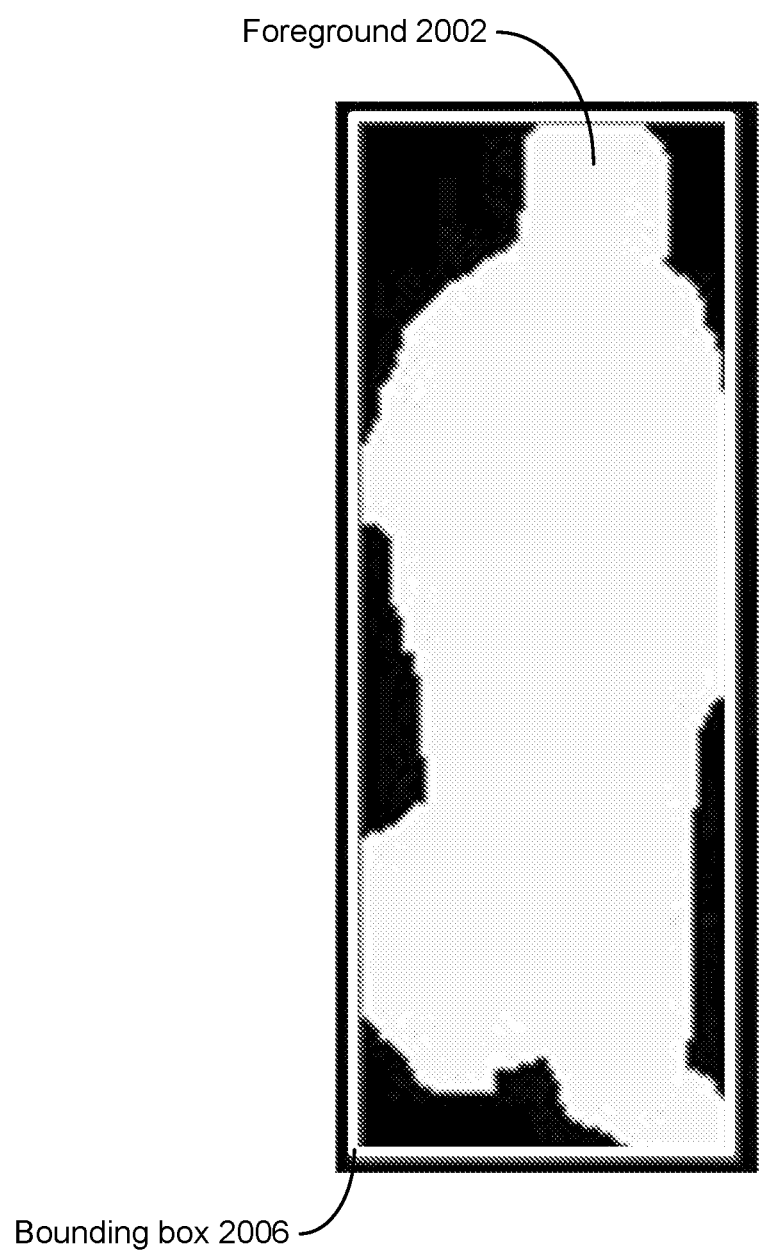

FIG. 20A, FIG. 20B, FIG. 20C, and FIG. 20D illustrate examples of a foreground area and a bounding box area. FIG. 20A illustrates an object 2004 (e.g., a human being), whereas FIG. 20B illustrates a foreground mask including a foreground blob 2002 (represented in white color) associated with object 2004. In FIG. 20B, the foreground area can be determined based on a total number of pixels that are within the foreground blob 2002 of the foreground mask and that are enclosed by bounding box 2006. Moreover, the bounding box area includes the foreground area plus the background area of the foreground mask within the bounding box 2006. For example, the bounding box area can be determined based on, for example, a total number of pixels within bounding box 2006, the height and width of bounding box 2006, or by other suitable methods.

Figure 20C:
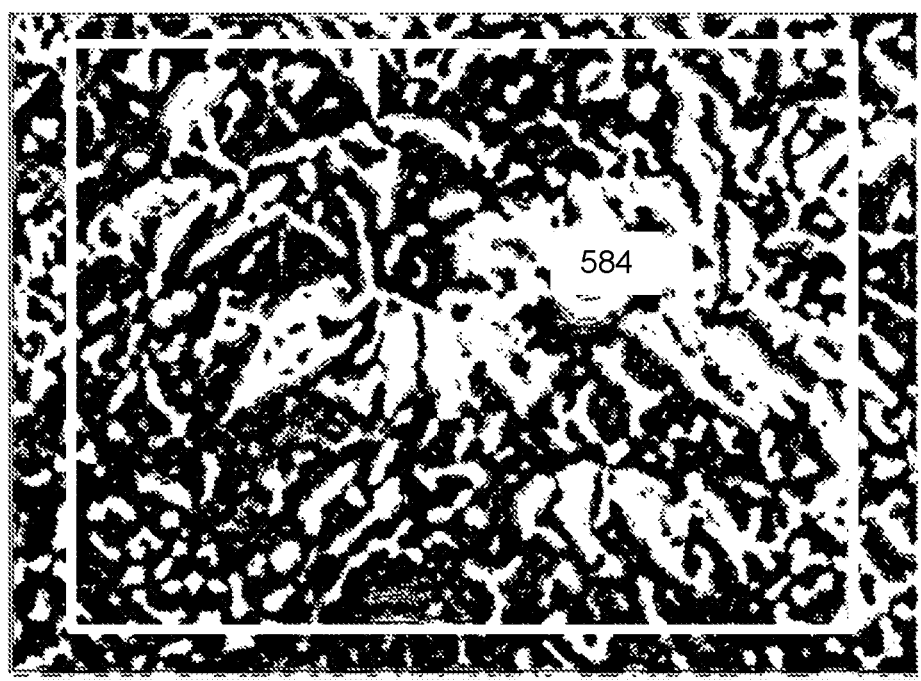
Figure 20D:
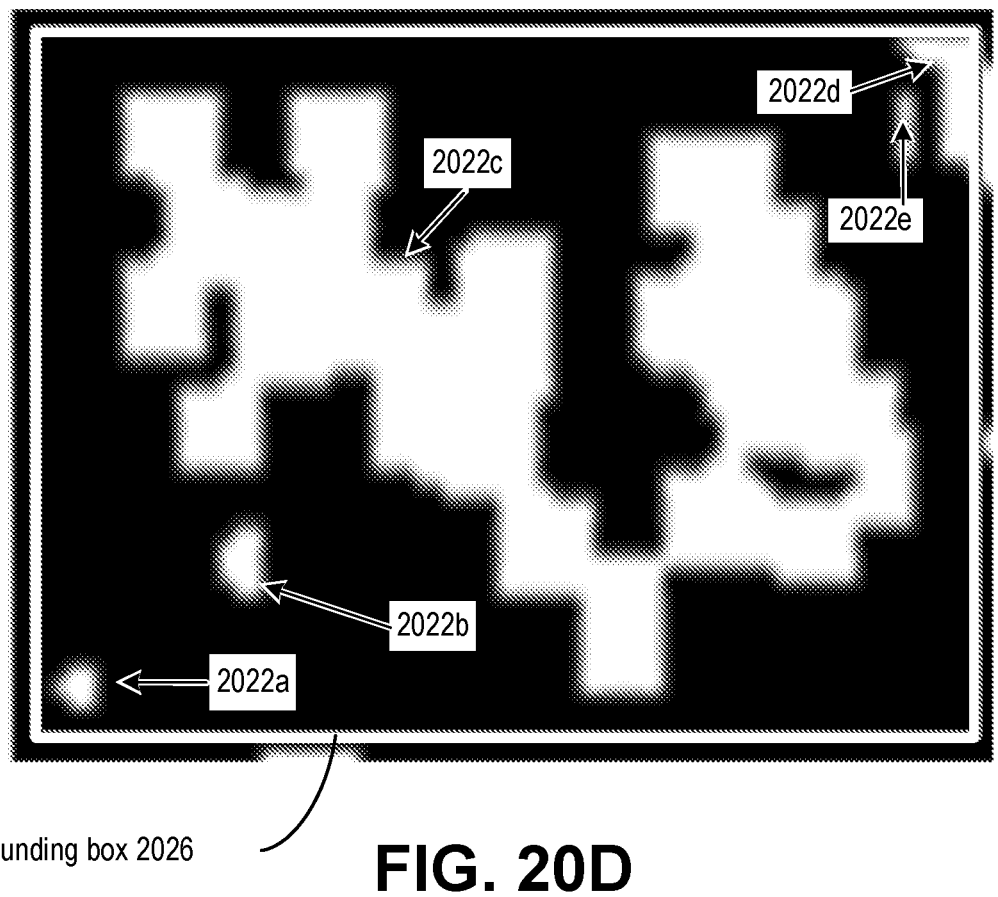

Moreover, FIG. 20C illustrates an object 2024, whereas FIG. 20D illustrates a plurality of foreground blobs 2022a, 2022b, 2022c, 2022d, and 2022e (represented in white color). The foreground area associated with an object 2024 (e.g., foliage) can be the foreground pixels enclosed by a bounding box 2026. In FIG. 20D, the foreground area of the object 2024 can be determined based on a total number of pixels within foreground blobs 2022a, 2022b, 2022c, 2022d, and 2022e. Moreover, the bounding box area includes the foreground area plus the background area of the foreground mask within the bounding box 2026. For example, the bounding box area can be determined based on, for example, a total number of pixels within bounding box 2026, the height and width of bounding box 2026, or by other suitable methods.

As discussed above, the FPF ratio of an object can be compared against a FPF threshold to provide an indication of whether the object associated with the bounding box is likely to be a false object. Here, the FPF ratio in FIG. 20B may be higher than a pre-determined threshold, whereas the FPF ratio in FIG. 20D may be lower than the pre-determined threshold. Based on the FPF ratio, the FFR process may determine that object 2004 (in FIG. 20A) is a true-positive object, whereas object 2024 (in FIG. 20C) is a false object. Based on the FPF ratio, the FFR process may also be able to detect that both the shadow 504 (in FIG. 5D) and foliage 520 (in FIG. 5E) are false objects.

In addition, in some implementations, since the FFR process requires pixel level calculations, the FFR process can also be combined with other pixel level false-positive analyses (e.g., a standalone AMFR process, a strong pixel level analysis including CFR and AMFR, or other pixel level analyses) and with the bounding box history, to improve the accuracy of the false object detection in handling bounding boxes with low foreground fullness. For example, a true-false positive detector may perform the strong pixel level analysis together with the FFR process to reduce the likelihood that a false object is misidentified as a true-positive object due to, for example, lack of foreground pixels for performing accurate appearance model and correlation.

As discussed in more detail below, the threshold used in the FFR process can be adapted based on other information, including a confidence level based on the bounding box history, an attribute of the object, a status of the tracker, any suitable combination thereof, and/or other information indicative of a context/scenario in which the false-positive object detection is applied. Adaptively determining the threshold used in the FFR process can optimize the false-positive object detection. For example, in a detection scenario where the strong pixel level analysis is expected to generate a true/false positive detection result with relatively high confidence, the FFR process can be disabled, or the FPF ratio requirement can be relaxed. On the other hand, in a detection scenario where the strong pixel level analysis is expected to generate a true/false positive detection result with a relatively low confidence, the FFR process can be used in conjunction with the strong pixel level analysis, and the FPF ratio requirement can be tightened. With such arrangements, the FFR process can be selectively provided in combination with a pixel level analysis to improve the accuracy of the true-false positive object detection.

Figure 21A:
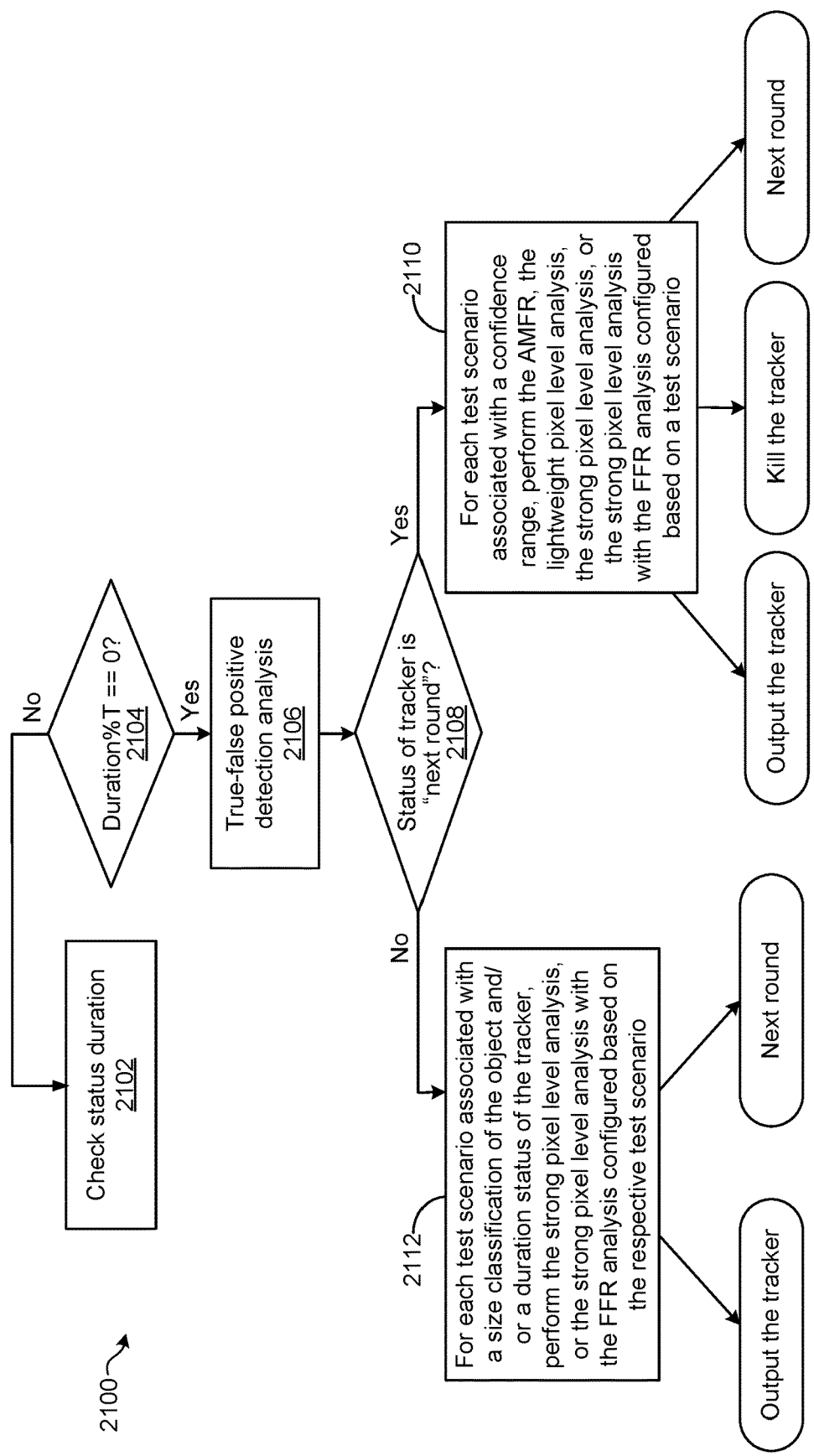
FIG. 21A is a flowchart illustrating an example of a process for determining whether an object (and its tracker) is a true positive or a false positive using appearance characteristics of the object, in accordance with some examples.

FIG. 21A is a flowchart illustrating an example of an foreground fullness based true-false positive detection process 2100 for determining whether a tracker in a current frame (and the object the tracker is tracking) is a true positive or a false positive. For example, process 2100 may receive an input status/state of the tracker, and can determine an output status (or state) of the tracker. The input status of the tracker may indicate the tracker is a new tracker, a split-new tracker, or in an intermediate state (denoted as "Next Round" herein). The output status of the tracker may indicate that the tracker is transitioned to the normal state and is ready to be output (e.g., to be displayed) because it is a true positive tracker (associated with a true positive blob and object), that the tracker is to be killed because it is a false positive, or that the tracker is to be maintained in the intermediate state.

In some examples, the true-false positive detection process 2100 can be performed by the object tracking system 106. In some examples, another component of the video analytics can perform the true-false positive detection process 2100 and can interact with the object tracking system 106. The foreground fullness based true-false positive detection process 2100 can be performed on video frames of a video sequence. For example, each iteration of the process 2100 can be performed for each tracker in a current video frame of the video sequence. The video sequence can be captured by an image capture device (e.g., an IP camera, or other suitable image capture device). Trackers can be maintained for the video sequence for tracking one or more blobs (and the objects represented by the blobs) in a scene captured by the video sequence.

Foreground fullness based true-false positive detection process 2100 can be periodically performed for each tracker (from the maintained trackers) in an iterative manner based on a status duration. The status duration is denoted as n*T for new trackers. For example, each round of analysis by the true-false positive detection process 2100 for a tracker can be periodically invoked when the duration of the tracker (since the tracker was created, for example, as a new tracker or a split-new tracker) reaches n*T frames, where T can be set to a number of frames (e.g., 30 frames, 60 frames) or an amount of time (e.g., 1 second, 2 seconds, or other suitable amount of time) and where n is an integer value. T can be the same as the threshold duration T1 described above. The status duration can be checked for each tracker for each input frame. A frame currently being processed is referred to herein as a current frame. In one illustrative example, T can be set to 30 frames and n can be an integer. In such an example, the true-false positive detection process 2100 can be invoked at every integer value n multiple of T. For instance, in such an example, the process 2100 will be invoked for a tracker at frame 30 (for n=1 after the tracker is created), at frame 60 (for n=2), at frame 90 (for n=3), and so on.

In some implementations, a split-new tracker may be tested when the duration is equal to a threshold Ts, which can be smaller than the threshold T. For example, the threshold Ts can be equal to T/2. Ts can be the same as the threshold duration T2 described above for split-new trackers.

In some cases, the duration of a tracker (before it is output) can be tracked by a counter starting from 0 when the tracker is created (as a new tracker or a split-new tracker). The counter can increase by one for every frame. The counter can be denoted as Duration % T, and can be used to determine when the status duration n*T has been met (e.g., when Duration % T is equal to 0, denoted as Duration % T==0). The counter can be set to N*(T/2) for split-new trackers. Referring to FIG. 21A, for example, process 2100 can check the status duration for a current tracker at a current frame at block 2102. To check the status duration, the process 2100 determines, at block 2104, whether the counter Duration % T is equal to 0 (Duration % T==0). If the status duration is not met for a current tracker (Duration % T is not equal to 0), process 2100 returns to block 2102 to check the status duration for the current tracker at a next frame. Once the status duration is met, the counter is reset to 0.

As described above, in some implementations, an initial appearance model and a target bounding box can be created for a new tracker (or split-new tracker) at the frame at which the tracker is initially created (or split). For instance, the tracker bounding box tracking the object in the frame can be designated as the target bounding box, and pixels of the frame within the target bounding box can be used to create the initial appearance model. In some implementations, the initial appearance model and the target bounding box can be created at a frame occurring at a duration Tc after the new tracker is created (or a split-new tracker is split), rather than creating the initial appearance model and the target bounding box at the frame at which the new tracker is created (or a split-new tracker is split). The duration Tc can be set to T/2 for a new tracker and Ts/2 for a split-new tracker. When the duration since a tracker was created or split is Tc frames, the initial appearance model as well as the target bounding box is calculated and maintained.

If the status duration n*T or n*Ts is determined to be met for a current tracker (Duration % T==0), process 2100 proceeds to block 2106 to perform a true-false positive detection analysis. The true-false positive detection performed at block 2106 may include determining one or more characteristics or features extracted from a bounding box history of a tracker, and utilizing the characteristics or features individually or jointly to generate a confidence value or level for the tracker. Such a process is referred to herein as long duration bounding box analysis. While a bounding box history of a tracker is used herein as an illustrative example, a bounding region history other than a bounding box history can be used (e.g., a history of bounding circles used to track an object, or other suitable shape). Further details relating to the true-false positive detection analysis and long duration bounding box analysis are described below with respect to FIG. 21B.

The true-false positive detection analysis performed at block 2106 can provide a confidence value for a tracker. For example, the true-false positive detection analysis can include the long duration bounding box analysis to determine the confidence value based on the bounding box history of the tracker. A confidence value for a tracker may fall into different confidence ranges, such as a very high confidence range (higher than a first confidence threshold TC1), a high confidence range (between a first confidence threshold TC1 and a second confidence threshold TC2), a low confidence range (between a second confidence threshold TC2 and a third confidence threshold TC3), and a very low confidence range (less than a third confidence threshold TC3), with the several thresholds TC1, TC2, and TC3 being between the different ranges. Illustrative examples of the different confidence thresholds TC1, TC2 and TC3 can include 10, 2, and 1, for instance. One of ordinary skill will appreciate that other suitable values for the confidence thresholds TC1, TC2 and TC3 can be used. If the confidence value of a tracker is larger than TC1, the tracker will be in the very high confidence range. If the confidence value of the tracker is larger than TC2 and less than TC1, it will be in the high confidence range. If the confidence value of the tracker is less than TC2, but greater than TC3, it will be in the low confidence range. If the confidence value of the tracker is smaller than TC3, it will be in the very low confidence range.

At block 2108, process 2100 can check whether the current state of the tracker in an intermediate state (denoted as "Next Round," which keeps the trackers for a next round of analysis). At this point, the tracker can be either a new tracker, a split-new tracker, or a tracker in the intermediate state based on the output of process 2100 in the previous cycle. If the tracker is in the intermediate state, process 2100 may proceed to block 2110 where a pixel level analysis including the AMFR process, the lightweight pixel analysis, the strong pixel level analysis, or the strong pixel level analysis together with a FFR process can be applied for different detection scenarios based on the confidence value determined in block 2106 and other information. For example, in a case where the tracker is associated with a very low confidence range, the AMFR process may be applied. In a case where the tracker is associated with a low confidence range, or in a case where the tracker is associated with a high confidence range (based on the bounding box history) but has been still in the most recent frames, the strong pixel level analysis (AMFR and CFR) may be applied. Also, in a case where the tracker is associated with a high confidence value and the false-positive object detection is being made in a scenario where false objects with low FPF ratio are likely to occur (e.g., in a set of video frames generated by a home security system), the strong pixel level analysis with the FFR process can be applied. Block 2110 may determine an output state of the tracker, which may indicate the tracker is to be maintained in the intermediate state ("Next Round"), the tracker is to be transitioned to the normal state to be output, or the tracker is to be killed based on the tracker being associated with a false object.

On the other hand, if the tracker is not in the intermediate state, process 2100 may proceed to block 2112 where a pixel level analysis including the strong pixel level analysis, or the strong pixel level analysis together with a FFR process, can be applied for different detection scenarios to determine the status of the tracker. The different test scenarios determined based on a size classification of the object, and a status of the tracker determined in block 2104. For example, in a detection test scenario where the object is not classified as a big or huge object, and that the tracker is not a new tracker (e.g., based on the status of duration Ts determined in block 2102), the strong pixel analysis without the FFR process can be applied. On the other hand, in a detection test scenario where the object is classified as a big object, and/or where the tracker is a new tracker (e.g., based on the status of duration Ts determined in block 2102), the strong pixel analysis with the FFR process can be applied. The FPF ratio threshold can also be adapted to the different detection test scenarios. Block 2112 may determine an output state of the tracker, which may indicate the tracker is to be maintained in the intermediate state ("Next Round") or to be transitioned to the normal state to be output.

Similar to that described above with respect to FIG. 6A, the true-false positive detection analysis performed at block 2106 can include a long duration bounding box analysis used to determine one or more characteristics of a current blob tracker (in a current frame) using a bounding box history of the tracker. As described above, the block diagram in FIG. 21 illustrates an example of the long duration bounding box analysis system 2130 that can perform the long duration bounding box analysis. As previously explained, the bounding box history of a tracker can include the bounding boxes of the blob tracker in one or more previous frames that are earlier in the video sequence than the current frame and thus are obtained by the true-false positive detection process 2100 prior to the current frame. The bounding boxes of the tracker in the previous frames can be identified by a unique tracker identifier (ID) associated with the tracker. The bounding box history of the tracker can also include the locations, sizes, and/or other features of the bounding boxes in the bounding box history. Further details of the long duration bounding box analysis system 2130 and associated processes are provided above with respect to the discussion of FIG. 6A-FIG. 10.

Referring back to FIG. 21A, in a case where the tracker is in the intermediate status, block 2110 can be performed. As part of block 2110, a pixel level analysis including the AMFR process, the strong pixel level analysis, or the strong pixel level analysis together with the FFR process can be applied for different test scenarios to determine the status of the tracker. The different test scenarios can be associated with the different confidence ranges determined in block 2106 (corresponding to a range of confidence value 2140), as well as other characteristics of the tracker. As descried above, the confidence value 2140 for a tracker may fall into different confidence ranges, such as a very high confidence range (e.g., higher than or equal to the first confidence threshold TC1), a high confidence range (e.g., between the first confidence threshold TC1 and the second confidence threshold TC2), a low confidence range (e.g., between the second confidence threshold TC2 and the third confidence threshold TC3), and a very low confidence range (e.g., less than the third confidence threshold TC3). Different pixel level analyses can be performed based on the confidence range in which the confidence value 2140 is in.

Figure 21B:
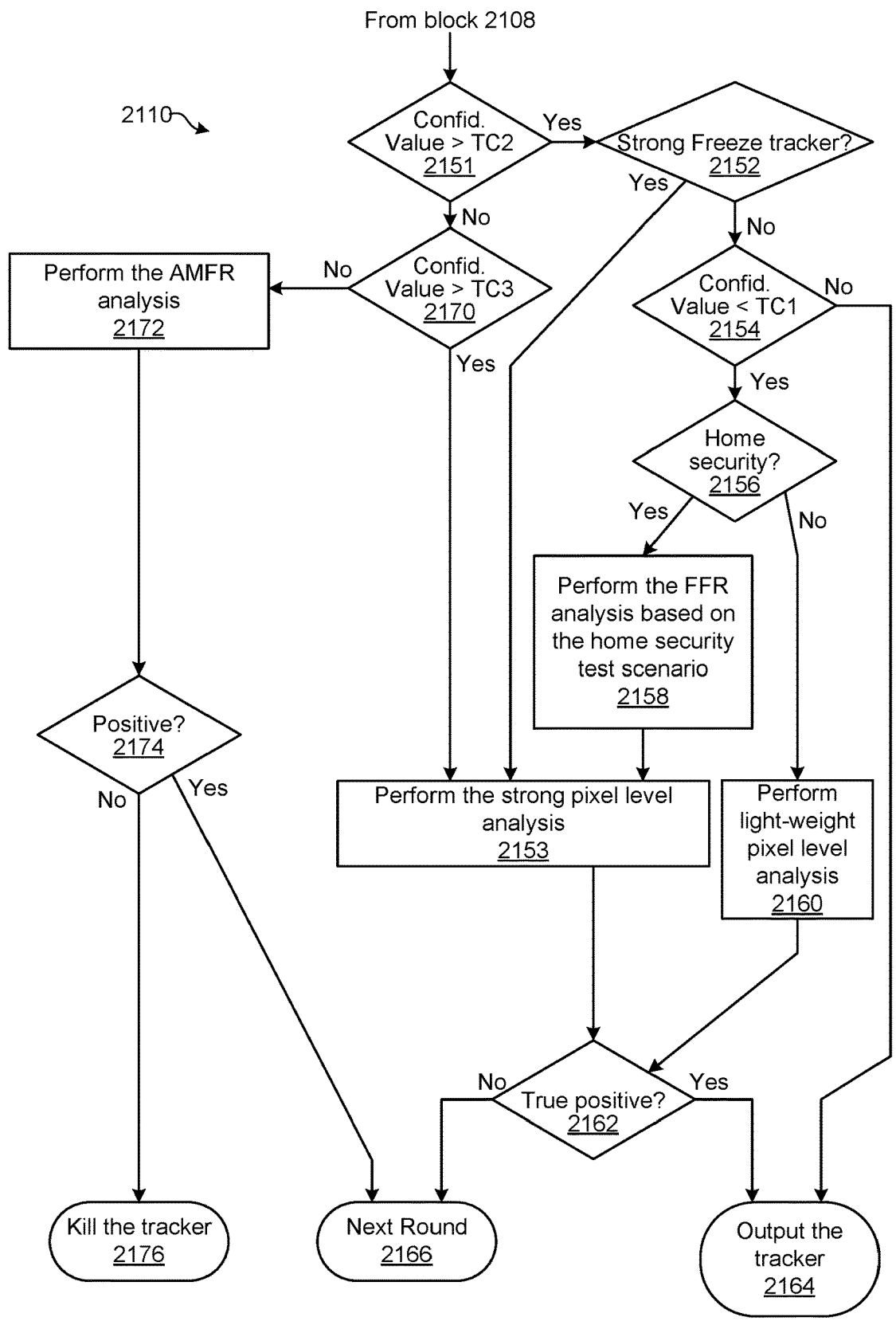
FIG. 21B is a flowchart illustrating an example of a process for determining whether an object (and its tracker) is a true positive or a false positive using appearance characteristics of the object, in accordance with some examples.

FIG. 21B illustrates additional details of block 2110 of FIG. 21A. To begin with, if the confidence value is above the second confidence threshold TC2 (in block 2151), the true-false positive detector can perform block 2152 to determine whether the tracker is a strong freeze tracker. A tracker may be determined as a strong freeze tracker if the bounding box of the tracker is determined to be static or still for a pre-determined number of frames. In some examples, similar to that described above with respect to FIG. 10, an alignment threshold and an overlapping ratio between the bounding boxes of the same tracker in different frames can be used to detect frozen objects and frozen trackers. The overlapping ratio can be compared to the alignment threshold to determine if the tracker is still or static in the current frame (relative to a previous frame), and the same comparison can be performed between pairs of neighboring frames within the pre-determined number of frames. The alignment threshold (denoted as $F_{Align}$) indicates how much of overlap in terms of percentage of the bounding box of the tracker of the current frame with the historical bounding box in the previous frames. In some cases, the percentage of overlap can be normalized to 0 and 1.

In some cases, the alignment threshold $F_{Align}$ can be set to be adaptive to the size of a current bounding box. For example, a small size may corresponds to a smaller alignment threshold. In some examples, the alignment threshold $F_{Align}$ can be set to a relatively smaller value for a smaller bounding box below a first size threshold, and can be set to a larger value for a larger bounding box above a second size threshold. The first size threshold and the second size threshold can be the same value or a different value. Equation (2) above can be used to determine the alignment threshold $F_{Align}$ in some cases, where $T_A$ is the first size threshold, $T_B$ is the second size threshold, and size is the size of the bounding box of the current blob tracker in the current frame. Using the illustrative example from above, $T_A$ can be equal to 129 (e.g., corresponding to a 16×8, 8×16, 4×32, 32×4, or other suitable size bounding box) and $T_B$ can be equal to 4096 (e.g., corresponding to a 64×64, 32×128, 128×32, or other suitable size bounding box). As shown by equation 2, when the size of the current bounding box of the object in the current frame is less than $T_A$, the alignment threshold is set to 0.7. When the size of the current bounding box of the object in the current frame is greater than $T_B$, the alignment threshold is set to 0.85, which is much larger than 0.7. When the otherwise condition is met, meaning that the size of the current bounding box is not less than $T_A$ and is not more than $T_B$, the alignment threshold is set to 0.8. One of ordinary skill in the art will appreciate that the example in equation 2 is illustrative, and that any other values of the alignment threshold and the size thresholds $T_A$ and $T_B$ can be used.

In order to measure the level of stillness of the object and the associated tracker being tested, an overlapping ratio can be measured. As discussed above with respect to FIG. 10, the overlapping ratio includes a ratio of the intersection and union of two bounding boxes of the current blob tracker over two consecutive frames. For example, the two bounding boxes can include the bounding box of the current blob tracker from the current frame and the bounding box of the current blob tracker from the previous frame. In one illustrative example, for a later frame t (e.g., a current frame), the intersection of the two bounding boxes is denoted as $I_t$ and the union is denoted as $U_t$. Using such notation, the overlapping ratio for the two bounding boxes is defined as $$\alpha_t = \frac{I_t}{U_t}$$

and therefore is the overlapping ratio for the current blob tracker for frame t.

The overlapping ratio $\alpha_t$ of the object tracker can be compared to the alignment threshold $F_{Align}$ to determine if the object tracker is still (or static) in the current frame. For example, if the overlapping ratio $\alpha_t$ is larger than the alignment threshold $F_{Align}$ (denoted as $\alpha_t \geq F_{Align}$), the object tracker is considered to be static in the current frame t (compared to the previous frame). In some examples, if the ratio $\alpha_t$ is smaller than the alignment threshold $F_{Align}$ (denoted as $\alpha_t \geq F_{Align}$), the object tracker is considered to be not static in the current frame t (compared to the previous frame).

In some examples, the number of frames the object tracker is considered as being still can be determined. In such examples, the total number of still frames within a duration is firstly used as a condition to determine if a tracker is frozen tracker. The number of frames the object tracker is considered as being still can be denoted as $s_T = \Sigma_{t=1}^{T}(\alpha_t > F_{Align} ? 1:0)$, where the bounding boxes, blobs, and the containing frames are denoted with the relative timestamp of t, with t being from 1 through T (or Ts), and where 1 is the time when the tracker was created and T (or Ts, e.g., measured in frames) is the time when the tracker is being checked to be a frozen tracker. The terminology "?1:0" indicates that a counter is incremented (with a value of 1) when the condition $\alpha_t > F_{Align}$ is met, and that the counter is not incremented when the condition $\alpha_t > F_{Align}$ is not met. In one illustrative example, if T is equal to 10 frames (indicating that it has been ten frames since the blob tracker was created), and the condition $\alpha_t > F_{Align}$ is met for eight out of the ten frames, the $s_T$ counter will have a value of eight.

The number of frames $s_T$ the object tracker is considered as being still can then be compared to a threshold number of frames to determine if the current blob tracker is a possible frozen tracker or if the tracker is a good candidate to be detected as a frozen tracker. In one illustrative example, the number of frames $s_T$ is compared with the total number of frames T since the tracker was created. For example, a threshold To can be set as a percentage of the total number of frames since the tracker is created (and can be denoted as a threshold number of frames To). A multiplier m can be set to a relatively large number close to 1 (e.g., 0.7, 0.75, 0.8, 0.85, 0.9, or other suitable value), such that the threshold To requires a blob tracker to be still in most of the frames since it was created to be considered as a frozen tracker. The threshold To can be denoted as To=m*T. In one illustrative example, if m is set to 0.85, to be considered as a frozen tracker, the number of frames ($s_T$) the blob tracker must be detected as being still is 85% of the total number of frames (T) since the blob tracker was created.

If the number of frames $s_T$ is larger than the threshold To (denoted as $s_T > m*T$), the object tracker is considered as a frozen tracker (or as a good candidate to be detected as a frozen tracker), and block 2152 can identify the object tracker as being a strong frozen tracker. The true-false positive detector can proceed to block 2153 to perform the strong pixel level analysis. As discussed above, the strong pixel level analysis may include the AMFR analysis and the CFR analysis. The strong pixel level analysis may indicate a positive result if, for example, the AMFR determines the distance between the previous color mass center and the current color mass center is higher than the threshold distance, and the CFR determines that the correlation is below the correlation threshold. FFR can be skipped in the case where strong frozen tracker is detected because, for example, there is very little movement in the object. For example, in some cases, the fullness ratio is typically low for a frozen tracker because there is little to no motion of the associated object. In such cases, the FFR may not provide a good indication of a false positive object. For instance, in a case where the foreground pixel fullness ratio of a bounding box is small when created (e.g., created as a new bounding box or as a split-new bounding box), the foreground pixel fullness of the bounding box may remain static (and small) across multiple video frames, and a negative outcome from the FFR analysis (e.g., the foreground pixel fullness ratio being below the ratio threshold) may not provide a good indication that the bounding box is associated with a false positive object compared with, for example, a case where the object in the bounding box undergoes slight movements (e.g., shadow 504 of FIG. 5A and foliage 520 of FIG. 5B). In such a case, given that the FFR analysis may not provide additional value, the detection of false positive object can be based on only the strong pixel analysis (CFR and AMFR). If the outcome of the strong pixel level analysis is positive, the true-false positive detector can determine that the object is true positive (in block 2162), and can proceed to block 2164 to transition the tracker to the normal state and to output the tracker.

On the other hand, if the outcome of the strong pixel level analysis is negative, the true-false positive detector may determine that the object is not true-positive in block 2162, and can proceed to block 2166 to maintain the tracker in the intermediate state ("Next Round"). The tracker is not immediately killed because of the high confidence value associated with the tracker, and the true-false positive detector may defer the determination of the status of the tracker to the next round after accumulating additional history bounding box data for the tracker.

Referring back to block 2152, when the object tracker does not meet the condition $s_T > m^*T$, the object tracker is determined not to be a good candidate for a frozen tracker, and block 2152 can identify the object tracker as not being a frozen tracker. The true-false positive detector can proceed to block 2154 to perform additional tests. For example, in block 2154, the true-false positive detector can determine whether confidence value 2140 is below TC1 (e.g., of value 10). If the confidence value 2140 equals to or is above TC1, which indicates that the tracker is determined to be true-positive with a very high confidence, the tracker can be transitioned to the normal status and can be output in block 2164. Because of the very high confidence determination (based on the bounding box history), the true-false positive detector can also skip the strong pixel level analysis as well as the FFR analysis.

On the other hand, if the confidence value 2140 is below TC1 (determined in block 2154), which indicates that the tracker is determined to be true-positive with a high confidence, but not with a very high confidence, the true-false positive detector can perform strong pixel level analysis to confirm the tracker should be set to the normal state. In addition, the true-false positive detector may obtain information about the test scenario for the true-false positive determination to determine whether to perform the FFR analysis (in addition to the strong pixel level analysis) based on the test scenario. For example, in a case where the true-false positive detector is used to process a video frame from a home security system, as described above with respect to FIG. 5A and FIG. 5B, it may be determined that the video frame is likely to include small foreground areas with considerable movement (e.g., shadow 504 and foliage 520) that can potentially lead to incorrect true-positive object determination by the strong pixel level analysis. There are various ways by which the true-false positive detector determines that it is processing video frames from a home security system including, for example, metadata included in the video stream provided by the home security system, instructions and/or configurations by an operator, or any other suitable methods. It is also understood that there are other test scenarios other than a home security system where the FFR analysis can be applied.

Following a determination that the confidence value 2140 is below TC1 in block 2154, the true-false positive detector can proceed to block 2156 to determine whether the current frame being processed is from a home security system. If the current frame is not from a home security system, the true-false positive detector may proceed to block 2160 to perform the lightweight pixel level analysis (e.g., including only the CFR analysis). If the lightweight pixel level analysis indicates a positive result, the true-false positive detector may determine, in block 2162, that the object is a true positive object, and proceed to block 2164 to output the tracker. On the other hand, if the lightweight pixel level analysis indicates a negative result, the true-false positive detector may determine, in block 2162, that the object is not a true positive object, and proceed to block 2166 to maintain the tracker in the intermediate state ("Next Round"). For this case, the true-false positive detector only performs the CFR analysis based on, for example, the relatively high confidence value associated with the object tracker determined based on the bounding box history.

On the other hand, if the video frame being analyzed is from a home security system (in block 2156), the true-false positive detector can perform block 2158 to perform the FFR analysis. The threshold for the FPR ratio comparison can be configured based on the FPR ratios of typical false objects that can be detected in the specific test scenario (e.g., a home security system). The threshold can also be configured to relax the requirement for returning a positive FFR analysis result, given that block 2158 is performed when the tracker is determined to be true-positive with a high confidence value (in block 2152). Following the FFR analysis in block 2158, the true-false positive detector further performs the strong pixel level analysis in block 2153. If the outcome of the strong pixel level analysis and the FFR analysis is positive, the true-false positive detector can proceed to block 2164 and transition the tracker to the normal state and output the tracker. If the outcome of the strong pixel level analysis and the FFR analysis are different, or both analyses provide a negative outcome, the true-false positive detector can proceed to block 2166 and maintain the tracker in the intermediate state ("Next Round").

For this test scenario (e.g., home security system), the FFR analysis can be performed to provide additional check on the result of the strong pixel level analysis. In a case where the FPF ratio is below the threshold, which indicates that the object may be a false object and is inconsistent with the high confidence value output by the true-false positive detection analysis of block 2106. Therefore, instead of outputting the tracker, the true-false positive detector can maintain the tracker in the intermediate status, so that additional bounding box history data can be accumulated before determining whether to output or to kill the tracker.

Referring back to block 2151, if the confidence value is determined as not exceeding TC2, the true-false positive detector may proceed to block 2170 to determine whether the confidence value exceeds TC3. If the confidence value is above TC3, the true-false positive detector may also proceed to block 2153 to perform the strong pixel analysis. On the other hand, if the confidence value is below TC3, the true-false positive detector may proceed to block 2172 to perform the AMFR analysis. If the AMFR analysis returns a positive result (in block 2174), the true-false positive detector can proceed to block 2166 and maintain the tracker in the intermediate state ("Next Round"). If the AMFR analysis returns a negative result, the true-false positive detector may proceed to block 2176 to kill the tracker.

As discussed above, a confidence range between TC3 and TC2 may be a low confidence range, whereas a confidence range below TC3 is a very low confidence range. For a tracker with a confidence value in the low (or very low) confidence ranges (e.g., due to very slight or no movement of the bounding box across frames), a negative output from the AMFR analysis or from the strong pixel level analysis can provide a strong indication that the object being tracked is a false object, and FFR analysis may not be needed to confirm the results of the AMFR analysis and/or of the strong pixel level analysis in this circumstance.

Figure 21C:
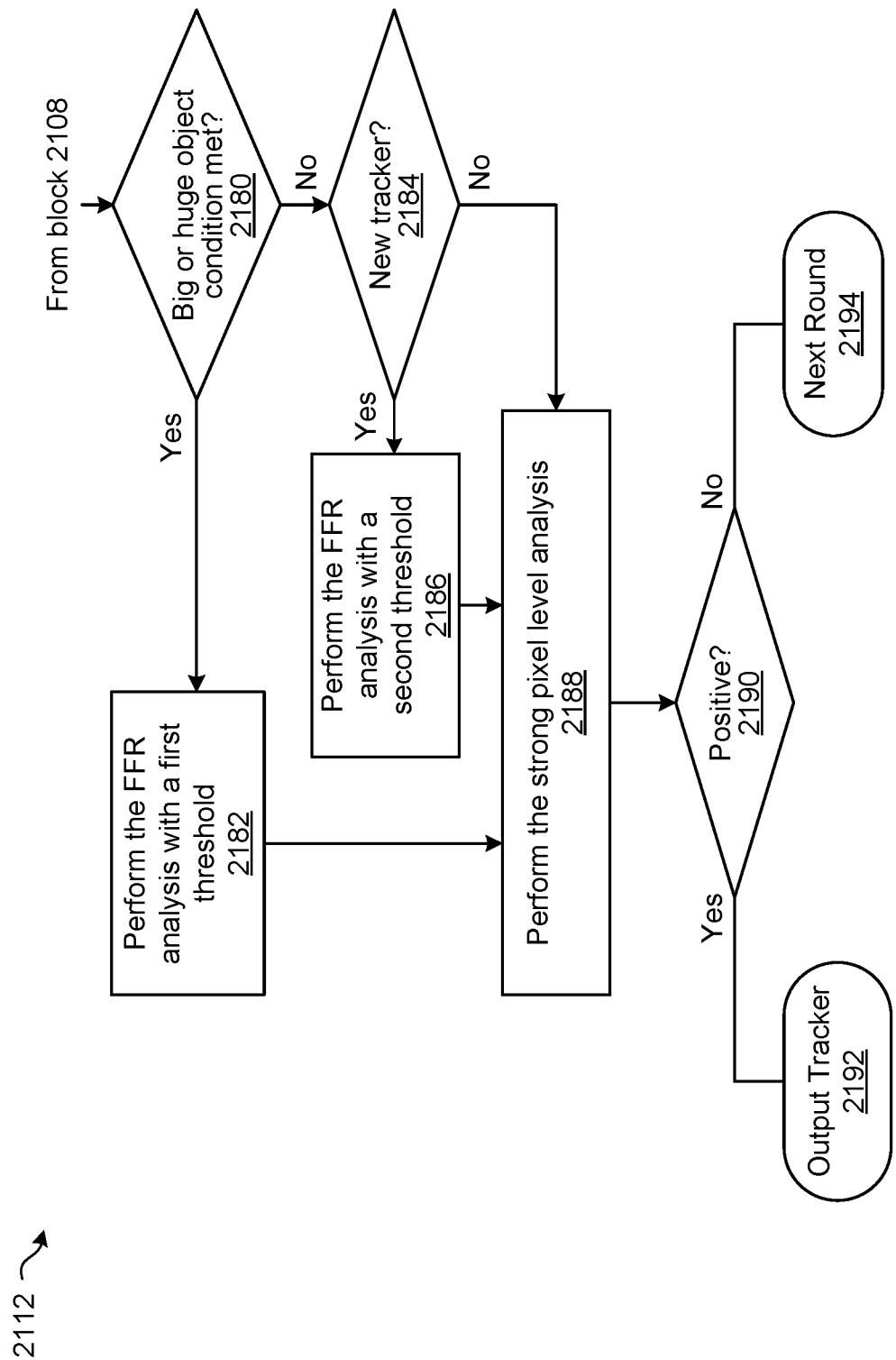
FIG. 21C is a flowchart illustrating an example of a process for determining whether an object (and its tracker) is a true positive or a false positive using appearance characteristics of the object, in accordance with some examples.

FIG. 21C illustrates additional details of block 2112 of FIG. 21A. As discussed above, the true-false positive detector performs block 2112 if the state of the tracker of the current frame is in the new state or in the split-new state and not in the intermediate state. To begin with, the true-false positive detector performs block 2180 to determine whether a big object or a huge object condition is met. Certain size conditions can be used to determine whether an object is a big object or a huge object, including a huge blob size threshold and a big blob size threshold. As used herein, a huge blob is a blob with a size greater than a huge blob size threshold. The huge blob size threshold can be denoted as $T_h$. The object in the scene that the huge blob represents is also considered to be a huge object. The huge blob size threshold can be based on the size of the frame or image in which the object is captured. For example, the huge blob size threshold can be set as a fraction of the entire frame size or image size, such as half of the frame size (½×frame size), a quarter of the frame size (¼×frame size), or other suitable fractional amount. In one illustrative example, the huge blob size threshold $T_h$ can be set to a tenth of the frame size. Accordingly, a blob that takes up the fractional amount of the frame according to the huge blob size threshold (e.g., half the frame, a quarter of the frame, or other suitable amount) is considered to be a huge blob.

As used herein, a big blob is a blob with a size greater than a big blob size threshold, which is smaller than the huge blob size threshold. The big blob size threshold can be denoted as $T_b$. The object in the scene that the big blob represents is also considered to be a big object. The big blob size threshold can be based on the size of the frame or image in which the object is captured. For example, the big blob size threshold can be set as a fraction of the entire frame size or image size, such as a fifth of the frame size (⅕×frame size), a sixth of the frame size (⅙×frame size), a tenth of the frame size (¹⁄₁₀×frame size), or other suitable fractional amount that is smaller than the fractional amount used for the huge blob size threshold. In one illustrative example, the big blob size threshold $T_b$ can be set to a ¹⁄₁₅ of the frame size. A blob that takes up the fractional amount of the frame according to the big blob size threshold (e.g., a fifth of the frame, a sixth of the frame, a tenth of the frame, or other suitable amount) is considered to be a big blob.

In some examples, only one blob size threshold is used, instead of a huge and big blob size thresholds. Such a threshold can be referred to as a large blob size threshold, and can be denoted as $T_l$. The large blob size threshold can be based on the size of the frame or image in which the object is captured. For example, the large blob size threshold can be set as a fraction of the entire frame size or image size, such as a fifth of the frame size (⅕×frame size), a sixth of the frame size (⅙×frame size), a tenth of the frame size (¹⁄₁₀×frame size), or other suitable fractional amount. In one illustrative example, the large blob size threshold $T_l$ can be set to a ¹⁄₁₅ of the frame size. A blob that takes up the fractional amount of the frame according to the large blob size threshold (e.g., a fifth of the frame, a sixth of the frame, a tenth of the frame, or other suitable amount) is considered to be a large blob, and the object represented by the blob is considered to be a large blob.

If either the big object condition or the huge object condition is met (in block 2180), the true-false positive detector may proceed to block 2182 and perform a FFR analysis. The threshold for comparing FPF ratio in block 2182 can be configured based on the detection of the big object or huge object in block 2180. For example, the threshold in block 2182 can be set at 0.5, such that a bounding box with FPF ratio exceeding 0.5 can generate a positive FFR result. On the other hand, if neither the big object condition nor the huge object condition is met in block 2180, the true-false positive detector may proceed to block 2184 to determine whether the tracker is a new tracker. If the tracker is a new tracker, the true-false positive detector may proceed to block 2186 and perform a FFR analysis. The threshold for comparing the FPF ratio in block 2186 can be set at 0.63, which makes the FFR analysis more stringent than the FFR analysis in block 2182. A more stringent FFR analysis can be applied in block 2186 based on, for example, that the tracker is a new tracker and lacks bounding box history data to determine the confidence value of the tracker. On the other hand, the detection of a big or huge object in block 2180 tends to indicate that the bounding box for the tracker is associated with a true positive object. In such cases, a less stringent FFR analysis is applied so that the bounding box can be transitioned to the normal state and output sooner, rather than maintaining the bounding box in the intermediate state and waiting for an additional cycle of analysis.

Following the FFR analysis in either block 2182 or block 2186, the true-false positive detector can proceed to block 2188 to perform the strong pixel level analysis. If the strong pixel level analysis returns a positive result, and the FFR analysis also returns a positive result, the true-false positive detector may determine that the object being tracked is true-positive in block 2190, and transition the state of the tracker to the normal state to output the tracker in block 2192. If both the strong pixel level analysis and the FFR analysis return negative results, or the strong pixel level analysis and the FFR analysis returns different results, the true-false positive detector may determine that the object being tracked is not true-positive in block 2190, and transition the state of the tracker to the intermediate state in block 2194. In these cases, the FFR analysis can provide additional check to the result of the strong pixel level analysis in block 2188, and can cause the tracker to be transitioned to the intermediate state to defer the decision to kill or to output the tracker to the next round of process 2100 if, for example, a scenario of relatively low foreground pixel fullness is detected.

Referring back to block 2184, if the tracker is not a new tracker but a split-new tracker, the true-false positive detector may skip the FFR analysis and perform the strong pixel level analysis of block 2188, and determine whether to output the tracker (in block 2192) or to transition the tracker to the intermediate state (in block 2194) based on the outcome of the strong pixel level analysis. The FFR analysis can be skipped in this case because, as discussed above, the split-new tracker is generated based on splitting of the parent tracker, which is likely due to the movement of the object being tracked and is unlikely to reflect a test scenario with a static object with low FPR ratio which can be detected by the FFR analysis.

Figure 22:
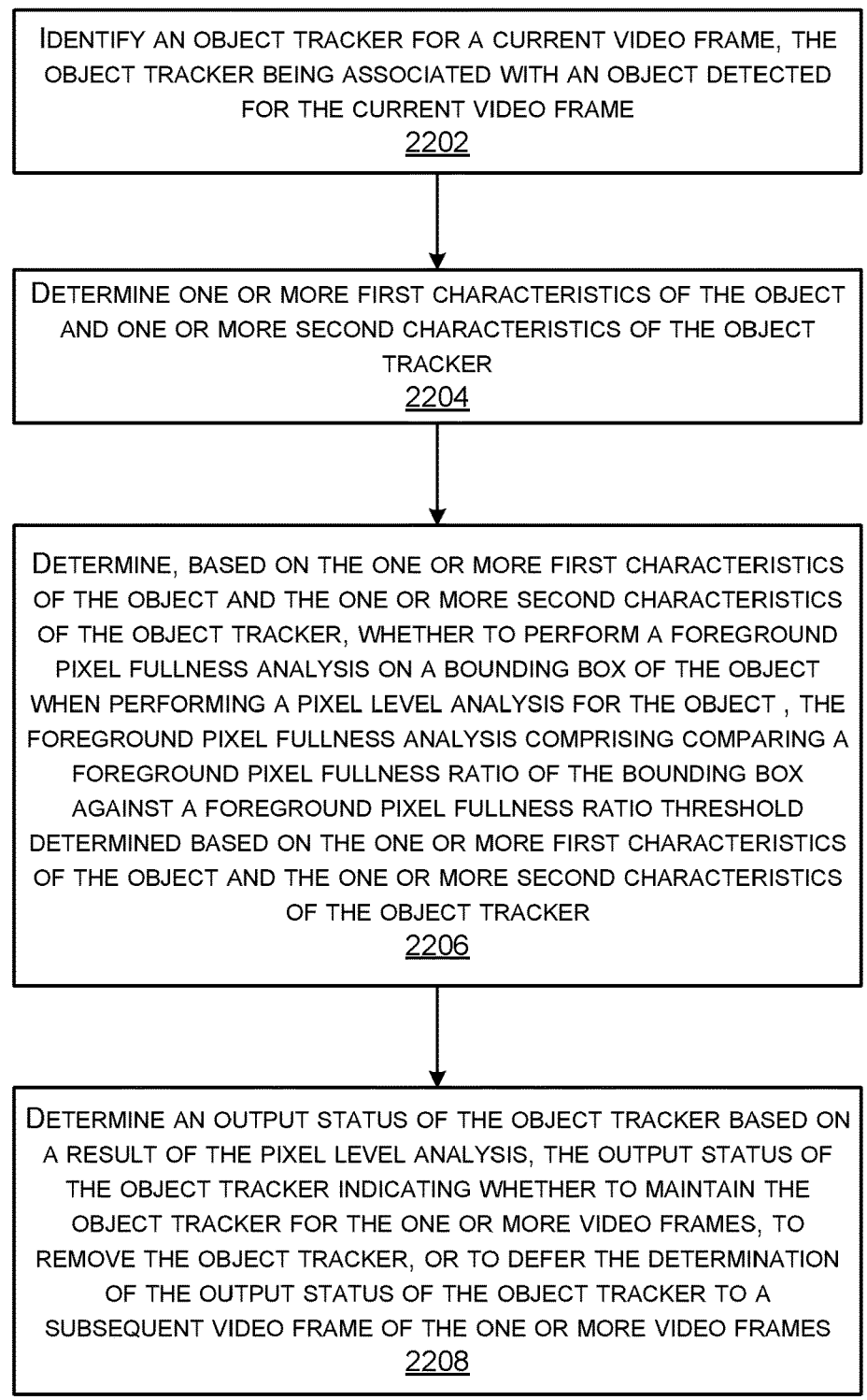
FIG. 22 is a flowchart illustrating an example of a process for determining whether an object (and its tracker) is a true positive or a false positive using appearance characteristics of the object, in accordance with some examples.

FIG. 22 is a flow chart illustrating an example of an object tracking process 2200 for one or more video frames using the techniques disclosed herein. At block 2202, process 2200 includes identifying an object tracker for a current video frame, the object tracker being associated with an object detected for the current video frame. The detection of the object can be based on, for example, detecting a blob in the current video frame using background subtraction. At block 2204, process 2200 includes determining one or more first characteristics of the object and one or more second characteristics of the object tracker. Determining one or more first characteristics of the object may comprise, for example, determining a size of the object (e.g., whether the object satisfies a pre-determined big or huge object condition at block 2180 of FIG. 21C). Determining one or more second characteristics of the object tracker may comprise, for example, determining a status of the object tracker (e.g., whether the object tracker is a new tracker at block 2184 of FIG. 21C), determining a confidence level associated with the object tracker based on the bounding box history at block 2106 of FIG. 21A, determining the historical movements of the bounding box for the object tracker at block 2152 of FIG. 21B, determining a test scenario associated with the object tracker at block 2156 of FIG. 21B, or other suitable characteristics.

At block 2206, process 2200 includes determining, based on the one or more first characteristics of the object and the one or more second characteristics of the object tracker, whether to perform a foreground pixel fullness analysis on a bounding box of the object when performing a pixel level analysis for the object. The foreground pixel fullness analysis may comprise, for example, comparing a foreground pixel fullness ratio of the bounding box against a foreground pixel fullness ratio threshold determined based on the one or more first characteristics of the object and the one or more second characteristics of the object tracker. The pixel level analysis may include, for example, a strong pixel level analysis (including the CFR analysis and the AMFR analysis), a strong pixel level analysis together with the foreground pixel fullness analysis, the AMFR analysis, the CFR analysis (e.g., a lightweight pixel level analysis), or other suitable pixel level analysis. Block 2206 may comprise, for example, blocks 2110 and 2112 of FIG. 21A.

At block 2208, process 2200 includes determining an output status of the object tracker based on a result of the pixel level analysis. The output status of the object tracker may indicate whether to maintain the object tracker for the one or more video frames (e.g., to transition the state of the object tracker from the intermediate state to a normal state and to output the tracker for displaying), to remove the object tracker, or to defer the determination of the output status of the object tracker to a subsequent video frame of the one or more video frames.

With the disclosed techniques, FFR analysis can be selectively added to combine with other pixel level analysis (e.g., the strong pixel level analysis, the lightweight pixel level analysis, the AMFR analysis, or other pixel level analysis) to reduce the likelihood that the pixel level analysis leads to a tracker associated with false-positive objects being output. For example, in a case where FFR analysis shows a contradictory result from the pixel level analysis, the true-false positive detector can at least defer the decision on the tracker to the next round to collect additional bounding box history data. With the disclosed techniques, the accuracy of the true-false positive object detection can be improved.

In some examples, processes 2100 and 2200 may be performed by a computing device or an apparatus, such as the video analytics system 100. For example, the processes 2100 and 2200 can be performed by the video analytics system 100 shown in FIG. 1. In some cases, the computing device or apparatus may include a processor, microprocessor, microcomputer, or other component of a device that is configured to carry out the steps of processes 2100 and 2200. In some examples, the computing device or apparatus may include a camera configured to capture video data (e.g., a video sequence) including video frames. For example, the computing device may include a camera device (e.g., an IP camera or other type of camera device) that may include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other image capture device that captures the video data is separate from the computing device, in which case the computing device receives the captured video data. The computing device may further include a network interface configured to communicate the video data. The network interface may be configured to communicate Internet Protocol (IP) based data.

Processes 2100 and 2200 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, processes 2100 and 2200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Various test conditions are described below and objective simulation results are shown in Table 3, Table 4, and Table 5. in order to illustrate results of the techniques discussed herein. Simulations are done by utilizing the so-called VAM report (which has been upgraded recently) to include criteria such as object level true positive rate, false positive rate, maximum delay per video clip, and average delay over all objects per video clip. Conventional VIRAT video clips were used for Table 3 and other video clips were used for Table 4. Table 5 shows the objective results of the anchor method and of the disclosed techniques when processing a sequence of VIRAT video clips and two sequences of other video clips. All of the video clips are well labeled and the VAM report compares the results (as tracked bounding boxes) with the marked ground truth. All 32 of the VIRAT video clips can be used for the professional security case, while the "other" dataset including 28 video clips can be used for the home security case. Both datasets range from easy to difficult video clips.

Table 1 shows a comparison between the true-false object detection results in the VIRAT dataset using an anchor method and the disclosed techniques. As shown in Table 3, the object level true positive rate and the object level false positive rate are identical between the output of the anchor method and the output of the proposed techniques when processing the VIRAT dataset.

TABLE 3

Results for VIRAT Dataset

| VIRAT | Object level true positive rate (%) | Object level false positive rate (%) |
|---|---|---|
| Anchor | 92.039 | 4.463 |
| Proposed | 92.039 | 4.463 |

Table 4 shows a comparison between the true-false object detection results in the other datasets. As shown in Table 4, the proposed techniques improves the object level false positive rate while maintaining the object level true positive rate.

TABLE 4

Results for the Other Dataset

| | Object level true positive rate (%) | Object level false positive rate (%) |
|---|---|---|
| Anchor | 99.643 | 7.614 |
| Proposed | 99.643 | 4.8 |

Table 3 shows the objective results of processing three video sequences with the anchor method and with the disclosed techniques. As shown in Table 5, the proposed techniques improve the object level false positive rate for the first two sequences, and improve the object level true positive rate for the third sequence.

TABLE 5

Results for individual sequences

| Method | Sequence | Object level true positive rate (%) | Object level false positive rate (%) |
|---|---|---|---|
| Anchor | ipcva_20150908142345 | 90 | 17.4 |
| Proposed | ipcva_20150908142345 | 90 | 10 |
| Anchor | people_enter_backyard_over_fence_2 | 100 | 66.7 |
| Proposed | people_enter_backyard_over_fence_2 | 100 | 0 |
| Anchor | VIRAT_S_040103_02_000199_000279 | 75 | 0 |
| Proposed | VIRAT_S_040103_02_000199_000279 | 87.5 | 0 |

Subjective results of the techniques discussed herein are described below with respect to FIG. 23-FIG. 27.

Figure 23:
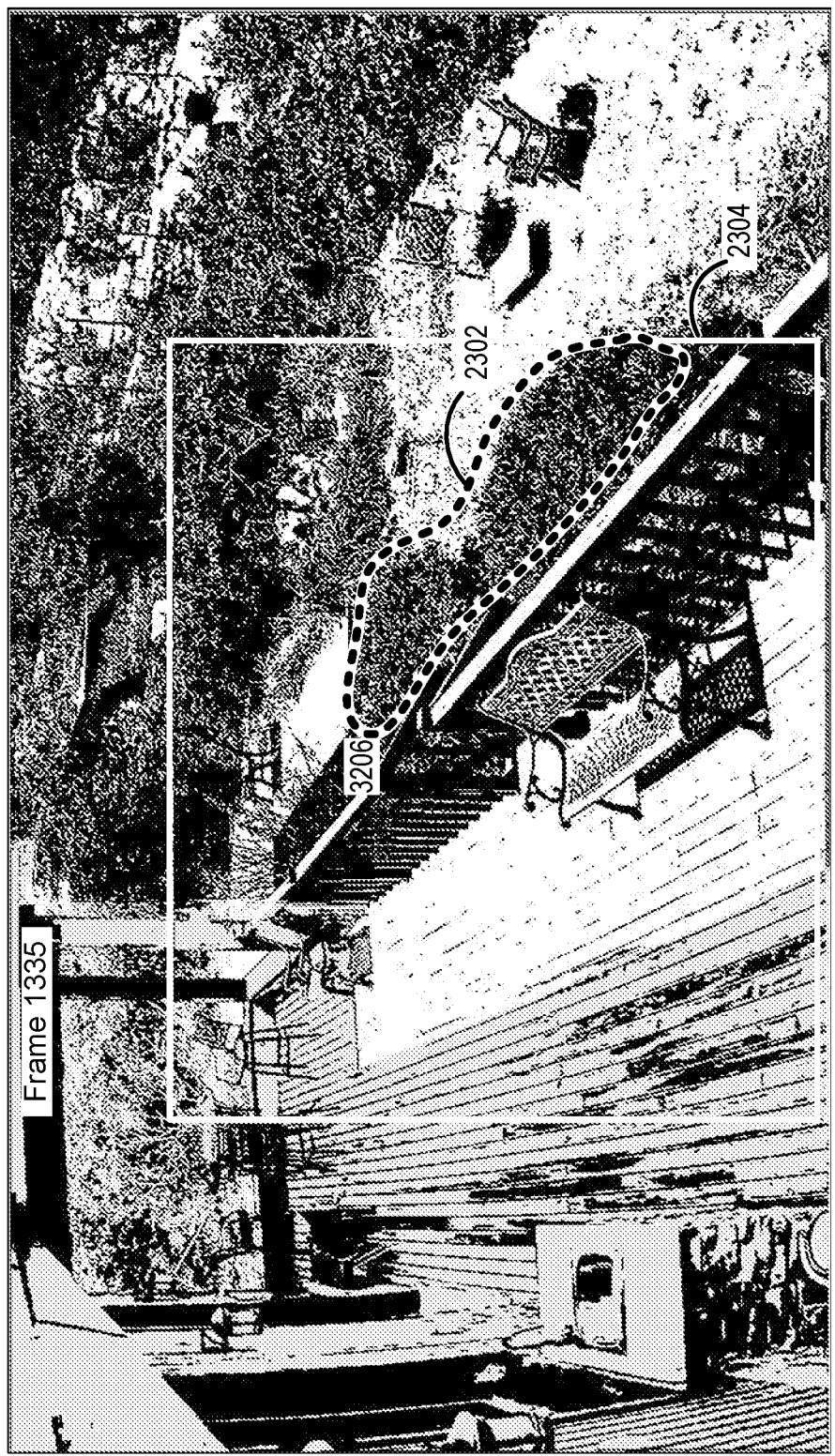
FIG. 23 is an illustration of a video frame of an environment in which various objects are tracked, in accordance with some examples.

In FIG. 23, the anchor method outputs a tracker (with tracker ID 3206) for foliage 2302 enclosed by a bounding box 2304. With the disclosed techniques, the tracker 3206 is identified as being associated with false positive objects and is removed.

Figure 24:
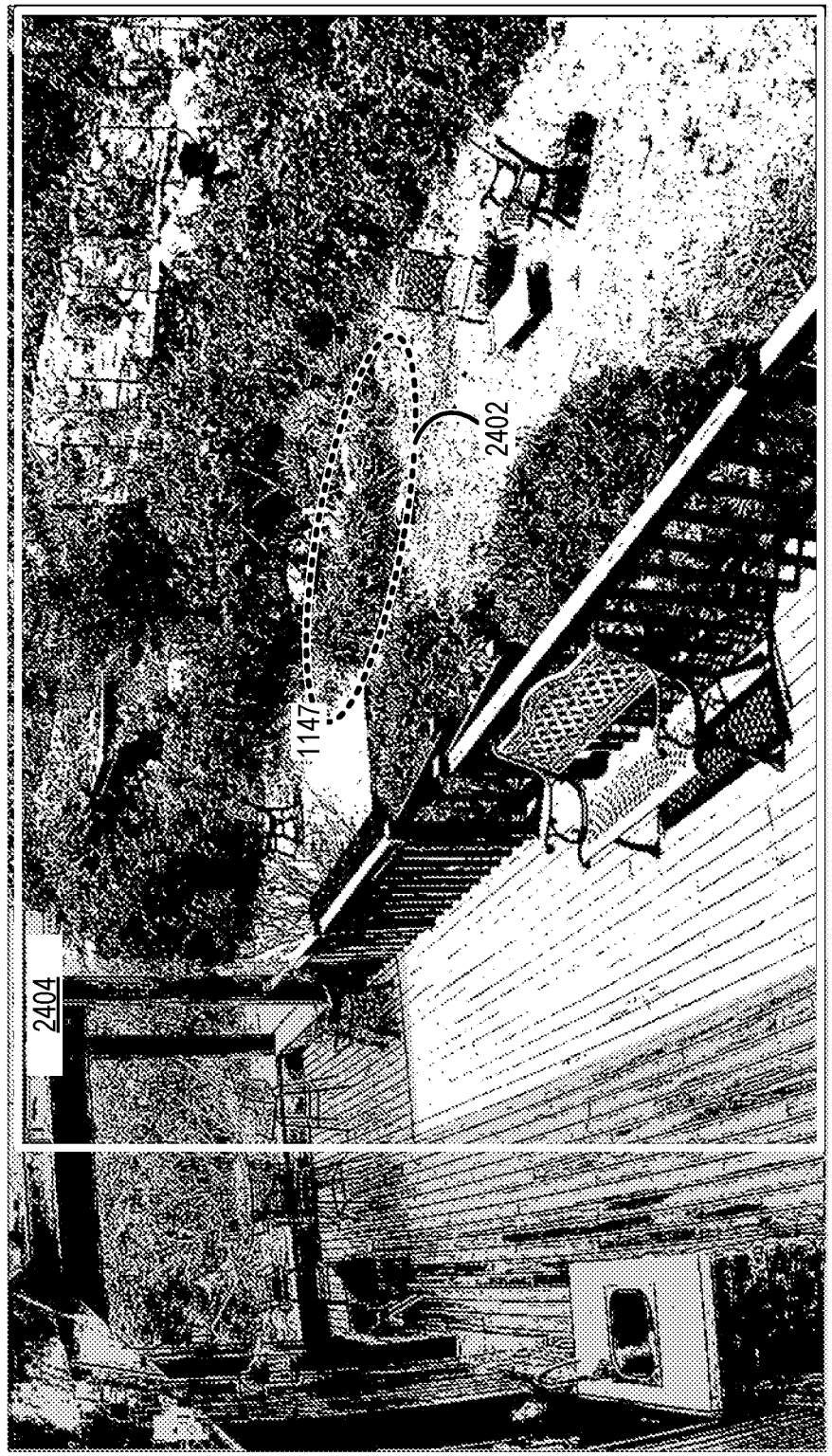
FIG. 24 is an illustration of a video frame of an environment in which various objects are tracked, in accordance with some examples.

In FIG. 24, the anchor method outputs a tracker (with tracker ID 1147) for foliage 2402 enclosed by a bounding box 2404. With the disclosed techniques, the tracker with ID 1147 is identified as being associated with false positive objects and is removed.

Figure 25:
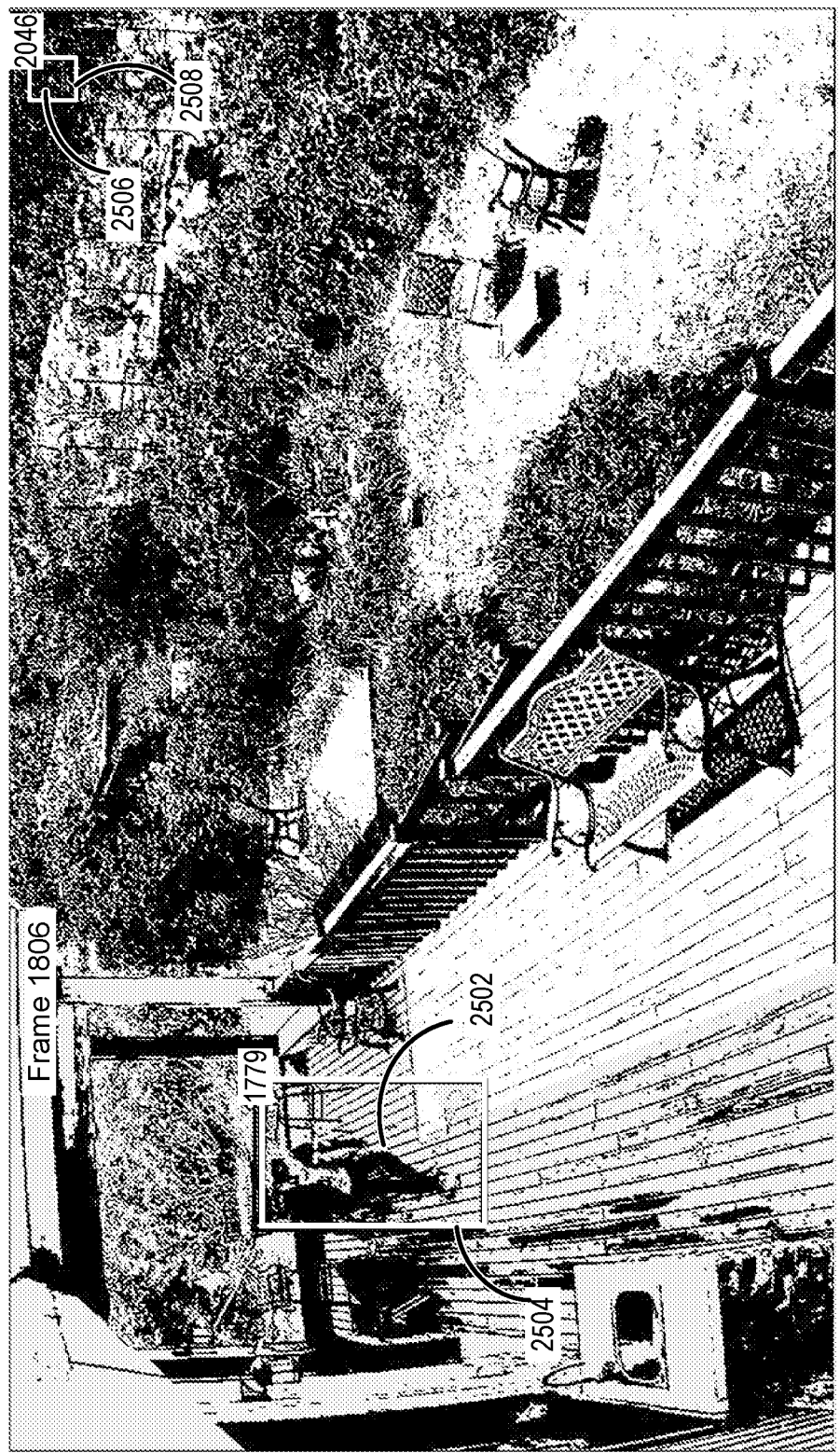
FIG. 25 is an illustration of a video frame of an environment in which various objects are tracked, in accordance with some examples.

In FIG. 25, the anchor method outputs a tracker (with tracker ID 1779) for a human object 2502 enclosed by a bounding box 2504, and a tracker (with tracker ID 2046) for foliage 2506 enclosed by a bounding box 2508. With the disclosed techniques, tracker with ID 1779 is retained for being associated with a true positive object, whereas the tracker with ID 2046 is identified as being associated with false positive objects and is removed.

Figure 26:
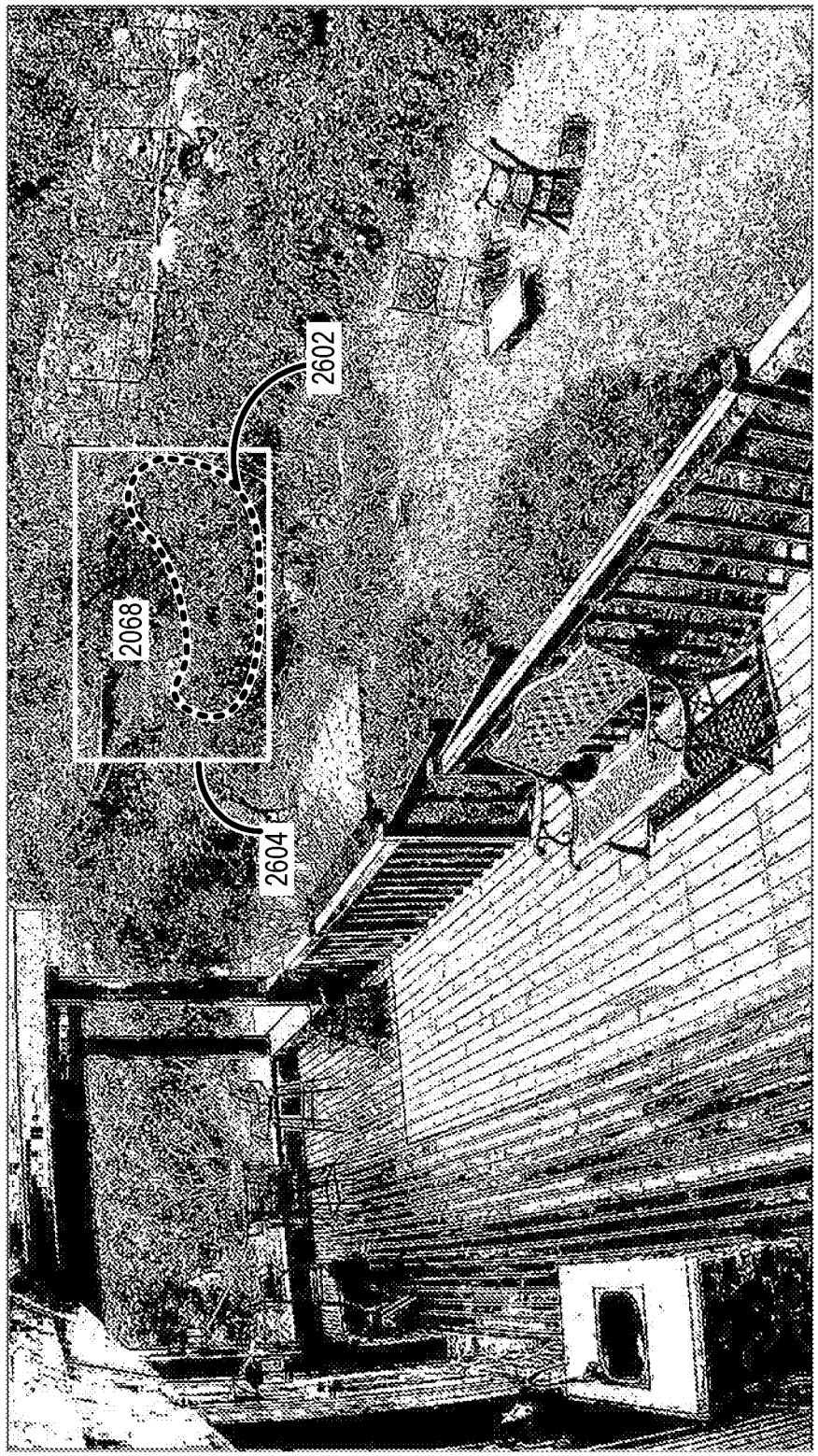
FIG. 26 is an illustration of a video frame of an environment in which various objects are tracked, in accordance with some examples.

In FIG. 26, the anchor method outputs a tracker (with tracker ID 2068) for foliage 2602 enclosed by a bounding box 2604. With the disclosed techniques, the tracker with ID 2068 is identified as for being associated with false positive objects and is removed.

Figure 27:
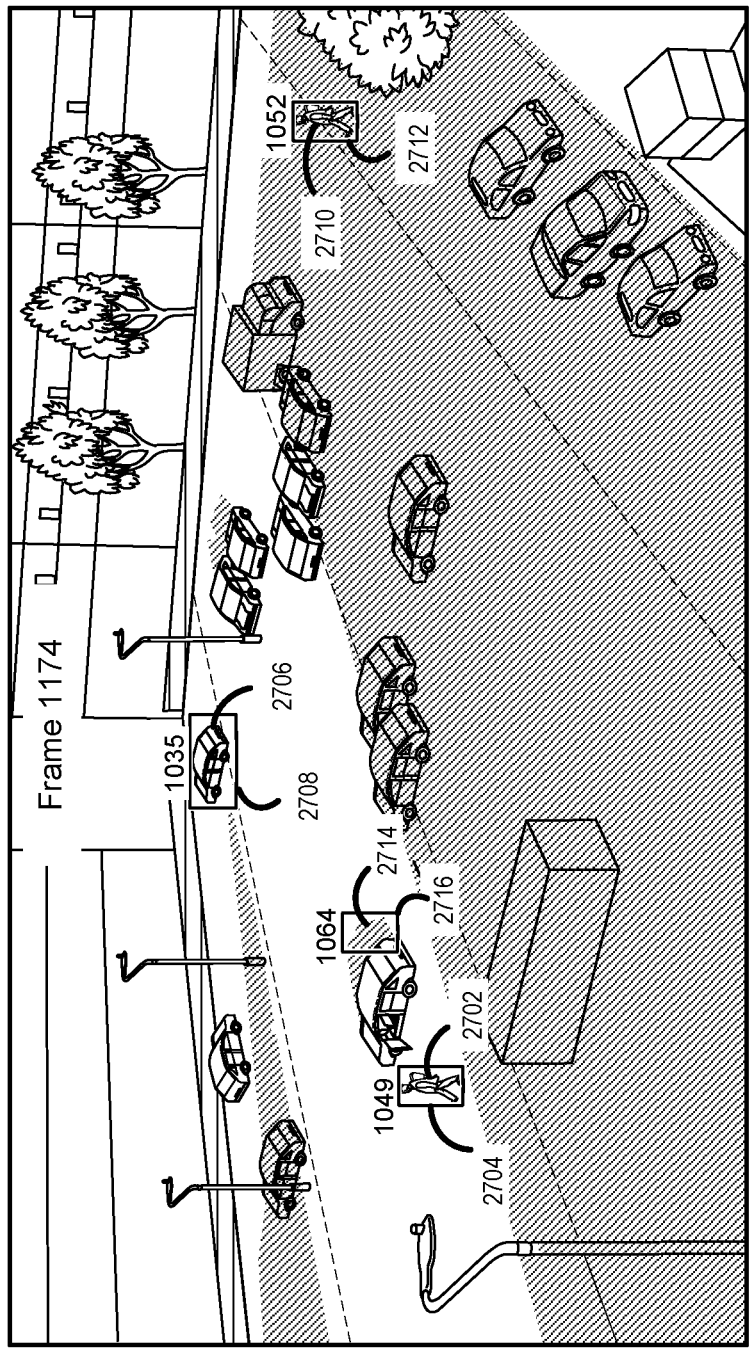
FIG. 27 is an illustration of a video frame of an environment in which various objects are tracked, in accordance with some examples.

In FIG. 27, the anchor method outputs a tracker (with tracker ID 1049) for a first human object 2702 enclosed by a bounding box 2704, a tracker (with tracker ID 1035) for a car object 2706 enclosed by a bounding box 2708, a tracker (with tracker ID 1052) for a second human object 2710 enclosed by a bounding box 2712, and a tracker (with tracker ID 1064) for shadow 2714 enclosed by bounding box 2716. With the disclosed techniques, the tracker with ID 1049 is retained for being associated with a true positive object, whereas the tracker with ID 1064 is identified as being associated with false positive objects and is removed.

The video analytics operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of maintaining blob trackers for one or more video frames, the method comprising:
    identifying a blob tracker for a current video frame, wherein the blob tracker is associated with a blob detected for the current video frame, the blob including pixels of at least a portion of one or more objects in the current video frame;
    obtaining a confidence value associated with the blob tracker;
    determining the confidence value is within a confidence range; and
    determining a status of the blob tracker based on the confidence value being within the confidence range, determining the status of the blob tracker including:
        determining a current characteristic of pixels in a region of the current video frame associated with the blob tracker;
        determining a previous characteristic of pixels in a region of a previous video frame associated with the blob tracker;
        determining a difference between the current characteristic and the previous characteristic; and
        determining the status of the blob tracker based on the determined difference, the status of the blob tracker indicating whether to maintain the blob tracker for the one or more video frames.

2. The method of claim 1, wherein the determined status of the blob tracker includes a first type of blob tracker that is output as an identified blob tracker-blob pair, a second type of blob tracker that is maintained for further analysis, or a third type of blob tracker that is removed from a plurality of blob trackers maintained for the one or more video frames.

3. The method of claim 2, wherein the status of the blob tracker is determined to be the first type of blob tracker when the difference is greater than a threshold difference.

4. The method of claim 2, wherein the status of the blob tracker is determined to be the first type of blob tracker when an object the blob tracker is tracking is larger than a threshold size and when the difference is greater than a threshold difference.

5. The method of claim 2, wherein the status of the blob tracker is determined to be the second type of blob tracker when the difference is less than a threshold difference.

6. The method of claim 2, wherein the status of the blob tracker is determined to be the second type of blob tracker when an object the blob tracker is tracking is larger than a threshold size and when the difference is less than a threshold difference.

7. The method of claim 2, wherein the status of the blob tracker is determined to be the third type of blob tracker when the difference is less than a threshold difference.

8. The method of claim 1, wherein determining the current characteristic and the previous characteristic includes:
    obtaining an appearance model for the blob tracker, the appearance model including one or more color characteristics of the pixels in the region of the previous video frame included in a previous bounding region of the blob tracker;
    determining the previous characteristic of the blob tracker for the previous video frame using the appearance model; and
    determining the current characteristic of the blob tracker for the current video frame using the appearance model.

9. The method of claim 8, wherein the one or more color characteristics of the appearance model include a previous color histogram of the pixels in the region of the previous video frame included in the previous bounding region.

10. The method of claim 1, wherein the previous characteristic includes a previous color mass center of the pixels in the region of the previous video frame included in the previous bounding region, and wherein the current characteristic of the blob tracker includes a current color mass center of the pixels in the region of the current video frame included in a current bounding region of the blob tracker.

11. The method of claim 10, wherein determining the difference between the current characteristic and the previous characteristic includes:
determining a distance between the previous color mass center and the current color mass center.

12. The method of claim 11, wherein determining the status of the blob tracker based on the determined difference includes:
comparing the distance to a threshold distance; and
determining the blob tracker is a third type of tracker when the distance is less than the threshold distance, wherein a tracker of the third type is removed from a plurality of blob trackers maintained for the one or more video frames.

13. The method of claim 12, wherein the threshold distance is a percentage of a diagonal distance of the previous bounding region.

14. The method of claim 1, further comprising:
performing a foreground pixel fullness analysis on the pixels in the region of the current video frame included in a current bounding region of the blob tracker, the foreground pixel fullness analysis including comparing a foreground pixel fullness ratio of the current bounding region against a foreground pixel fullness ratio threshold; and
wherein determining the status of the blob tracker is based on the foreground pixel fullness analysis.

15. The method of claim 14, further comprising:
determining that an input status of the blob tracker indicates that a determination of the status of the blob tracker is to be deferred to a subsequent video frame, the subsequent video frame occurring after the current video frame in a video sequence; and
determining whether to perform the foreground pixel fullness analysis based on the confidence value associated with the blob tracker, the confidence value being determined based on a set of historical attributes associated with a bounding region of the blob tracker in a set of previous video frames of the video sequence.

16. The method of claim 1, further comprising:
determining a correlation between color components of the current video frame and color components of a mean picture; and
wherein the status of the blob tracker is determined based on the determined difference and the determined correlation.

17. An apparatus for maintaining blob trackers for one or more video frames, comprising:
a memory configured to store video data associated with the video frames; and
a processor configured to:
identify a blob tracker for a current video frame, wherein the blob tracker is associated with a blob detected for the current video frame, the blob including pixels of at least a portion of one or more objects in the current video frame;
obtain a confidence value associated with the blob tracker;
determine the confidence value is within a confidence range; and
determine a status of the blob tracker based on the confidence value being within the confidence range, determining the status of the blob tracker including:
determining a current characteristic of pixels in a region of the current video frame associated with the blob tracker;
determining a previous characteristic of pixels in a region of a previous video frame associated with the blob tracker;
determining a difference between the current characteristic and the previous characteristic; and
determining the status of the blob tracker based on the determined difference, the status of the blob tracker indicating whether to maintain the blob tracker for the one or more video frames.

18. The apparatus of claim 17, wherein the determined status of the blob tracker includes a first type of blob tracker that is output as an identified blob tracker-blob pair, a second type of blob tracker that is maintained for further analysis, or a third type of blob tracker that is removed from a plurality of blob trackers maintained for the one or more video frames.

19. The apparatus of claim 18, further comprising one or more of:
wherein the status of the blob tracker is determined to be the first type of blob tracker when the difference is greater than a threshold difference;
wherein the status of the blob tracker is determined to be the first type of blob tracker when an object the blob tracker is tracking is larger than a threshold size and when the difference is greater than the threshold difference;
wherein the status of the blob tracker is determined to be the second type of blob tracker when the difference is less than the threshold difference;
wherein the status of the blob tracker is determined to be the second type of blob tracker when an object the blob tracker is tracking is larger than the threshold size and when the difference is less than the threshold difference; and
wherein the status of the blob tracker is determined to be the third type of blob tracker when the difference is less than the threshold difference.

20. The apparatus of claim 17, wherein determining the current characteristic and the previous characteristic includes:
obtaining an appearance model for the blob tracker, the appearance model including one or more color characteristics of the pixels in the region of the previous video frame included in a previous bounding region of the blob tracker;
determining the previous characteristic of the blob tracker for the previous video frame using the appearance model; and
determining the current characteristic of the blob tracker for the current video frame using the appearance model.

21. The apparatus of claim 20, wherein the one or more color characteristics of the appearance model include a previous color histogram of the pixels in the region of the previous video frame included in the previous bounding region.

22. The apparatus of claim 17, wherein the previous characteristic includes a previous color mass center of the pixels in the region of the previous video frame included in the previous bounding region, and wherein the current characteristic of the blob tracker includes a current color mass center of the pixels in the region of the current video frame included in a current bounding region of the blob tracker.

23. The apparatus of claim 22, wherein determining the difference between the current characteristic and the previous characteristic includes:
   determining a distance between the previous color mass center and the current color mass center.

24. The apparatus of claim 23, wherein determining the status of the blob tracker based on the determined difference includes:
   comparing the distance to a threshold distance; and
   determining the blob tracker is a third type of tracker when the distance is less than the threshold distance, wherein a tracker of the third type is removed from a plurality of blob trackers maintained for the one or more video frames.

25. The apparatus of claim 24, wherein the threshold distance is a percentage of a diagonal distance of the previous bounding region.

26. The apparatus of claim 17, further comprising:
   performing a foreground pixel fullness analysis on the pixels in the region of the current video frame included in a current bounding region of the blob tracker, the foreground pixel fullness analysis including comparing a foreground pixel fullness ratio of the current bounding region against a foreground pixel fullness ratio threshold; and
   wherein determining the status of the blob tracker is based on the foreground pixel fullness analysis.

27. The apparatus of claim 26, further comprising:
   determining that an input status of the blob tracker indicates that a determination of the status of the blob tracker is to be deferred to a subsequent video frame, the subsequent video frame occurring after the current video frame in a video sequence; and
   determining whether to perform the foreground pixel fullness analysis based on the confidence value associated with the blob tracker, the confidence value being determined based on a set of historical attributes associated with a bounding region of the blob tracker in a set of previous video frames of the video sequence.

28. The apparatus of claim 17, wherein the processor is further configured to:
   determine correlation between color components of the current video frame and color components of a mean picture; and
   wherein the status of the blob tracker is determined based on the determined difference and the determined correlation.

29. The apparatus of claim 17, wherein the apparatus includes a camera for capturing the one or more video frames.

30. The apparatus of claim 17, wherein the apparatus includes a mobile device comprising a camera for capturing the one or more video frames and a display for displaying the one or more video frames.

* * * * *